(12) United States Patent
Ilic

(10) Patent No.: US 10,375,279 B2
(45) Date of Patent: Aug. 6, 2019

(54) USER FEEDBACK FOR REAL-TIME CHECKING AND IMPROVING QUALITY OF SCANNED IMAGE

(71) Applicant: ML Netherlands C.V., Amsterdam (NL)

(72) Inventor: Alexander Ilic, Zurich (CH)

(73) Assignee: ML Netherlands C.V., Amsterdam (NL)

( * ) Notice: Subject to any disclaimer, the term of this patent is extended or adjusted under 35 U.S.C. 154(b) by 0 days.

(21) Appl. No.: 15/173,334

(22) Filed: Jun. 3, 2016

(65) Prior Publication Data

US 2016/0352979 A1 Dec. 1, 2016

Related U.S. Application Data

(63) Continuation of application No. PCT/EP2014/076469, filed on Dec. 3, 2014.
(Continued)

(51) Int. Cl.
*H04N 5/217* (2011.01)
*G06T 3/40* (2006.01)
(Continued)

(52) U.S. Cl.
CPC ....... *H04N 5/2173* (2013.01); *G06K 9/00463* (2013.01); *G06K 9/18* (2013.01);
(Continued)

(58) Field of Classification Search
CPC ............. H04N 5/2173; H04N 5/23296; H04N 5/2354; H04N 5/23229; H04N 5/23293;
(Continued)

(56) References Cited

U.S. PATENT DOCUMENTS

| 4,767,923 A | 8/1988 | Yuasa |
| 4,797,544 A | 1/1989 | Montgomery et al. |

(Continued)

FOREIGN PATENT DOCUMENTS

| DE | 19858935 A1 | 6/2000 |
| EP | 0277964 A1 | 8/1988 |

(Continued)

OTHER PUBLICATIONS

Extended European Search Report and Written Opinion dated Aug. 31, 2010 from corresponding European Application No. 10163475.6.

(Continued)

*Primary Examiner* — Yogesh K Aggarwal
(74) *Attorney, Agent, or Firm* — Wolf, Greenfield & Sacks, P.C.

(57) ABSTRACT

A smartphone may be freely moved in three dimensions as it captures a stream of images of an object. Multiple image frames may be captured in different orientations and distances from the object and combined into a composite image representing an image of the object. The image frames may be formed into the composite image based on representing features of each image frame as a set of points in a three dimensional point cloud. Inconsistencies between the image frames may be adjusted when projecting respective points in the point cloud into the composite image. Quality of the image frames may be improved by processing the image frames to correct errors. Reflections and shadows may be detected and removed. Further, optical character recognition may be applied. As the scan progresses, a direction for capturing subsequent image frames is provided to a user as a real-time feedback.

23 Claims, 28 Drawing Sheets

Related U.S. Application Data

(60) Provisional application No. 61/911,039, filed on Dec. 3, 2013.

(51) Int. Cl.
*G06K 9/18* (2006.01)
*H04N 5/232* (2006.01)
*H04N 5/235* (2006.01)
*G06K 9/00* (2006.01)
*G06K 9/22* (2006.01)
*G06T 11/60* (2006.01)

(52) U.S. Cl.
CPC .............. *G06K 9/22* (2013.01); *G06T 3/4038* (2013.01); *G06T 11/60* (2013.01); *H04N 5/2354* (2013.01); *H04N 5/23216* (2013.01); *H04N 5/23222* (2013.01); *H04N 5/23229* (2013.01); *H04N 5/23232* (2013.01); *H04N 5/23293* (2013.01); *H04N 5/23296* (2013.01); *G06K 2209/01* (2013.01)

(58) Field of Classification Search
CPC ........... H04N 5/23216; H04N 5/23222; H04N 5/23232; G06K 9/00463; G06K 9/22; G06K 9/18; G06K 2209/01; G06T 3/4038
USPC .................................................. 348/370–376
See application file for complete search history.

(56) References Cited

U.S. PATENT DOCUMENTS

| | | | |
|---|---|---|---|
| 4,804,949 A | 2/1989 | Faulkerson | |
| 4,906,843 A | 3/1990 | Jones et al. | |
| 5,355,146 A | 10/1994 | Chiu et al. | |
| 5,574,804 A | 11/1996 | Olschafskie et al. | |
| 5,578,813 A | 11/1996 | Allen et al. | |
| 5,611,033 A | 3/1997 | Pitteloud et al. | |
| 5,685,002 A | 11/1997 | Sano | |
| 5,880,740 A | 3/1999 | Halliday et al. | |
| 5,909,209 A | 6/1999 | Dickinson | |
| 5,917,935 A | 6/1999 | Hawthorne et al. | |
| 5,994,710 A | 11/1999 | Knee et al. | |
| 6,005,681 A | 12/1999 | Pollard | |
| 6,078,701 A | 6/2000 | Hsu et al. | |
| 6,233,363 B1 | 5/2001 | Iida | |
| 6,249,360 B1 | 6/2001 | Pollard et al. | |
| 6,304,248 B1 | 10/2001 | Shiobara et al. | |
| 6,304,284 B1 | 10/2001 | Dunton et al. | |
| 6,344,846 B1 | 2/2002 | Hines | |
| 6,348,981 B1 | 2/2002 | Walsh | |
| 6,392,632 B1 | 5/2002 | Lee | |
| 6,429,422 B1 | 8/2002 | Bohn | |
| 6,459,819 B1 | 10/2002 | Nakao | |
| 6,513,717 B2 | 2/2003 | Hannigan | |
| 6,525,306 B1 | 2/2003 | Bohn | |
| 6,648,483 B1 | 11/2003 | Kuo | |
| 6,657,667 B1 | 12/2003 | Anderson | |
| 6,710,768 B2 | 3/2004 | Muranami | |
| 6,783,069 B1 | 8/2004 | Hecht et al. | |
| 6,901,166 B1 | 5/2005 | Nakayama | |
| 6,965,460 B1 | 11/2005 | Gann et al. | |
| 7,038,664 B2 | 5/2006 | Danzyger et al. | |
| 7,075,572 B2 | 7/2006 | Kinjo | |
| 7,119,816 B2 | 10/2006 | Zhang et al. | |
| 7,123,292 B1 | 10/2006 | Seeger et al. | |
| 7,133,068 B2 | 11/2006 | Fisher et al. | |
| 7,221,810 B2 | 5/2007 | Andreasson et al. | |
| 7,317,448 B1 | 1/2008 | Sasselli et al. | |
| 7,424,218 B2 | 9/2008 | Baudisch et al. | |
| 7,439,954 B2 | 10/2008 | Theytaz et al. | |
| 7,474,767 B2 | 1/2009 | Sen et al. | |
| 7,518,767 B2 | 4/2009 | Chen et al. | |
| 7,796,304 B2 | 9/2010 | Silverbrook | |
| 7,855,812 B2 | 12/2010 | Gelsomini et al. | |
| 7,884,970 B2 | 2/2011 | Hiroyasu et al. | |
| 7,957,009 B2 | 6/2011 | Silverbrook | |
| 7,961,364 B2 | 6/2011 | Lapstun et al. | |
| 8,106,886 B2 | 1/2012 | Chang | |
| 8,120,820 B2 | 2/2012 | Lapstun et al. | |
| 8,179,563 B2 | 5/2012 | King et al. | |
| 8,189,965 B2 | 5/2012 | Edgar et al. | |
| 8,218,020 B2 | 7/2012 | Tenchio et al. | |
| 8,331,723 B2 | 12/2012 | Ozluturk | |
| 8,339,467 B2 | 12/2012 | Zahnert et al. | |
| 8,380,005 B1 | 2/2013 | Jonsson et al. | |
| 8,384,947 B2 | 2/2013 | Edgar et al. | |
| 8,416,468 B2 | 4/2013 | Underwood et al. | |
| 8,433,143 B1* | 4/2013 | Carson | G06T 7/41 |
| | | | 382/218 |
| 8,441,695 B2 | 5/2013 | Zahnert et al. | |
| 8,441,696 B2 | 5/2013 | Zahnert et al. | |
| 8,477,394 B2 | 7/2013 | Jonsson et al. | |
| 8,570,588 B2 | 10/2013 | Edgar et al. | |
| 8,582,182 B2 | 11/2013 | Zahnert et al. | |
| 8,693,047 B2 | 4/2014 | Edgar et al. | |
| 8,723,885 B2 | 5/2014 | Zahnert et al. | |
| 8,786,897 B2 | 7/2014 | Edgar et al. | |
| 8,904,479 B1 | 12/2014 | Johansson et al. | |
| 9,270,857 B2 | 2/2016 | Edgar et al. | |
| 9,300,834 B2 | 3/2016 | Zahnert et al. | |
| 9,465,129 B1 | 10/2016 | Olsson et al. | |
| 9,723,203 B1 | 8/2017 | Ettinger | |
| 9,912,847 B1* | 3/2018 | Yuan | H04N 5/225 |
| 2001/0022860 A1 | 9/2001 | Kitamura et al. | |
| 2002/0001418 A1 | 1/2002 | Fahraeus et al. | |
| 2002/0030748 A1 | 3/2002 | Kitaguchi et al. | |
| 2002/0181762 A1 | 12/2002 | Silber | |
| 2002/0190953 A1 | 12/2002 | Gordon et al. | |
| 2004/0028295 A1 | 2/2004 | Allen et al. | |
| 2004/0085464 A1 | 5/2004 | Higurashi et al. | |
| 2004/0141157 A1 | 7/2004 | Ramachandran et al. | |
| 2004/0189674 A1 | 9/2004 | Zhang et al. | |
| 2004/0208369 A1 | 10/2004 | Nakayama | |
| 2004/0218055 A1 | 11/2004 | Yost et al. | |
| 2004/0239771 A1 | 12/2004 | Habe | |
| 2004/0264806 A1 | 12/2004 | Herley | |
| 2005/0057510 A1 | 3/2005 | Baines et al. | |
| 2005/0129291 A1 | 6/2005 | Boshra | |
| 2005/0212955 A1 | 9/2005 | Craig et al. | |
| 2005/0231482 A1 | 10/2005 | Theytaz et al. | |
| 2005/0248532 A1 | 11/2005 | Moon et al. | |
| 2005/0270483 A1 | 12/2005 | Fujimatsu et al. | |
| 2006/0062427 A1 | 5/2006 | Burkhart et al. | |
| 2006/0170781 A1 | 8/2006 | Sobol | |
| 2007/0025723 A1 | 2/2007 | Baudisch et al. | |
| 2007/0031062 A1 | 2/2007 | Pal et al. | |
| 2007/0031063 A1 | 2/2007 | Zhou | |
| 2007/0076944 A1 | 4/2007 | Bryll et al. | |
| 2007/0121146 A1 | 5/2007 | Nesbit et al. | |
| 2008/0101786 A1 | 5/2008 | Pozniansky et al. | |
| 2008/0130077 A1 | 6/2008 | Park et al. | |
| 2008/0168070 A1 | 7/2008 | Naphade et al. | |
| 2008/0215286 A1 | 9/2008 | Mealy et al. | |
| 2008/0219654 A1* | 9/2008 | Border | H04N 5/2258 |
| | | | 396/89 |
| 2008/0260366 A1 | 10/2008 | Brosnan et al. | |
| 2009/0021576 A1 | 1/2009 | Linder et al. | |
| 2009/0032600 A1 | 2/2009 | Lapstun et al. | |
| 2009/0060283 A1 | 3/2009 | Bledsoe et al. | |
| 2009/0080035 A1 | 3/2009 | Downs | |
| 2010/0054627 A1 | 3/2010 | Rosenberg | |
| 2010/0111441 A1 | 5/2010 | Xiong et al. | |
| 2010/0123907 A1 | 5/2010 | Edgar et al. | |
| 2010/0124384 A1 | 5/2010 | Edgar et al. | |
| 2010/0149368 A1 | 6/2010 | Yamashita et al. | |
| 2010/0194919 A1* | 8/2010 | Ishii | H04N 5/2354 |
| | | | 348/224.1 |
| 2010/0245344 A1 | 9/2010 | Chen et al. | |
| 2010/0295868 A1 | 11/2010 | Zahnert et al. | |
| 2010/0296129 A1 | 11/2010 | Zahnert et al. | |
| 2010/0296131 A1 | 11/2010 | Zahnert et al. | |
| 2010/0296133 A1 | 11/2010 | Zahnert et al. | |
| 2010/0296137 A1 | 11/2010 | Zahnert et al. | |

(56) References Cited

U.S. PATENT DOCUMENTS

| | | | |
|---|---|---|---|
| 2010/0296140 | A1 | 11/2010 | Zahnert et al. |
| 2011/0025842 | A1 | 2/2011 | King et al. |
| 2011/0087350 | A1 | 4/2011 | Fogel et al. |
| 2011/0228044 | A1 | 9/2011 | Miyamoto et al. |
| 2011/0234497 | A1 | 9/2011 | Zahnert et al. |
| 2011/0314049 | A1 | 12/2011 | Poirier et al. |
| 2012/0128340 | A1* | 5/2012 | Lai .................. G03B 15/05 396/164 |
| 2012/0133746 | A1 | 5/2012 | Bigioi et al. |
| 2012/0155846 | A1* | 6/2012 | Gilbert-Schachter .... G03B 7/16 396/106 |
| 2012/0249554 | A1 | 10/2012 | Chen et al. |
| 2013/0027757 | A1 | 1/2013 | Lee et al. |
| 2013/0120595 | A1 | 5/2013 | Roach et al. |
| 2013/0300740 | A1 | 11/2013 | Snyder et al. |
| 2014/0072201 | A1 | 3/2014 | Tilt |
| 2014/0118483 | A1 | 5/2014 | Rapoport et al. |
| 2014/0321771 | A1 | 10/2014 | Reinisch et al. |
| 2015/0015735 | A1* | 1/2015 | Rav-Acha .......... H04N 5/23219 348/222.1 |
| 2015/0077768 | A1 | 3/2015 | Edgar et al. |
| 2015/0103189 | A1 | 4/2015 | Karpenko |
| 2015/0199384 | A1 | 7/2015 | Boncyk et al. |
| 2015/0339530 | A1 | 11/2015 | Neckels et al. |
| 2016/0035082 | A1 | 2/2016 | King et al. |
| 2016/0173716 | A1 | 6/2016 | Zahnert et al. |
| 2016/0227181 | A1 | 8/2016 | Ilic et al. |
| 2016/0309085 | A1 | 10/2016 | Ilic |
| 2016/0328827 | A1 | 11/2016 | Ilic et al. |
| 2016/0330374 | A1 | 11/2016 | Ilic et al. |
| 2017/0034429 | A1 | 2/2017 | Huysegems et al. |
| 2017/0118399 | A1 | 4/2017 | Kim et al. |
| 2017/0118409 | A1 | 4/2017 | Im et al. |

FOREIGN PATENT DOCUMENTS

| | | |
|---|---|---|
| EP | 1126404 A1 | 8/2001 |
| EP | 1164538 A2 | 12/2001 |
| EP | 2189926 A1 | 5/2010 |
| EP | 2339534 A1 | 6/2011 |
| GB | 2336195 A | 10/1999 |
| JP | 2000-069352 A | 3/2000 |
| JP | 2000-175185 A | 6/2000 |
| JP | 2002-311471 A | 10/2002 |
| JP | 2009-232275 A | 10/2009 |
| JP | 2011-130282 A | 6/2011 |
| JP | 2012-078495 A | 4/2012 |
| JP | 2013-148824 A | 8/2013 |
| WO | WO 03/091868 A1 | 11/2003 |
| WO | WO 2006/085827 A1 | 8/2006 |
| WO | WO 2007/029903 A1 | 3/2007 |
| WO | WO 2015/028587 A2 | 3/2015 |
| WO | WO 2015/082572 A2 | 6/2015 |

OTHER PUBLICATIONS

European Search Report dated Nov. 29, 2010 from corresponding European Application No. 10163475.6.
Extended European Search Report dated Sep. 7, 2016 from corresponding European Application No. 16172971.0.
International Search Report and Written Opinion dated Jun. 1, 2011, from International Application No. PCT/EP2011/053775.
International Preliminary Report on Patentability dated Apr. 19, 2012, from International Application No. PCT/EP2011/053775.
International Search Report and Written Opinion for Application No. PCT/EP2014/068337 dated Mar. 17, 2015.
International Seach Report and Written Opinion for Application No. PCT/EP2014/076469 dated Jun. 30, 2015.
International Search Report and Written Opinion for Application No. PCT/EP2015/050038 dated Mar. 19, 2015.
International Search Report and Written Opinion for Application No. PCT/EP2015/050036 dated Apr. 7, 2015.
International Search Report and Written Opinion for International Application No. PCT/EP2015/060320 dated Aug. 4, 2015.
International Preliminary Report on Patentability for International Application No. PCT/EP2015/060320 dated Nov. 24, 2016.
[No Author Listed], DIY Mouse Scanner. ttp://www.diylive.net/index.php/2007/07/20/diy-mouse-scanner/> [retrieved on Feb. 8, 2010.] 1 page.
[No Author Listed], Learn how to use 123d Catch. 123d Catch. May 2, 2014; Retrieved from the internet: http://web.archive.org/web/20140502092851/http://www.123dapp.com/howto/catch [retrieved on Sep. 7, 2015]. 16 pages.
[No Author Listed], The basic rules for STL files. SDPRINTUK. May 3, 2014; Retrieved form the Internet: http://web.archive.org/web/20140503142737/http://www.3dprint-uk.co.uk/the-basic-rules-for-stl-files/ [retrieved on Sep. 7, 2015]. 1 page.
[No Author Listed], Turn ordinary photos into extraordinary 3D models with 123D catch. 123Catch. May 11, 2014; Retrieved from the Internet: http://web.archive.org/web/20140511055906/http://www.123dapp.com/catch [retrieved on Sep. 7, 2015]. 6 pages.
Brown, A Survey of Image Registration Techniques. ACM Computing Surveys. Dec. 1992; 24(4): 325-76.
Huang et al., Animated panorama from a panning video sequence. Image and Vision Computing New Zealand (IVCNZ), 2010 25th International Conference of, IEEE. Nov. 8, 2010. pp. 1-8.
Kolev et al., Turning Mobile Phones into 3D Scanners. 2014 IEEE Conference on Computer Vision and Pattern Recognition, IEEE. Jun. 23, 2014; pp. 3946-3953.
Lin et al., Diffuse-Specular Separation and Depth Recovery from Image Sequences. Correct System Design. 2002;2352:16 pages.
Lopez et al., Graphics hardware accelerated panorama builder for mobile phones. Proc. Of SPIE-IS&T Electronic Imaging. Jan. 19, 2009; 7256:72560D1-D9.
Lucas et al., An Iterative Image Registration Technique with an Application to Stereo Vision. Proceedings of Imaging Understanding Workshop. 1981; pp. 121-129.
Melantoni, 123D Design desktop 1.4: 3D file import and 3D printing enhancmeent. May 8, 2014; Retrieved from the Internet: http://blog123dapp.com/2014/05/123d-design-desktop-1-4-3d-file-import-and-3d-printing-enhancements. [retrieved on Aug. 7, 2015].
Nakao et al., An Image Input Unit Using Digital Mosaic Processing. NEC Research and Development. Apr. 1, 1999; 40 (2):259-66.
Tanskanen et al., Live Metric 3D Reconstruction on Mobile Phones. 2013 IEEE International Conference on Computer Vision. Dec. 1, 2013; pp. 65-72.
Yang et al., Inertial sensors image alignmnet and stitching for panorama on mobile phones. Proceedings of the 1st International Workshop on Mobile Location-Based Service, MLBS '11. New York, New York. Sep. 16, 2011. p. 21.
Sammarco, 123D Catch—Tutorial. Digital Culture. 16 pages. Jan. 17, 2012.
European Communication for European Application No. 16172980.1 dated Jan. 8, 2018.
[No Author Listed], capturing text for OCR in lowlight- ideal minimum MP + >?s. Cameras Forum—CNET. Https://www.cnet.com/forums/discussions/capturing-text-for-ocr-in-lowlight-ideal-minimum-mp-s-29389/ 2004. 5 pages.

* cited by examiner

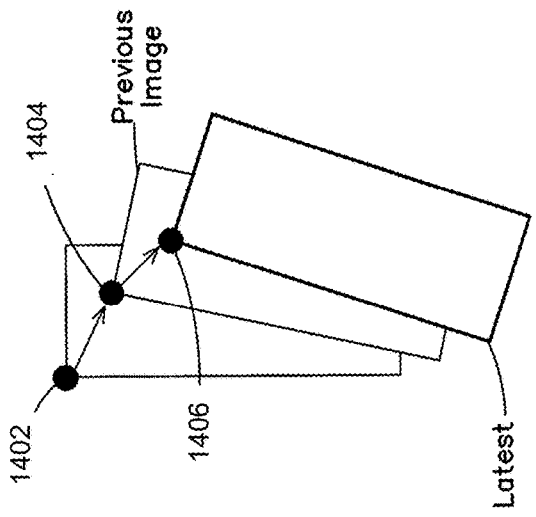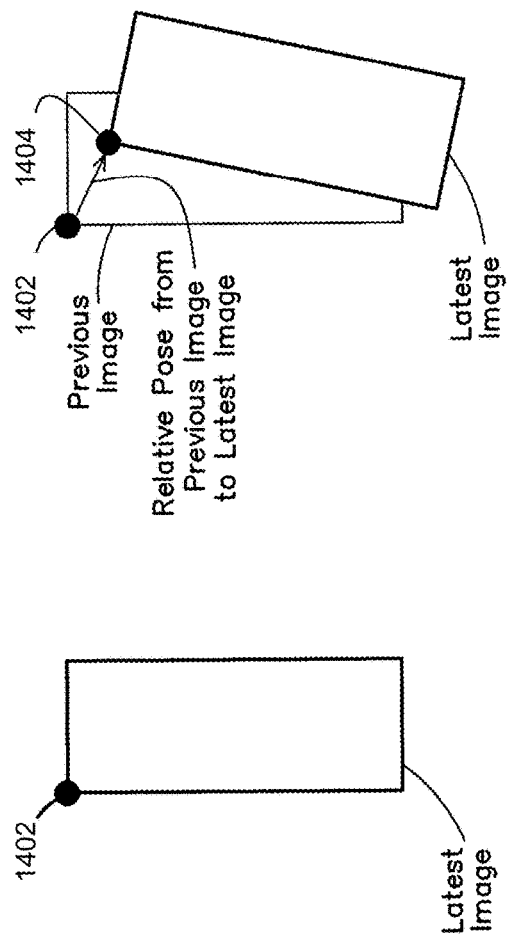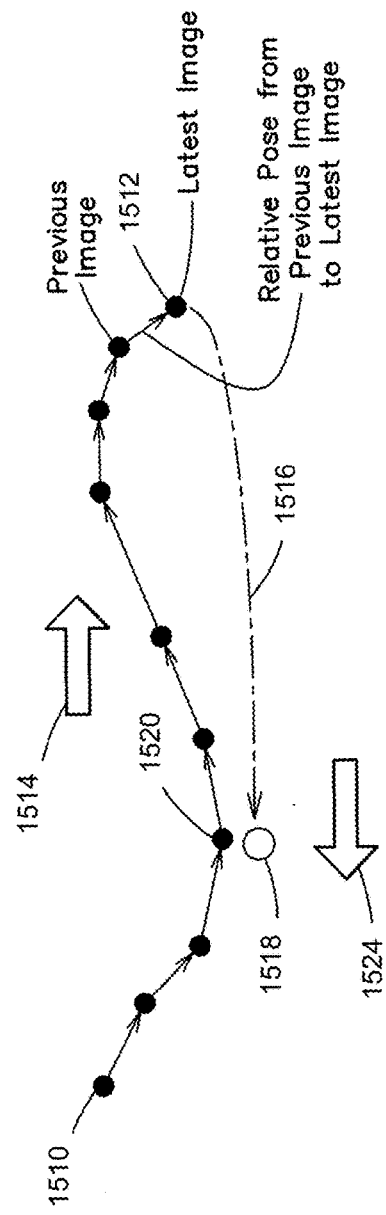

USER FEEDBACK FOR REAL-TIME CHECKING AND IMPROVING QUALITY OF SCANNED IMAGE

RELATED APPLICATIONS

This application is a continuation of and claims the benefit under 35 U.S.C. § 120 of International Patent Application Serial No. PCT/EP2014/076469 entitled "USER FEEDBACK FOR REAL TIME CHECKING AND IMPROVING QUALITY OF SCANNED IMAGE," filed Dec. 3, 2014, which claims priority under 35 U.S.C. § 119(e) to U.S. Provisional Application Ser. No. 61/911,039, filed Dec. 3, 2013, each of which is incorporated by reference herein in its entirety.

BACKGROUND

As mobile phones become more sophisticated, they incorporate components that make these devices versatile and practically indispensable to their owners. Most existing smartphones include a camera and various inertial sensors, such as an accelerometer and gyroscope. The smartphones can also include a proximity sensor, magnetometer, and other types of sensors that allow using the phones for a wide array of functions.

Smartphones can be used to capture information with their cameras. Users value a smartphone's ability to take pictures since this feature allows easily capturing memorable moments, documents, perform bank transactions and a wide array of other possibilities. Images of simple scenes are generally acquired—a photograph or a video. Existing smartphones do not typically analyze the acquired images, and the user has to visually examine each image and decide whether it is of an acceptable quality.

Further, existing smartphones can be used to acquire good quality images of small documents, such as a business card or check for deposit in a bank. However, to image a large object, a smartphone needs to be held at a distance from the object. As a result, an image of a poor quality and low resolution is typically obtained, with details, such as text, being blurred and not easily recognizable.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIGS. 10A, 10B, 10C and 10D are schematic diagrams illustrating an exemplary process of scanning a document by acquiring a stream of images, in accordance with some embodiments of the invention;

FIGS. 14A, 14B and 14C are schematic diagrams illustrating another example of the process of capturing a stream of image frames during scanning of an object, in accordance with some embodiments of the invention;

FIG. 15 is a conceptual illustration of a process of building a network of image frames as the stream of image frame shown in FIGS. 10A, 10B and 10C is captured, in accordance with some embodiments of the invention;

DETAILED DESCRIPTION

Figure 1:
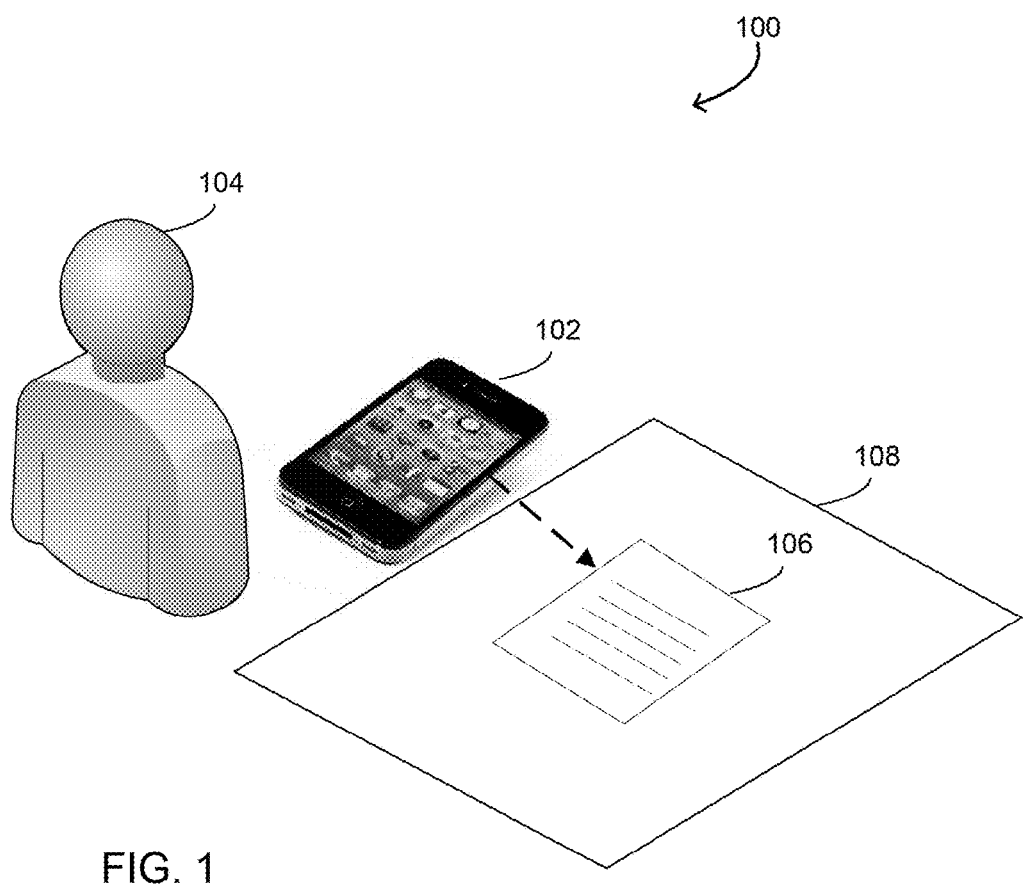
FIG. 1 is a sketch of an environment in which some embodiments of the invention may be implemented.

The inventors have developed image processing techniques that enable a smartphone to capture images with high quality and/or of large objects. These techniques may be based on constructing a composite image from multiple image frames of an object. The image frames may be combined such that the extent of the object represented in the composite image exceeds the extent depicted in a single image frame. Such an approach may enable imaging with the smartphone camera held close to the object such that each image frame represents only a portion of the object, but with higher resolution than if the phone were held far enough from the object to capture the entire object in a single frame. Alternatively or additionally, an image of an object may be formed from multiple image frames by using some image frames to improve the quality of the composite image.

Some of the techniques described herein are based on approaches for combining image frames captured with a smartphone. The combination may extend the composite image beyond a single image frame or may replace a first segment of the composite image, derived from a first image frame or a first subset of image frames, with a second segment, derived from a second image frame or a second subset of image frames. The replacement may remove a poor quality segment of the image, thereby improving the overall quality of the composite image. Accordingly, the techniques described herein include techniques for identifying segments of an image for replacement and/or techniques for identifying other segments that may be suitable replacements and/or techniques for forming a composite image from image frames or image segments.

Such techniques for combining image frames may be based on identifying image features in image frames and, in combination with positional data from the smartphone, representing the features as a three dimensional point cloud. Sets of points, each set representing features extracted from an image frame, may be positioned within a common frame of reference representing the composite image. Initially, the sets may be positioned within the point cloud based on position information of the smartphone at the time the associated image frame was captured. This positional information may include information such as the direction in which the camera on the phone was facing, the distance between the camera and the object being imaged, the focus and/or zoom of the camera at the time each image frame was captured and/or other information that may be provided by sensors or other components on the smart phone.

As each set of points is added to the point cloud, its three-dimensional position may be adjusted to ensure consistency with sets of points containing points representing an overlapping set of features. The adjustment may be based on projecting points associated with multiple image frames into a common plane of reference. When there is overlap between the portions of the object being imaged represented in different image frames, adjacent sets of points will likely include points corresponding to the same image features. By adjusting the three dimensional position associated with each set of points to achieve coincidence in the plane between points representing the same features, quality of the composite image can be improved. In this way, a coarse alignment of image frames, associated with the sets of points, may be achieved.

A finer alignment also may be achieved to further improve image quality. As more image frames are gathered and additional sets of points are added to the point cloud, the relative position and orientation of the sets of points may be adjusted to reduce inconsistencies on a more global scale. Such inconsistencies may result, for example, from errors in inertial sensor outputs that accumulate as the smart phone is moved back and forth, nearer and further from an object being imaged. Inconsistencies may also result from an accumulation of small errors in alignment of one set of image points to the next as part of the coarse alignment.

Regardless of the number and nature of alignment processes, processing circuitry may maintain an association between the points in the cloud and the image frames from which they were extracted. Once the relative position, orientation, zoom and/or other positional characteristics are determined with respect to a common frame of reference for the sets of points, a more accurate mapping between the image frames and the composite image may be determined. The composite image then may be rendered by combining separate image frames with this mapping.

Yet a further quality improvement might be achieved by selecting from among multiple image frames to provide detail of one or more segments of the composite image. Because the smart phone may be moved in multiple dimensions, the same portion of an object may be imaged from multiple orientations or at multiple different times. As a result, different image frames may depict the same portion of the object with different quality. The point cloud enables the image frames that depict the same segment of the composite image to be identified. In some embodiments, techniques may be employed to identify relative quality levels of image frames from which information about the same segment may be obtained. Using relative quality information, information from one or more of multiple image frames representing the same segment may be identified and used in rendering the composite image.

Any suitable technique may be used to determine relative image quality. In some embodiments, for example, when the object being imaged is a document, optical character recognition techniques may be applied to segments of the image to assess the quality of those segments. Alternatively or additionally, image processing techniques may be performed to determine whether features within an image segment constitute reflections or shadows. Such techniques, for example, allow identification of segments of low-quality to be replaced by other image segments depicting the same portions of the object being imaged with image segments of a higher quality.

Moreover, in some embodiments, when none of the image frames representing a segment has suitable quality, image fill techniques may be used to avoid distracting features in the composite image. As a specific example, a portable electronic device may be used to acquire an image of a piece of paper or other object held by a user. In that scenario, the user's finger may appear in captured image frames. Processing may determine a segment of the composite image depicting the user's finger. Further processing may replace that segment with a less objectionable segment, such as a segment of a background color of the detected object.

Yet a further improvement in image quality may be achieved by processing portions of the composite image as it is being formed and using results of that processing to guide acquisition of image frames to complete the composite image. In some embodiments, image capture, processing and display as described herein may be performed within a smart phone or other portable electronic device. Accordingly, techniques as described herein to identify segments of the composite image of low quality may be executed in real time—meaning that low-quality segments may be identified while the user is moving a smart phone to acquire an image of an object. This real-time identification of low-quality segments may be used to render a display indicating to the user areas of the object that should be imaged again to improve image quality.

As an example of feedback to a user based on real-time processing, in some embodiments, real-time processing of a composite image may identify reflections or other image artifacts that are being captured. In response, direction may be output to a user to alter the orientation of the smart phone to avoid reflections or other image artifacts. As another example, processing may detect that the object being scanned is a sheet of paper. The size of the paper may be determined automatically such that the extent of the sheet of paper that has been imaged may be compared to the detected page size, allowing portions of the page that have not been imaged to be identified. Feedback to the user may direct the user to image those portions of the page.

An enhancement on this technique, which may be used in some embodiments, entails identifying that the page is warped such that the detected page size is not an accurate representation of the extent of the object to be imaged. Detecting warpage may improve the accuracy of feedback provided to the user about portions of the object that need to be imaged. Detecting warpage alternatively or additionally may be used to apply de-warping algorithms to the captured image, further improving image quality.

As yet a further technique that may be used to improve image quality, information obtained while processing image frames in real time may be used to adjust capture conditions for subsequent image frames. In some embodiments, quality metrics computed on captured image frames may yield an indication of the resolution required for acceptable image quality. Based on these quality metrics, the average resolution of captured images may be adjusted. In some embodiments, the stream of image frames may be captured, and at different image frames in the stream may have different resolutions. The average resolution may be adjusted by changing the ratio between the number of higher and lower resolution image frames in the stream. Alternatively or additionally, real-time processing of image frames may be used to adjust other hardware settings controlling capture of subsequent image frames.

Accordingly, it should be appreciated that, while processing a stream of image frames representing a scan of an object to be imaged, multiple types of feedback may be generated and applied to improve quality of the overall composite image formed. The feedback may be applied to the composite image itself, may be supplied to the user or may be applied to device hardware controlling the imaging conditions.

Turning to FIG. 1, an example of a system 100 to form a composite image is illustrated in which some or all of these techniques may be applied. In this example, image frames are captured using a smartphone 102. It should be appreciated that techniques described herein may be used with image frames captured with any suitable portable electronic device movable in three dimensions, and a smartphone is used only as an example of an image capture device.

As shown schematically in FIG. 1, smartphone 102 can be moved by a user 104 in three dimensions to acquire multiple image frames of an object. The object may be a single item, such as a building, or may be a panoramic scene containing multiple items. Accordingly, the term "object" does not imply a limit on the nature of the content of an image.

In this example, the object is a document 106 and the image frames are assembled into a composite image representing a scan of document 106. Document 106 may be any suitable document that user 104 desires to image using smartphone 102, such as a page from a book or a magazine, a business card, a check for deposit in a bank, a purchase receipt, or any other type of document. Document 106 may also be held by user 104 or located at a distance from user 104, and it is not a requirement that document 106 be placed on surface 108. In this example, the object being imaged is larger than can be represented in a single image frame when the camera of smartphone 102 is zoomed in to acquire image frames with high quality. Accordingly, in this example, smartphone 102 is being used in a mode in which it acquires multiple images of a large object, such that these images may be assembled into a composite image. However, it should be appreciated that some or all of the techniques described herein may be applied to a single image frame capturing an entire object without the need to form a composite image.

Figure 2:
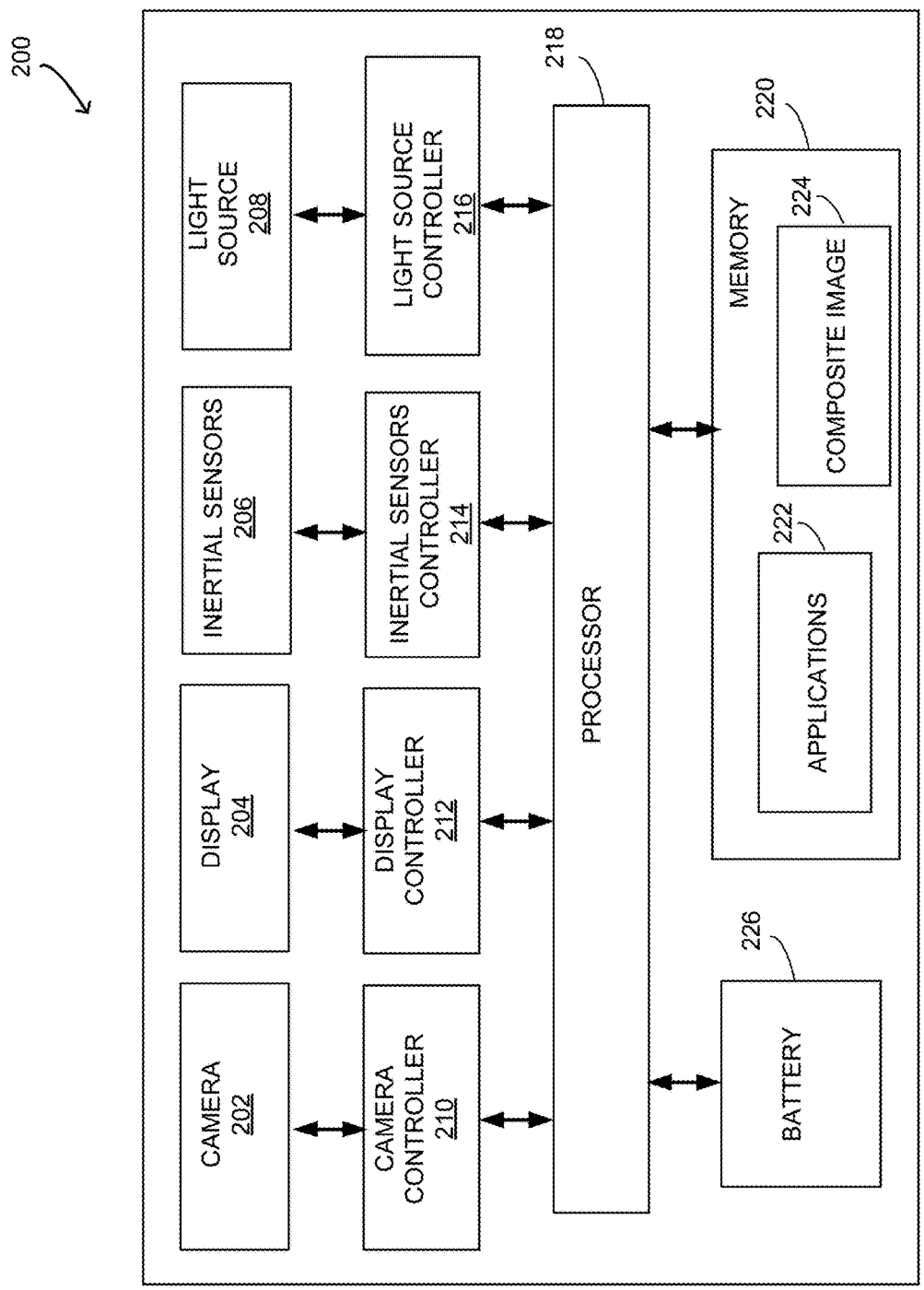
FIG. 2 is a block diagram of components of a mobile device in which some embodiments of the invention may be implemented.

FIG. 2 illustrates components of a smartphone 200 (e.g., smartphone 102 in FIG. 1) which is an example of a portable electronic device that may be used to implement the described techniques. Smartphone 200 may include a camera 202, a display 204, one or more inertial sensors 206 and a light source 208. These and other hardware components of smartphone 200 may be implemented using techniques as are known in the art. Likewise, software controlling the hardware components may be implemented using techniques known in the art. Applications 222, however, may include computer-executable instructions that implement image acquisition and processing techniques as described herein.

Camera 202 may include an imaging sensor which may be any suitable type of sensor. Camera 202 may include a front-facing and/or a rear-facing camera, for example.

Light source 208 may be any suitable source of light, such as, for example, one or more light-emitting diodes (LED). Though, any other types of light source may be utilized. Light source 208 may be controlled to be selectively switched on or off to control motion blur and other parameters.

The inertial sensors 206 may include an accelerometer that tracks relative motion of the smartphone from one image frame to another, a gyroscope that tracks relative motion of the smartphone during a period of time, a compass, an orientation sensor, and any other types of sensors that provide an output indicating of a position, orientation or motion of smartphone 200. Smartphone 200 may also include proximity sensors and other types of sensors.

Smartphone 200 may be moved in three dimensions in any suitable manner, and motion of the device can be detected using inertial sensors 206. In some embodiments, outputs of the sensors may be captured at times that are synchronized with capture of image frames. The outputs of sensors 206, thus, can be related to what the camera 202 was pointing at when an image frame was acquired. This information provided by the inertial sensors 206 may be used to determine the relative positions of what is depicted within image frames such that this information may be used to determine relative positions of image frames within a composite image.

Display, or screen, 204 may be any suitable type of display adapted to display image frames as they are being captured by smartphone 200, information comprising feedback to the user and any other information. In some embodiments, display 204 may be an LED-backlit type of display—e.g., LED-backlit liquid crystal display (LCD) or any other type of display.

Display 204 may be a touch screen displaying various icons and other controls that a user can touch or manipulate in any other manner (e.g., using gestures). Display 204 may display, in a manner that is perceived to a user as a continuous live view, image frames of the object being imaged by camera 202, provide user feedback with respect to controlling imaging conditions and receive user input for controlling operation of smartphone 102 while capturing images of the object. In addition, display 204 may include buttons and other components that are adapted to receive user input.

Operation of each of camera 202, display 204, inertial sensors 206 and light source 208 may be controlled via one or more controllers. In the example illustrated in FIG. 2, smartphone 2002 includes a camera controller 210, a display controller 212, a motion controller 214, and a light source controller 216. These controllers may be implemented using circuitry or other suitable components as are known in the art. Though, it should be appreciated that these controllers are shown by way of example only, as any type and number of controllers may be included in smartphone 200 and the described techniques are not limited to a particular implementation of the smartphone. Moreover, the smartphone may comprise any other controllers, such as a video, audio controller (e.g., multimedia audio controller), and other types of controllers, which may be separate controllers or part of any of the controllers described herein.

Operating parameters of camera 202, display 204, inertial sensors 206 and light source 208 may be controlled via respective controllers adapted to transmit control signals to the devices. For example, operating parameters of camera 202, such as the focal length, auto-focus, exposure time, and others, may be controlled via camera controller 210. Such a camera controller may be implemented using circuitry as known in the art or in any other suitable way. These controllers may receive commands from processor 218 and provide control signals, which implement the command, to associated components. Alternatively or additionally, the controllers may provide information indicating the state of their associated components.

Light source 208 may be controlled, via controller 216 or other controller (e.g., a controller that controls operation of both camera 202 and light source 208), to operate in synchronization with camera 202. Light source 208 may be, for example, LED-based light source (e.g., LED "flash") or other type of light source. The operating parameters of camera 202 and light source 208 may be controlled so that smartphone 200 may be used to capture images in various environments with different lighting conditions, including indoors, outdoors at different times of the days, such as at dusk or dawn, and at direct daylight. In some embodiments, light source 208 may be controlled to operate in a "torch mode," which is an operating mode that allows keeping the light on while capturing images. In this way, light source 208 may allow taking pictures at night. In some scenarios, operating parameters of light source 208 may be controlled by the user. However, in some embodiments, an application executing on processor 218 may determine and/or send commands to control operating parameters of any one or more components.

Controller 214 may be used to control operation of inertial sensors 206, including acquiring values from these values. Though a single controller is shown, it should be appreciated that different inertial sensors (e.g., an accelerometer, a gyroscope, etc.) may have separate controllers.

Operating parameters of display 204 may be controlled via display controller 212 to display image frames captured by smartphone 200 and any other information. In some embodiments, display 204 may be controlled to provide real-time feedback and user guidance. For example, display 204 may be controlled to provide visual guidance to the user with respect to a manner of obtaining the next image frame in the stream of image frames being captured. When the smartphone is operated to image a target, display 204 may provide a live camera view showing a live feed from camera 202. Controller 212 may also acquire user input, such as input that may be entered through a touch-sensitive display.

Smartphone 200 also comprises circuitry for performing processing. In this example, that circuitry includes a processor 218 and a memory 220 coupled to processor 220. Memory 220 may be encoded with computer-executable instructions. Memory 220 may be implemented as at least one computer-readable storage medium that may retain information for a sufficient time to provide the computer-executable instructions in a non-transitory form. As used herein, the term "computer-readable storage medium" encompasses a computer-readable medium that can be considered to be a manufacture (i.e., article of manufacture) or a machine.

The computer-executable instructions may be in many forms, such as applications, or program modules, executed by one or more processors, such as processor 218. Processor 218 may comprise circuitry for executing computer-executable instructions.

The computer-executable instructions stored in memory 220, when executed by processor 218, may implement the described image processing techniques. As shown in FIG. 2, memory 220 may store one or more applications 222 for controlling smartphone 200 to implement the described image processing techniques. Applications 222 may comprise one or more modules for image processing and analysis and forming a composite image by combining multiple image frames. Applications 222 may include optical character recognition modules, motion estimation modules, various modules for image pre-processing, reflection and shadow detection, etc. Some or all of these modules may be executed locally on the smartphone, independently from any Internet connection. Though, some of the modules may interact with servers or other remote computing devices such that some or all of the processing described herein may be performed on those remote computing devices.

In the illustrated example, memory 220 may represent one or more types of memory, which may be implemented using multiple types of memory components. Applications 222, for example, may be stored in a non-volatile portion of memory 220. A volatile portion of memory 220 may store other types of data. For example, memory 220 may also store a composite image 224 formed in accordance with the described techniques, and any other related information, such as information on motion of the smartphone collected from inertial sensors 206, information obtained as a result of image processing—e.g., results of optical recognition processing, and any other information. Moreover, a composite image once formed may be moved from volatile to non-volatile memory.

Further, it should be appreciated that memory 220 may store any other applications that can be executed on the smartphone. The applications may be downloaded and stored in memory 220, accesses over a network, and received in any other manner. One or more of applications 222 may be third-party applications supported via one or more application programming interfaces. Memory 220 may also store an operating system executed by processor 218.

FIG. 2 further shows that smartphone 200 comprises battery 226. It should be appreciated that smartphone 200 may comprise any other components not shown herein for the sake of brevity, such as wireless communication circuits, input/output components, and any other type of components. Further, the specific components illustrated are exemplary of the types of components that may be included in a portable electronic device to achieve one or more functions. For example, though battery 226 is illustrated, any suitable power source may be present.

Figure 3:
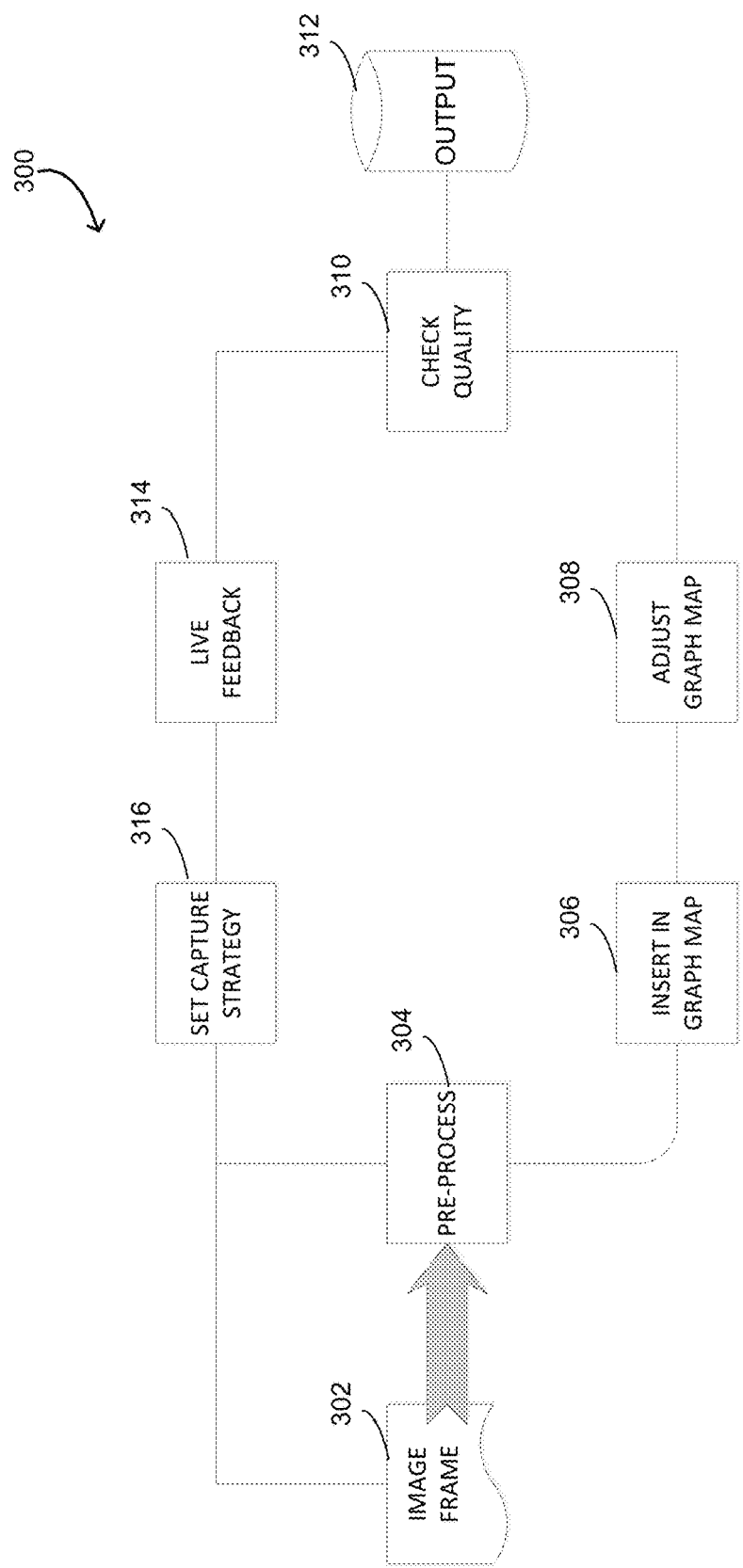
FIG. 3 is a schematic diagram of processing of image frames forming a composite image captured as an object is being imaged, improving quality of the composite image and providing feedback to a user, in accordance with some embodiments.

FIG. 3 illustrates steps of a real-time processing 300 of image frames to form a composite image using one or more techniques to improve image quality in accordance with some embodiments. In this example, multiple types of feedback may be used. Feedback may be generated to guide a user in positioning the smartphone in a way that improves image quality. Alternatively or additionally, feedback may be provided to controllers in the smartphone 200 to impact the conditions under which subsequent images are captured. Alternatively or additionally, feedback may be provided to a component that assembles image frames into a composite image, to influence the construction of the composite image.

The processing may be implemented on a portable electronic device, such as smartphone 200 programmed in accordance with techniques as described herein. Smartphone 102 (FIG. 1) may have multiple operating modes. Different applications, different modules or different portions of an application or module may execute to implement each mode. The selection of a mode may be made based on user input or other conditions that can be detected by processing on smartphone 200.

In the operating mode illustrated in FIG. 3, a new image frame 302 may be captured as part of process 300 using a camera, such as camera 202 (FIG. 2). Image frame 302 may be acquired as part of acquiring a stream of images that are captured as the camera is being pointed towards an object. The captured image frames may be used to render a display in any suitable way. For example, smartphone 200 may operate in a video mode during which image frames are continuously captured and a live view comprising the image frames is displayed to the user.

These captured image frames may be stored in memory for processing and/or later display. The number of image frames stored, and which specific image frames are stored, may also depend on user input. In response to one type of user input, for example, a single image frame may be recorded as a still image. Alternatively, multiple image frames in the sequence may be recorded for combining into a composite image of an object.

To capture image frame 302, a user may point smartphone 102 at an object desired to be scanned. Smartphone 102 may then initiate a process of storing in memory image frames acquired from the camera upon a user instruction or automatically. For example, a button may be pressed or a visual feature (e.g., an icon) may be manipulated to instruct smartphone 102 to obtain image frames representing a scan of a document or other object. Accordingly, though FIG. 3 shows capture of a single image frame 302, the depicted processing may be used to capture a sequence of image frames. One or more aspects of the image capture process may be adjusted over time as successive image frames in the sequence are captured.

Smartphone 102 may be positioned in any suitable orientation with respect to the object and may be held at any suitable distance from the object, as embodiments are not limited to any specific way a user positions and moves the smartphone to scan an object. The object may be of any suitable size, as the described techniques allow obtaining images of objects of different sizes, including large objects, by scanning multiple portions of such objects to capture respective multiple image frames and combining the image frames into a composite image representing an image of multiple portion of the object or the entire object.

Along with acquiring image frame 302, position information for the smartphone at a time when image frame was taken may be determined based on outputs of the inertial sensors of the smartphone (e.g., inertial sensors 206 in FIG. 2). As the smartphone is moved to capture images, the inertial sensors may measure position, orientation, and velocity (i.e., direction and speed of movement) of the smartphone. This information may be used to position image frame 302 within the composite image.

As shown at block 304, acquired image frame 302 may be pre-processed to prepare image frame 302 for further analysis. This may comprise improving quality of image frame 302. The pre-processing 304 may also include analyzing content of image frame 302 to extract features and obtain one or more parameters. Non-limiting examples of the features may comprise lines, edges, corners, colors, junctions and other features. Parameters may comprise sharpness, brightness, contrast, saturation, exposure parameters (e.g., exposure time, aperture, white balance, etc.) and any other parameters.

In some embodiments, the pre-processing 304 may involve analyzing the image frame to determine whether the image frame is suitable for further processing. This determination may be done as a preliminary analysis, before a quality of the image frame is improved to prepare it for being inserted into the composite image. If one or more of the parameters obtained by processing image frame 302 indicate that the quality of the image frame is below a quality required for further processing, image frame 302 may be excluded from further analysis.

In some embodiments, features extracted from image frame 302 may be used to determine a sharpness of the image represented in the image frame which describes the clarity of detail on the image (e.g., a contrast along edges in the image). It may be determined whether the sharpness of the image is below a certain threshold value that may be selected in any manner. If the sharpness of the image is below the threshold, the image frame may be discarded.

Furthermore, if a shutter speed of the smartphone camera is slow and the exposure is therefore excessive, the image in image frame 302 may have a poor quality—e.g., may be blurred. Image frame 302 may be excluded from further analysis if it is of an unacceptable quality.

The pre-processing 304 may comprise determining whether to use the acquired image frame in constructing a composite image. This determination may be made based on, for example, an amount of movement of image frame 302 relative to a preceding image frame. This may be determined based on matching the succeeding image frame 302 and the preceding image frame using respective features of the image frames and motion information associated with each of the image frames, to determine an amount of overlap between the image frames.

The motion information may be obtained using measurements collected by the inertial sensors (e.g., an accelerometer, a gyroscope, etc.) of the smartphone. The motion of the succeeding image frame may be determined as a relative motion with respect to a preceding image frame or as an absolute motion with respect to a reference image frame (e.g., a first image frame in the stream of image frames).

If the amount of movement is within a certain range (e.g., in some embodiments, less than 50%), image frame 302 may be used in building the composite image. However, the amount of movement that is above a certain threshold value (e.g., in some embodiments, greater than 50% relative to a prior image frame) may be taken as an indication that the smartphone is moved out of a certain range within a distance from a position at which a preceding image frame was captured and a position at which the succeeding image frame was captured. In this case, the image frame may be discarded.

Furthermore, if the amount of movement of the image frame is below a threshold value (e.g., in some embodiments, less than 2%), it may be taken as an indication that the smartphone was not moved from a time when the preceding image frame was captured and a time when the succeeding image frame was captured. If it is determined that the succeeding image frame was not displaced relative to the preceding image frame and is therefore a redundant image frame, the succeeding image frame may be discarded. It should be appreciated that acceptable threshold amounts used to determine an absence of movement or an excessive amount of movement may be selected in any suitable manner and may vary in different embodiments.

Regardless of the way in which it is determined whether image frame 302 is to be discarded or whether it can be used further, image frame 302 may be discarded if it is determined to be not acceptable for further processing (not shown in FIG. 3).

If it is determined that image frame 302 is of an acceptable quality for being included in a composite image, a quality of image frame 302 may be improved before inserting the image frame into the composite image.

Because the smartphone may acquire image frames representing the object at different orientations as the user moves the device in three dimensions, rotation of image frame 302 relative to a prior image frame may be detected. The pre-processing 304 may involve unrotating features in image frame 302 or otherwise translate the image frame into another frame of reference to align image frame 302 with the prior image frame.

In some embodiments, the pre-processing 304 may also comprise improving quality of image frame 302 by performing undistortion of an image represented in image frame 302 to correct for lens distortion, correcting for warping of the image, smoothing the image, correcting for white balance and performing any other suitable processing of image frame 302.

Next, pre-processed image frame 302 may be inserted (306 in FIG. 3) into the composite image, interchangeably referred to herein as a graph map. In the embodiment illustrated, a graph map may be a data structure stored in computer memory representing relative positions of image frames within a composite image. A representation of the composite image may be maintained and updated in the memory of the smartphone (e.g., memory 220 in FIG. 2) as multiple image frames are combined in the composite image. In some embodiments, the graph map may be a representation of the composite image such that, when an image is displayed, it is rendered from the graph map in conjunction with other information indicating which portions of the graph map are to be displayed. In other embodiments, the composite image may be stored as values for pixels in an image, which may be directly rendered on a display, or in any other suitable format. Alternatively, as each new image frame is integrated into a composite image, it may change the values associated with the pixels. Accordingly, insertion of an image frame into the composite image may be performed in any suitable way, including by integrating visual information acquired from the image frame into a representation of the composite image or a data structure from which the composite image is rendered.

In some embodiments, preprocessing may determine whether to insert an image frame into the composite image. For example, image frame 302 may be inserted into the composite image when image frame 302 overlaps to an acceptable degree with a prior image frame. The prior image frame may be an image frame immediately preceding the succeeding image frame 302 or other prior image frame.

Image frame 302 may be combined with other image frames in the composite image based on the features identified for the image frame which may be extracted during the pre-processing 304. The features, combined with positional data determined for image frame 302, may be represented as points in a three dimensional point cloud. Processing circuitry of the smartphone may maintain an association between the points in the cloud and image frame 302 from which they were extracted.

In some embodiments, described in more detail below, image frame 302 may be represented as a set of points in the point cloud and may be initially positioned within the point cloud based on the position information of the smartphone at the time image frame 302 was captured. Image frame 302 may be positioned within the point cloud based on a position of a prior image frame within the point cloud.

Once image frame 302 is inserted into the composite image, the composite image including the image frame may be adjusted, as shown at block 308 in FIG. 3. The adjustment may comprise processing the composite image to improve its quality. Any one or more techniques may be applied at block 308 to adjust the graph map storing the data representing the composite image.

The adjustment at block 308 may be based on projecting points associated with multiple image frames in the point cloud to a common reference plane representing the composite image. When the portions of the object being imaged represented in different image frames overlap, adjacent sets of points may include points corresponding to the same image features. The three dimensional positions of sets of points may be adjusted so that the points representing the same features overlap in the reference plane. In this way, a coarse alignment of image frames, associated with the sets of points, may be achieved.

Accordingly, image frame 302 may be coarsely positioned by matching the set of points representing the image frame with respect to one or more sets of points representing previous overlapping image frames (e.g., image frames captured prior to the current image frame).

The quality of the composite image may be further improved by a finer alignment of the sets of points each representing an image frame in the point cloud. Such finer adjustment may be performed to reduce inconsistencies based on "global" positioning of image frames. Global positioning may involve positioning an image frame within the composite image based on positioning of image frames beyond the immediately preceding image frame. The finer alignment may involve adjusting relative position and orientation of the sets of points to reduce inconsistencies resulting, for example, from errors in inertial sensor outputs that accumulate as the smartphone is moved back and forth, nearer and further from the object being imaged.

Inconsistencies may also result from an accumulation of small errors in alignment of one set of image points to the next as part of the coarse alignment. As a set of points extracted from each incoming image frame are added to the point cloud by coarsely positioning the set relative to prior image frames, an image frame may become aligned to more than one prior image frame. The stream of image frame may be thus taken as closed in a "loop." When the "loop closing" is detected, an inconsistency between the position of the image frame in different alignments may exist. The fine alignment may reduce this inconsistency to achieve a more accurate mapping between the image frames.

Further improvement of the quality of the composite image may be achieved by using image fill techniques that allow avoiding distracting features in the composite image. For example, a user finger, which may appear on an image of an object being held by a user, may be removed from the image and a corresponding area may be filled with content similar to that in other areas of the image.

It should be appreciated that the quality of the composite image may be improved in various other ways, including by selecting which image frames or portions of image frames to use in rendering a composite image. In some embodiments, processing at block 308 may entail identifying portions of the data captured from a sequence of image frames to omit from the composite image or to replace with other data. As an example, processing at block 308 may identify that the object being imaged includes undesirable items. Portions of image frames depicting those undesirable items may be removed or replaced in the composite image. As a specific example, in the scenario illustrated in FIG. 1, user 104 may be holding document 106 with a finger. That finger may appear in the composite image, but processing at block 308 may remove it from the composite image. A technique for processing to identify a finger and remove it from an image is described below.

After the composite image is adjusted at block 308, process 300 may follow to block 310 where the quality of the composite image may be checked and improved. This may be performed in real-time, as image frames of the object being scanned are being captured. The process of quality checking and improving may comprise identifying areas of different quality in the composite image. This may include selecting from among multiple image frames to provide details of one or more segments of the composite image. In some embodiments, techniques may be employed to identify relative quality levels of image frames from which information about the same segment may be obtained. Using relative quality information, information from one or more of multiple image frames representing the same segment may be identified and used in rendering the composite image.

Image quality as it relates to an overall image or one or more image frames combined into a composite image may be determined in any one or more suitable ways. In some embodiments, image frames used in rendering a composite image are stored in memory such that each can be separately processed or adjusted before being used to render the composite image. However, there is no requirement that the processing at block 310 be performed on entire image frames or single image frames. Any suitable portion of the image data acquired may be processed to determine image quality and adjusted to improve image quality.

As a specific example, processing at block 310 may involve determining the relative image quality based on quality of optical character recognition (e.g., when the object being imaged is a document with characters, the likelihoods associated with identifying characters may indicate image quality), presence of reflections or shadows, and other artifacts. In this way, segments of low quality may be identified and replaced by other image segments, depicting the same portions of the object being imaged with a higher quality. The quality of the composite image may be improved in any other manner, as the described techniques are not limited in this respect.

Next, process 300 may provide the composite image (312) as part of an output. The output, for example, may be directed to a display of the portable electronic device such that, as the composite image is constructed and adjusted, the evolving image will be displayed in real time to a user. Though, other uses may be made of the output. For example, the composite image may be stored in memory of the smartphone (e.g., memory 220 in FIG. 2). The composite image may be rendered on the display of the smartphone in any suitable manner and may be updated and adjusted as scanning of the object progresses. Regardless of the number and nature of alignment processes, processing circuitry may maintain an association between the points in the point cloud and the image frames from which they were extracted.

Once an image of the object is completed, the image may be used in any suitable way. For example, it can be displayed, stored in the memory of the smartphone, printed out, transmitted via a network (e.g., in the email message), provided to an application, shared with other smartphones (e.g., via wireless image sharing), and used in any other manner.

Forming the composite image in accordance with some embodiments may include analyzing portions of the composite image as it is being formed and using results of the analysis to guide acquisition of further image frames to complete the composite image. Accordingly, as shown in FIG. 3, process 300 may include providing a real-time ("live") feedback (314) to the user of the smartphone. Techniques as described herein to identify segments of the composite image of low quality may be executed in real time—while the user is moving the smartphone to acquire an image of an object. This real-time identification of low-quality segments may be used to render a display indicating to the user areas of the object that should be imaged again to improve image quality. Such areas may be indicated to the user in any suitable manner. For example, a colored frame may be displayed emphasizing the area that needs to be reimaged.

When the object being imaged is a sheet of paper, the size of the paper may be determined automatically such that the extent of the sheet of paper that has been imaged may be compared to the detected page size, allowing portions of the page that have not been imaged to be identified. Feedback to the user may direct the user to image again the portions of the page that have not been imaged.

Additionally or alternatively, it may be indicated to the user in a suitable manner in which way to position the smartphone to capture additional images of an object being imaged. For example, position information may be output to the user to alter the orientation of the smartphone to avoid reflections or other image artifacts. Such position may indicate a direction or orientation of the smartphone to avoid creating image artifacts.

As another way of providing feedback, process 300 may comprise controlling settings of hardware that capture subsequent image frames. FIG. 3 shows that process 300 includes setting capture strategy for a next image frame in the stream of image frame, shown by block 316 in FIG. 3. Setting the capture strategy may include adjusting one or more operating parameters of one or more hardware components of the smartphone, such as camera 202, display 204, inertial sensors 206, light source 208 and any other component which can be controlled to operate to capture images of the imaged target. As a specific example, commands may be sent to camera controller 210 to adjust the zoom or focus of the camera. Each of these hardware components may be controlled via a corresponding controller—e.g., controllers 210, 212, 214 and 216 in FIG. 2—or any other type of controller.

Alternatively or additionally, process 300 may entail adjusting processing of one image frame based on a prior image frame. In the example of FIG. 3, feedback is shown provided to pre-processing block 304. This feedback, for example, may be applied to select parameters to adjust during pre-processing or the amount of adjustment of one or more parameters.

Figure 4:
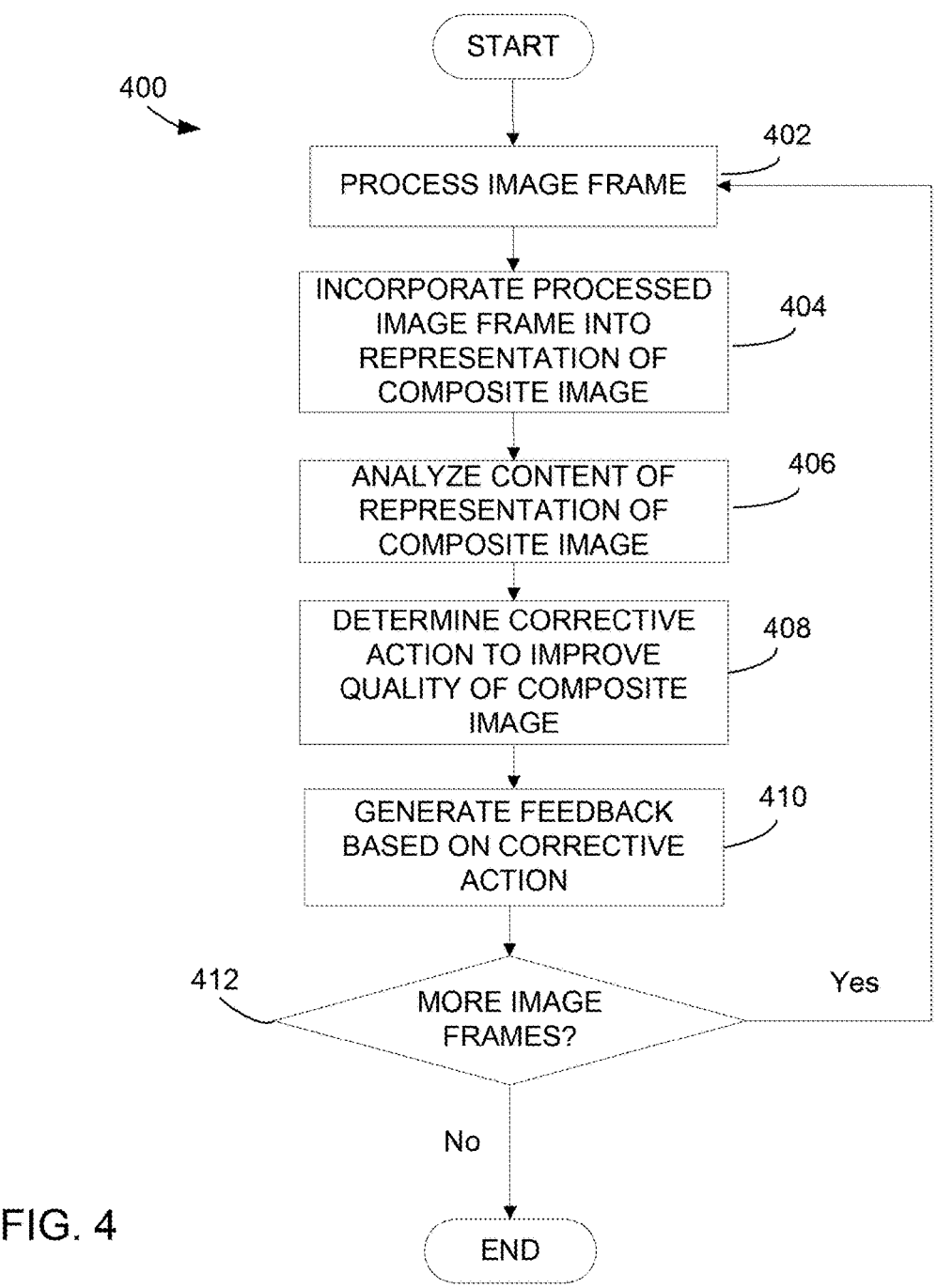
FIG. 4 is a flowchart of processing of image frames to improve a quality of a composite image and providing feedback to a user, in accordance with some embodiments.

In some embodiments, feedback on the image processing may be provided in various ways based on processing of an image frame and analysis of the composite image. FIG. 4 illustrates an overview of an exemplary process 400 of providing feedback in accordance with some embodiments. Process 400 may be implemented by a processor within a smartphone or may be performed under the control of any suitable processor.

Process 400 may start, for example, when a smartphone operated to scan a scene captures an image frame comprising an image of the scene. The scene may comprise any types of object, made up of any number and type of items, and may be imaged as the smartphone is moved in different orientations in three dimensions. An image of the object being imaged may be displayed as a real-time live view. Motion sensors of the smartphone may provide output indicating a position of the smartphone at a time when the image frame was captured.

At block 402, the captured image frame may be processed, which may include extracting various features from the image frame, unrotating some or all of the features as needed, correcting for lens distortion, smoothing, white balancing, and performing other types of pre-processing to correct one or more characteristics of the image frame. In some embodiments, it may be determined whether to discard the image frame because its quality is below a minimum acceptable requirement, or whether to proceed with using the image frame as part of building the composite image. In the example illustrated, the image frame is determined to be acceptable for further processing.

Next, at block 404, the processed image frame may be incorporated into a representation of the composite image. As discussed above, the representation may comprise a three dimensional point cloud comprising sets of points representing features of respective image frames. The image frame may be coarsely positioned within the point cloud based on a position of a preceding image frame positioned within the point cloud. The content of the representation of the composite image may then be analyzed, at block 406. The analysis may include determining quality of the composite image.

Based on the quality analysis, one or more corrective actions may be determined to improve the quality of the composite image, at block 408. The corrective actions may comprise reducing inconsistencies in the composite image to finely align image frames within the composite image. Multiple others corrective actions may be performed.

Feedback based on the corrective action may then be generated, at block 410. The feedback may comprise indicating to the user that a portion of the composite image needs to be imaged again, that a portion of the object which was imaged has a poor quality, etc. The feedback may be generated in real-time, as the smartphone is being used to image the scene.

In some embodiments, the feedback may be provided so that the user may adjust positioning of the smartphone while imaging the scene. Feedback to the user may be provided in any suitable way. In some embodiments, that feedback may be provided through a user interface of the smartphone 200. A suitable user interface may include, for example, a display, through which the feedback may be displayed graphically or as text, or an audio output, through which the feedback may be presented in an audible fashion.

In some embodiments, an instruction to adjust one or more operating parameters of a camera of the smartphone, including its position, orientation or rotation, may be generated. The instruction may be provided as a visual indication to the user of the smartphone or may be generated automatically as a control signal to one or more hardware components of the smartphone.

Process 400 may then follow to block 412 where it may be determined whether there are more image frames to be captured. For example, as the smartphone is used to scan a scene, multiple images of different portions of the scene may be captured until a user provides input representing a stop command. Accordingly, process 400 may execute continuously as new image frames are added to the composite image and the composite image is adjusted based on the new frames. While the scan continues, a next image frame may be acquired and process 400 may loop back to block 402. Each new frame may be used to expand the extent of the object represented in the composite image. Alternatively or additionally, as image frames are captured that depict portions of an object already depicted in captured image frames, the new image frames may be combined in any suitable way with the previously captured image frames in the overall composite image. If the image acquisition is completed, process 400 may end.

Figure 5:
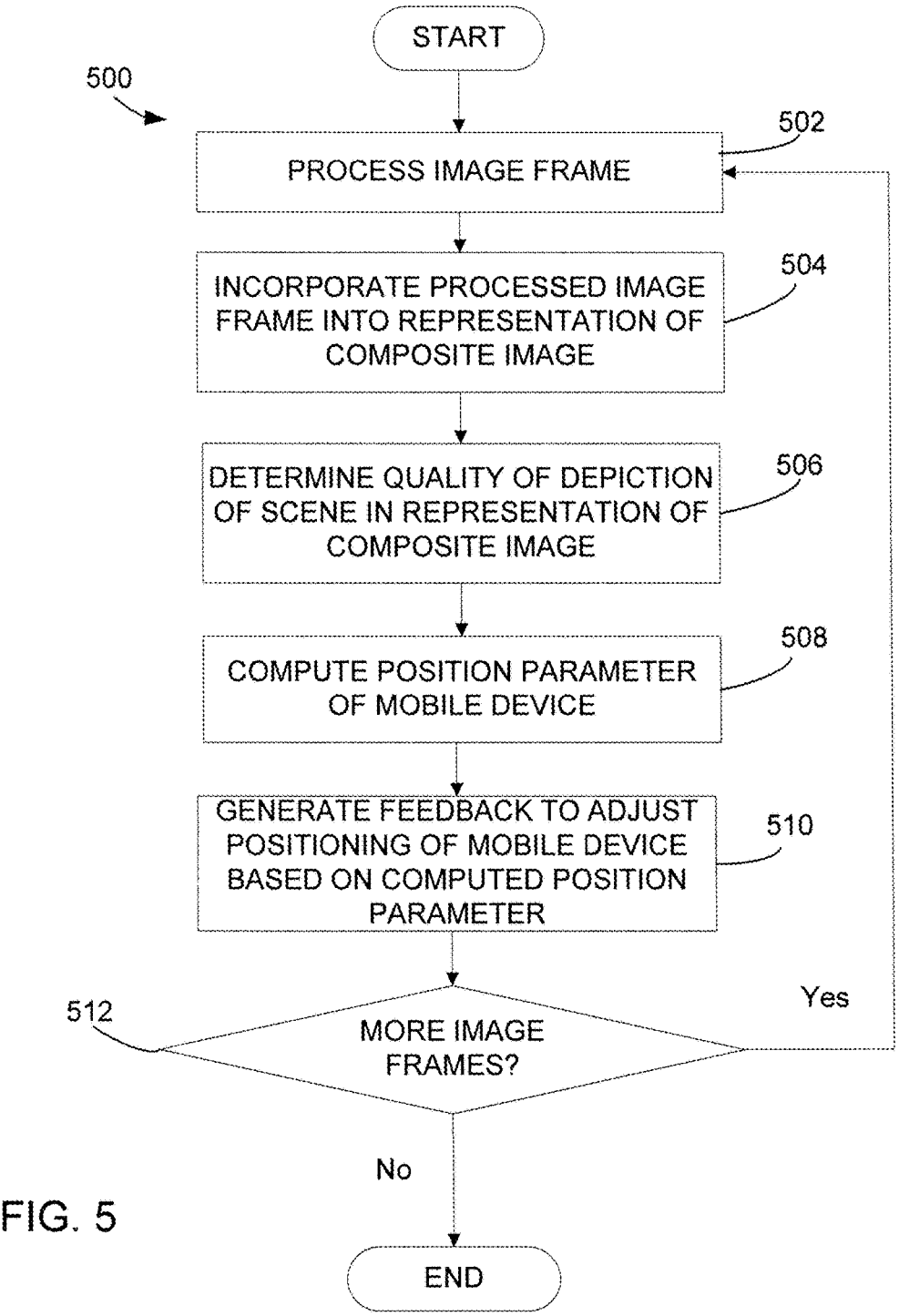
FIG. 5 is another flowchart of a process of processing of image frames to improve a quality of a composite image and providing feedback to a user, in accordance with some embodiments.

FIG. 5 illustrates another process 500 of providing feedback to the user of the smartphone based on real-time processing of image frames captured as part of a scan of an image. Process 500 includes pre-processing of a captured image frame, at block 502, and incorporating the processed image frame into the representation of the composite image, at block 504, which may be performed similar to processing at blocks 402 and 404 in FIG. 4. As with process 400, process 500 may be performed under control of a processor of a smartphone executing stored computer-executable instructions or using other suitable circuitry within a smartphone, or in any other suitable way.

As shown in FIG. 5, at block 506, quality of a depiction of a scene in the representation of the composite image may be determined. This analysis may involve analyzing the content in one or more portions of the composite image for characteristics representative of a reflection, a shadow, or other artifacts. The quality analysis may also comprise analyzing a result of applying an optical character recognition to one or more portions of the composite image.

The determination of the quality of the depiction of the scene in the representation of the composite image may include analyzing image features in an image frame and image features in one or more prior image frames representing overlapping portions of the scene. The image features may comprise a specular highlight and other features. If one or more image features compromising quality of the image frame are detected in the image frame, one or more characteristics of the image frame may be corrected before incorporating the image frame into the composite image.

At block 508, a position parameter of the smartphone may be computed. Because the smartphone may be moved in an unrestricted manner in three dimensions and can be used to capture images of a scene at different distances and different angles relative to a plane of the scene, the computed position parameter may comprise at least one position parameter that does not define a location within a plane parallel to a plane of the scene, at least one position parameter that defines a spacing between the scene and the smartphone, at least one position parameter that defines an angle of the smartphone with respect to a normal to the scene, and/or other type of parameter, such as a parameter indicating where to position the smartphone to acquire subsequent image frames.

Next, feedback to adjust positioning of the smartphone based on the computed position parameter may be generated, at block 510. The feedback may include guidance to the user with respect to further operation of the smartphone to capture images of the scene. For example, when a portion of the scene has not been imaged yet or has been imaged to yield low quality images, an indication to position the smartphone to rescan that portion of the scene may be provided as a feedback. Any other forms of the feedback may be provided additionally or alternatively. The feedback may be provided in real-time, while the image frames of the scene are acquired.

Process 500 may then follow to block 512 where it may be determined whether there are more image frames to be captured, which may be the case when the scan of the scene is not yet completed and the user continues to operate the smartphone to capture images. While the scan continues, a next image frame may be acquired and process 500 may loop back to block 502. If the image acquisition is completed (e.g., if user input was detected instructing the smartphone to stop the scan), process 500 may end.

In some embodiments, operation of a camera of a smartphone (e.g., camera 202 of smartphone 200 in FIG. 2) may be controlled based on processing of images captured by the camera, and analyzing and improving a quality of the images, as a composite image is being built. The camera may be controlled, for example, via a controller such as controller 210 (FIG. 2).

Figure 6:
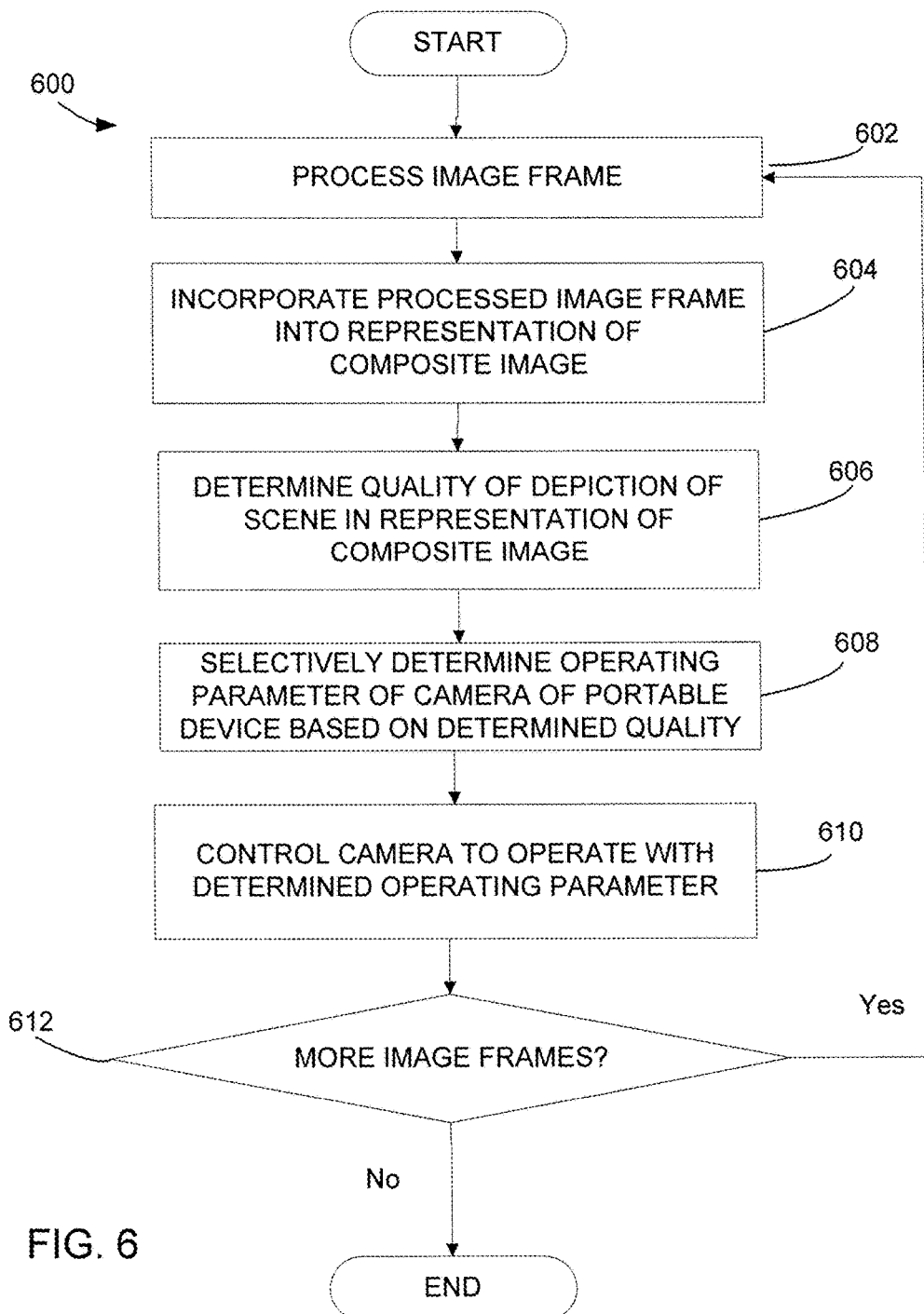
FIG. 6 is a flowchart of processing of image frames to improve a quality of a composite image and controlling operation of a camera of a smartphone, in accordance with some embodiments.

FIG. 6 illustrates generally a process 600 of forming a composite image from multiple image frames representing images of a scene acquired using a smartphone. As with processes 400 and 500, process 600 may be implemented under the control of a processor on the smartphone or in other suitable processing circuitry. Process 600 may comprise sequential processing of image frames as they are captured and added to the composite image. It should be appreciated that, though shown as separate processes, the processes 400, 500 and/or 600 may be performed concurrently as a sequence of image frames is being captured. These processes may be performed on separate processing cores or may be performed on a single processing core using a time multiplexing arrangement.

As illustrated in FIG. 6, process 600 may include pre-processing of the captured image frame, at block 602, and incorporating the pre-processed image frame into the representation of the composite image, at block 604, which may be performed similar to processing at blocks 402 and 404 in FIG. 4. In process 600, sequentially processing image frames comprises, for image frames captured after controlling the camera to operate with the determined operating parameter, prior to incorporating an image frame in the representation of the composite image frame, adjusting the image frame based on the determined operating parameter of the camera.

Next, at block 606, a quality of depiction of the scene in a portion of the representation of the composite image may be determined. The determined quality of depiction of the scene may be expressed as a value of a metric.

As shown in FIG. 6, at block 608, an operating parameter of a camera of the smartphone may be selectively determined based on the determined quality of the depiction of the scene. In some embodiments, determining the operating parameter may comprise activating a flash on the camera when the value of the metric is below a threshold. Additionally or alternatively, selectively determining the operating parameter may comprise adjusting the amount of data captured in the image frame when the value of the metric is below a threshold.

The camera of the smartphone may then be controlled to operate with the determined operating parameter, at block 610.

Process 600 may then follow to block 612 where it may be determined whether there are more image frames to be captured, which may be the case when the scan of the scene is not yet completed and the user continues to operate the smartphone to capture images. While the scan continues, a next image frame may be acquired and process 600 may return to block 602. If the image acquisition is completed (e.g., if user input was detected instructing the smartphone to stop the scan), process 600 may end.

When a smartphone or any other mobile device is used to capture and process multiple image frames in accordance with some embodiments, the device may be moved freely back and forth, and closer and nearer and further from a scene being imaged. As a result, the image frames may be acquired in different planes and oriented differently with respect to the each other and a plane of the scene. In this way, the scene or portions of the scene may be captured in image frames positioned in planes that are not parallel to each other or parallel to the plane of the scene. More generally, the frame of reference of each image frame may be different.

Accordingly, to account for the three dimensional space in which image frames are acquired, image frames may be processed to map the image frames into a common frame of reference. In this common frame of reference, the relative positions of the image frames may be determined or adjusted. The positions within the common frame of reference may define the position of the image frames within the composite image. In the embodiment illustrated in FIG. 3, the positions within the common frame of reference may initially be used to insert an image frame into a graph map, such as at block 306.

In some embodiments, mapping of an image frame may be performed based on features in the image frame. Features, such as corners or bright points, may be identified using known image processing techniques. The positions of these features within the common frame of reference may initially be estimated based on sensor outputs that provide an indication of motion and/or orientation of the smartphone.

Various factors may be considered in mapping features from an image frame to the common frame of reference. An orientation of the smartphone, distance from the object being imaged, zoom of the camera within the smartphone and any other sensor output providing positional information. This positional information may be used to compute a location of portions of an object being imaged at the time the image frame was acquired. This information may be used to translate features of an image frame to the common frame of reference.

Figure 7:
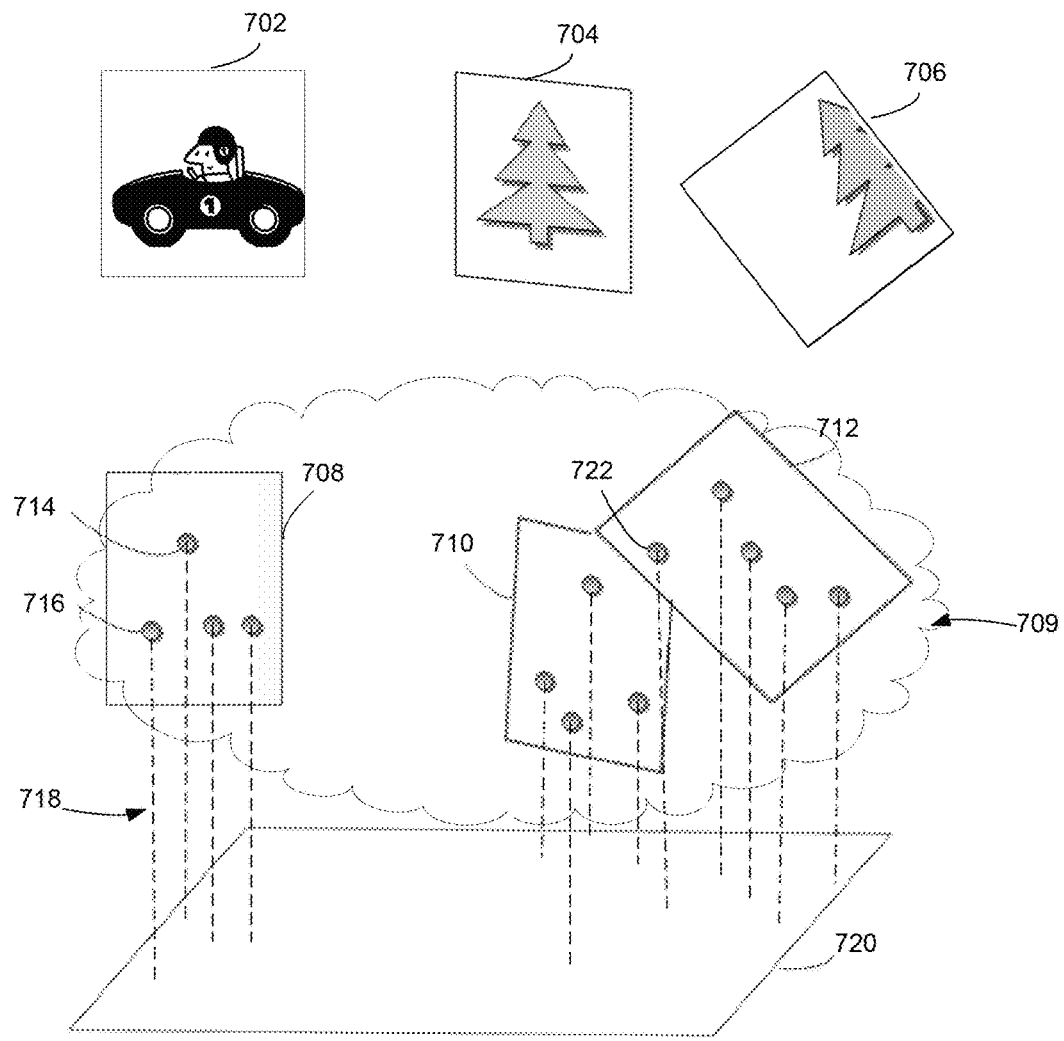
FIG. 7 is a sketch of a representation of image frames in a three dimensional point cloud, in accordance with some embodiments.

In some embodiments, the features within the image may be depicted as points, such that the features of the image frames may collectively be regarded as defining a three dimensional point cloud. Such a point cloud, representing multiple image frames and their relationships, is shown in FIG. 7. The point cloud may be represented, such as by data characterizing it that is stored in a computer memory, to maintain an association between image frames and sets of points representing features extracted from the image frames. Moreover, the point cloud may be maintained in a way that allows the relative position and orientation of the points associated with an image frame to be adjusted.

As discussed above, when an image frame is captured, processing of the image frame includes extracting features. The features may also be processed to improve subsequent feature matching. Each image frame may be represented as a set of points representing features extracted from that image frame. FIG. 7 illustrates schematically exemplary image frames 702, 704 and 706 each representing a portion of a scene and acquired as the scene is being scanned by a smartphone. In this example, image frames 704 and 706 represent different portions of the same object, a tree.

Once features from each of the image frames 702, 704 and 706 are extracted, the image frames may be associated with sets of points representing the features in a three dimensional point cloud space 709. The point cloud space may be represented in any suitable way, but, in some embodiments, is represented by data stored in computer memory identifying the points and their positions. As shown in FIG. 7, image frame 702 may be represented as a set of points 708, image frame 704 may be represented as a set of points 710, and image frame 706 may be represented as a set of points 712. Image frame 702 includes, for example, points 714 and 716 representing corresponding image features of the image (a car) represented in image frame 702. Other points in image frame 702 and points in image frames 704 and 706 are not labeled for the sake of simplicity of the representation.

The sets 708, 710 and 712 may initially be positioned within the point cloud 709 based on position information of the smartphone at the time the associated image frame was captured. Though, subsequent processing may adjust the positioning of the sets within the point cloud space to create a composite image that more accurately represents a scene being imaged. Alternatively or additionally, one or more of the sets may be deleted or altered, also as a result of processing to provide a desired composite image.

An image matching approach may be used to adjust the relative positions of the sets of points. In acquiring a sequence of image frames representing a scan of an object, the smartphone may be operated to capture image frames at a sufficient rate that successive image frames will at least partially overlap. By identifying overlapping portions of image frames that are adjacent in the sequence, the relative position of those image frames may be adjusted so that those features align.

Prior to matching the points representing features in adjacent images, the points may be associated with a common frame of reference for comparison. A common frame of reference, allowing comparison and alignment between successive image frames, may be created by projecting the points associated with each image frame into a common plane. Points in sets of points 708, 710 and 712 may be projected, as shown by dashed lines 718 in FIG. 7, into a common plane of reference 720. Common plane of reference 720 may represent the two-dimensional composite image that is being built as the scan progresses.

In some embodiments, as each set of points is projected, its three-dimensional position may be adjusted to ensure consistency with sets of points containing points representing an overlapping set of features. For example, as shown in FIG. 7, set of points 710 and set of points 712 may include an overlapping set of features, such as a feature represented by a point 722. This point may correspond to the same feature in images 704 and 706. Coarse alignment of image frames in accordance with some embodiments may comprise adjusting a three dimensional position associated with each set of points to achieve coincidence in plane 720 between points representing the same features, which may improve quality of the composite image rendered using those three dimensional positions for the image frames to assemble the composite image.

As more image frames are gathered and additional sets of points are added to the point cloud, the relative position and orientation of the sets of points may be adjusted to reduce inconsistencies, to thus achieve global alignment of the image frames. Thus, sets of points in point cloud 709 may be repeatedly adjusted and projected to plane 720 to form the composite image that is displayed to the user on a user interface, such as the user interface on a display of a camera of the smartphone, or otherwise processed.

Figure 8:
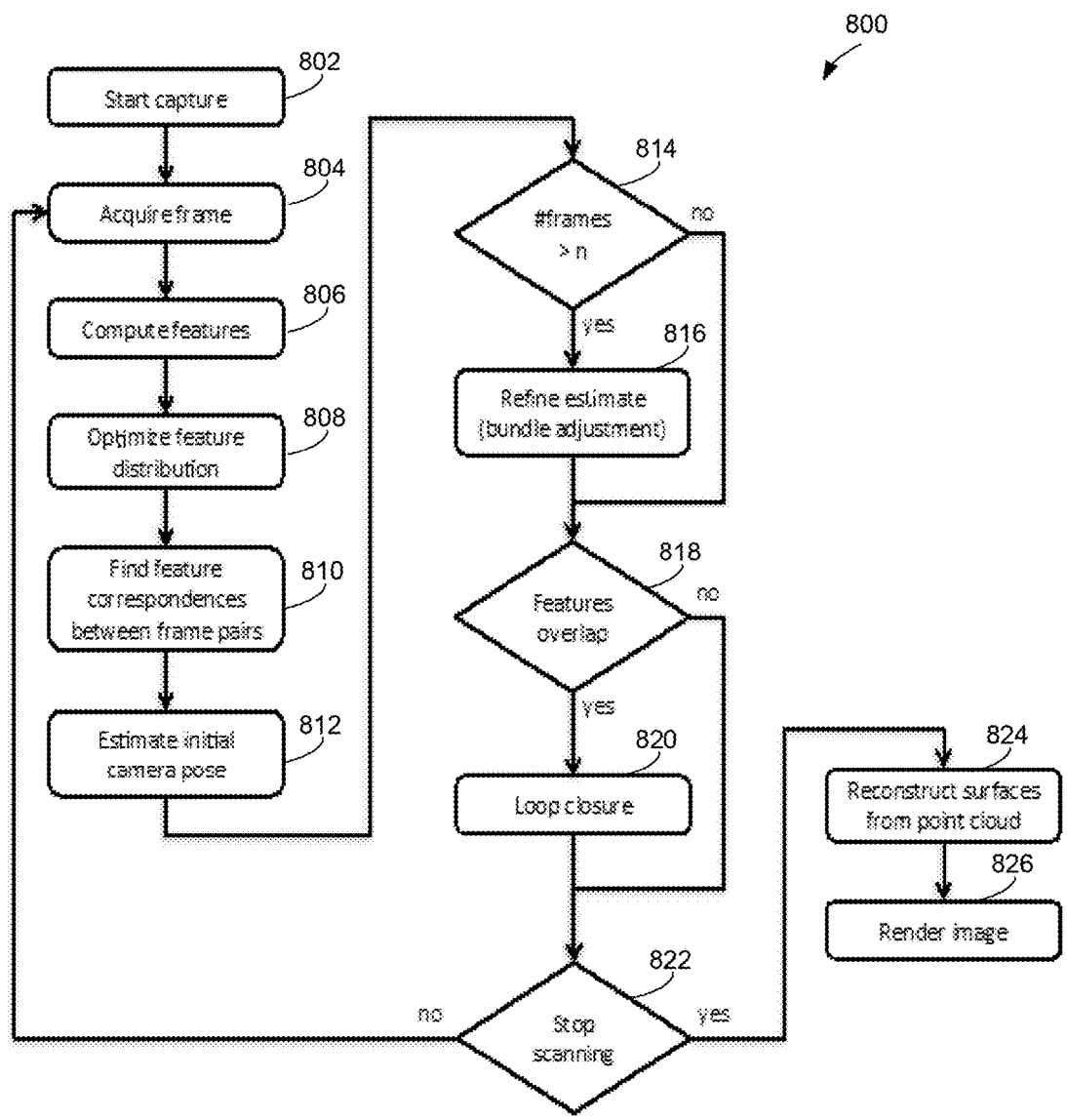
FIG. 8 is a flowchart of a process of building a composite image by representing features of image frames in the three dimensional point cloud, in accordance with some embodiments.

FIG. 8 illustrates a process 800 of building a composite image by representing features of image frames in the three dimensional point cloud, in accordance with some embodiments. Process 800 may be implemented by an application executing on a processor a smartphone, as described above, or using any other suitable processing circuitry.

Process 800 may start at block 800 when capturing a stream of image frames of an object by a smartphone (e.g., smartphone 102 in FIG. 1) is initiated. The capturing may be initiated based on user input or any other type of trigger. In some embodiments, the smartphone may be instructed to operate in a capture mode to acquire image frames using a camera (e.g., camera 202 in FIG. 2). The object may be any object which can be imaged as the smartphone is moved in the three-dimensional space.

An image frame may be acquired at block 804. Next, the acquired image frame may be processed by computing that extracts one or more image features from the image frame. The features may be any suitable types of features, such as color, shape, texture features, etc. For example, lines, edges, corners, contours, junctions and any other features may be extracted. A subset of the extracted features may be selected at block 808. In some embodiments, this selection may involve optimizing the feature distribution to achieve approximately the same number of features in each image frame from the image frames that form a composite image, where that number of features may be independent of texture characteristics of the image frames. However, any suitable approach for selecting suitable features for use in matching image frames may be applied.

As shown in FIG. 8, next, at block 810, process 800 may find feature correspondences between pairs of image frames. A succeeding image frame may be compared with one or more previously captured image frames to identify corresponding features between each pair of frames. Such correspondences may be identified based on the nature of the feature characteristics of the image frames surrounding the features or other suitable image characteristics.

In some embodiments, the processing at block 810 may involve using a set of features computed for a respective image frame to estimate the epipolar geometry of the pair of the image frames. Each set of features may be represented as a set of points in a three-dimensional space. Thus, the image frame acquired at block 804 may comprise three-dimensional points projected into a two-dimensional image. When at least one other image frame representing at least a portion of the same object, which may be acquired from a different point of view, has been previously captured, the epipolar geometry that describes the relation between the two resulting views may be estimated. The epipolar geometry may be estimated using techniques as are known in the art.

In some embodiments, identification of feature correspondences may include searching, for each point in the image frame, for a corresponding feature in another image frame along a respective epipolar line. The three-dimensional points representing the image frame may be re-projected to establish correspondences to points that may be visible in the current image frame but not in the immediately preceding image frame—e.g., when the current image frame overlaps with a prior image frame other than an immediately preceding image frame in a stream of image frames.

At block 812, an initial pose of a camera indicating its position and orientation with respect to an object being scanned at a time when an associated image frame was acquired may be estimated, at block 812. The initial pose may be estimated based on output from inertial sensors (e.g., sensors 206 in FIG. 2) and/or any other types of sensors of the smartphone. It should be appreciated that the initial camera pose may be estimated simultaneously with processing at one or more of the blocks 804-810.

After the image frame is inserted into a composite image, the initial pose of a succeeding image frame may be adjusted based on poses of image frames that are already present in the composite image and at least partially overlap with the succeeding image frame. In some embodiments, the adjustment may be performed for the entire composite image. Though, in some embodiments, poses of a portion of image frames in the composite image may be adjusted. In some embodiments, the simultaneous adjustment of poses of a number of overlapping images may be referred to as bundle adjustment.

In some embodiments, initially, the set of points representing features extracted from the image frame, may be positioned within a three-dimensional point cloud based on position information of the smartphone at the time the associated image frame was captured, such as the estimated pose of the smartphone. As each set of points is added to the point cloud, its three-dimensional position may be adjusted to achieve coincidence in the plane between points representing the same features, thereby improving the quality of the composite image. In this way, a coarse alignment of the image frames may be performed.

The coarse alignment is based on a local comparison of an image frame to one or more easily preceding image frames that were acquired in a sequence of frames. As more image frames in a sequence of image frames are processed, additional information becomes available to refine the coarse estimation of the relative positions. Accordingly, it may next be determined, at decision block 814, whether the number of image frames that have been captured is greater than a threshold n. If it is determined that the number of image frames is greater than the threshold, process 800 may follow to block 816 where the initial pose of one or more image frames may be adjusted. The adjustment may be performed by solving an optimization problem, such as, for example, a bundle adjustment, or other type of problem. Bundle adjustment algorithms can simultaneously solve for locations of all of the camera positions to yield globally consistent solutions. The bundle adjustment or other suitable techniques may be used to generate the point cloud comprising sets of points each representing features extracted from an image frame.

If it is determined that the number of image frames is smaller than the threshold, process 800 may branch to decision block 818 where it may be determined whether one or more features of the succeeding image frame overlap with at least one prior image frame other than the immediately preceding image frame. If this is the case, a "loop closure" may be detected, at block 820. An example of a loop closure, in a two-dimensional space, is illustrated in FIG. 15, below. When a loop closure is detected, the three-dimensional points may be re-projected into a current viewpoint so that the three-dimensional positions and camera poses can be optimized. When no loop closure is detected based on the features overlap, process 800 may follow to block 822, as shown in FIG. 8.

At decision block 822, it may be determined whether the scanning of the object is to be stopped. The scanning may be stopped based on user input, passage of a predetermined time, determination that image data for the area representing an object is required, or in any other manner. If it is determined that the scanning of the object is completed, process 800 may follow to block 824, where a surface of the scanned object may be reconstructed using the three-dimensional point cloud. The surface reconstruction may include de-warping, refection removal and other adjustments to improve the quality of the composite image. In this way, a geometry of the scanned object may be determined. The positions of the acquired image frames relative to that geometry have also been determined. An image of the scanned object may then be rendered, at block 826. Because the geometry of the scanned object has been determined, a viewpoint of the output image can be determined.

When it is determined, at decision block 822, that the scanning of the object is not completed, process 800 may branch back to block 804 where a next image frame may be acquired by scanning the object.

In the embodiments described above, image frames representing images of an object being imaged may be captured by a smartphone moved, during scanning process, into multiple orientations in the three dimensional space. However, by mapping features representing the image frames into a common plane of reference, processing may be performed in a common reference plane much the same way that processing might be performed on image frames acquired by a portable device moving with a single orientation. In the following, processing in a common reference plane is described for ease of illustration. It should be remembered, however, that when adjusting estimates of the relative position between image frames, the possibility of motion in all dimensions in the three-dimensional space may be accounted for in the adjustments.

Figure 9:
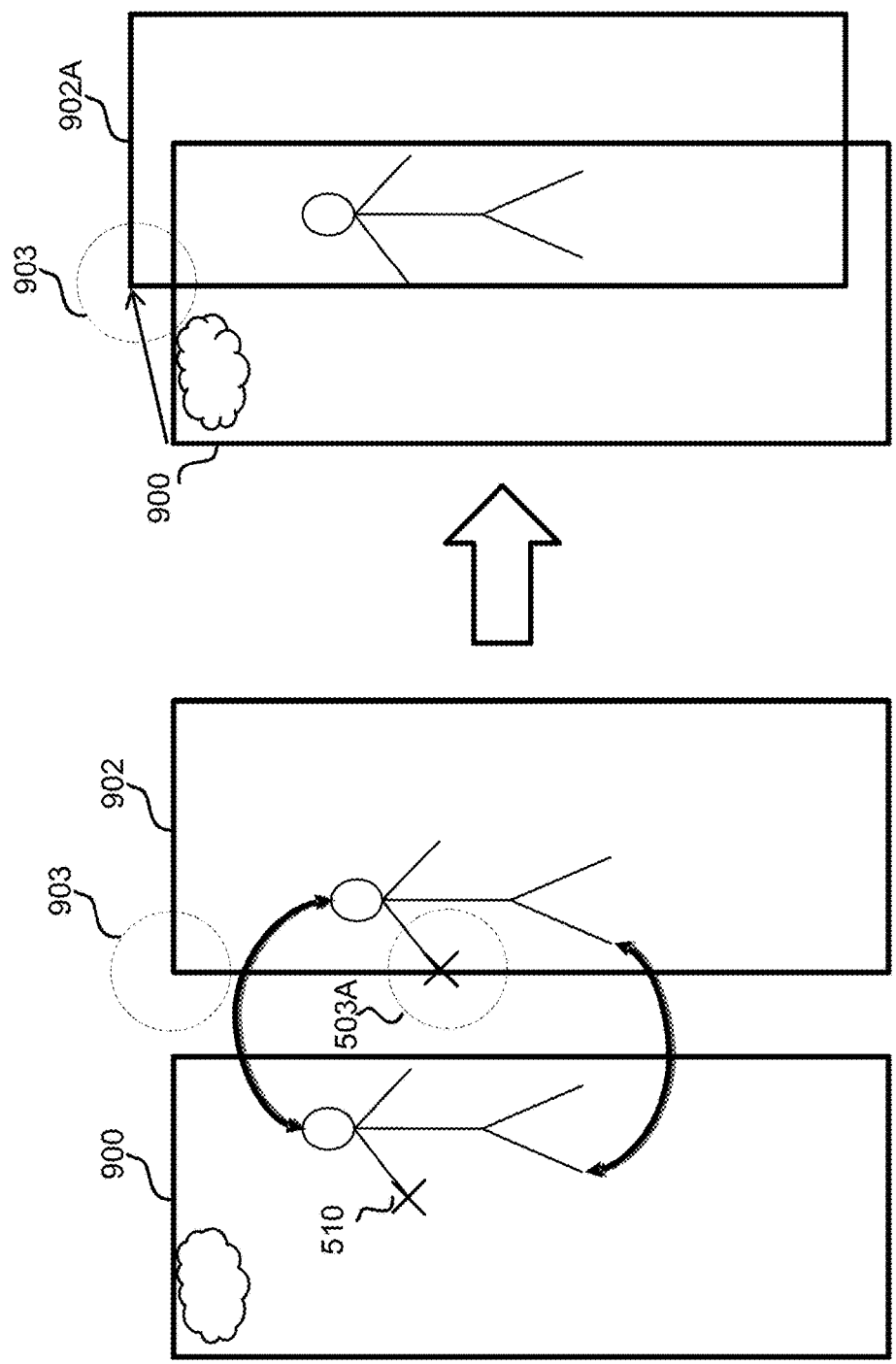
FIG. 9 is a schematic diagram that illustrates adjusting a pose of an image frame by aligning the image frame with a preceding image frame, in accordance with some embodiments of the invention.

To further illustrate the processes of coarse image frame alignment and subsequent refinement, FIG. 9 provides an example of coarse positioning of two consecutive image frames in accordance with some embodiments. Coarse positioning of image frames of a scanned object may comprise aligning consecutive image frames based on matching portions of the image frames showing corresponding portions of the object being scanned. FIG. 9 schematically illustrates such a process of aligning two image frames based on matching portions of the image frames corresponding to respective portion of the object being scanned. In this example, an image frame 900 represents a preceding image frame and image frame 902 represents a succeeding image frame taken as a scanning device moves over the object being scanned. Though, image frame 902 may be aligned with any one or more image frames that partially overlap with image frame 902, based on matching content of the image frames within the overlapping areas.

During the coarse positioning, an initial pose of image frame 902 may first be estimated based on information from one or more inertial sensors (e.g., inertial sensors shown in FIG. 2). The initial pose estimate may be associated with some imprecision expressed as a zone of uncertainty 903, as shown in FIG. 9. Though not readily illustrated in a two dimensional drawing, the zone of uncertainty may represent uncertainty in both displacement and orientation. In a scenario in which image frames are captured using a portable electronic device, uncertainty and orientation may reflect the possibility that the portable electronic device has been rotated in the plane parallel to the plane of an object being imaged as well as tilted in any number of directions with respect to that plane.

In some scenarios, the zone of uncertainty may be small enough that an initial pose estimate may provide adequate coarse positioning of image frame 902. However, in some embodiments, alternatively or additionally, a second coarse positioning technique based on matching content in a portion of image frame 902 with content in a corresponding portion of image frame 900 may be used.

The pose of image frame 902 that results in a suitable match of content in the overlapping areas may be taken as the position of image frame 902 relative to image frame 900. The pose that provides a suitable match may be determined based on aligning features or other image content. Features, such as corners, lines and any other suitable features, may be identified using known image processing techniques and may be selected for the matching in any suitable way.

In some embodiments, the matching process may be simplified based on positioning information. It may be inferred that the pose of image frame 902 that aligns with image frame 900 provides a pose within area of uncertainty 903. To reduce processing required to achieve alignment and to thus increase the speed of the local positioning of image frames, in some embodiments, the position information obtained from the inertial sensors may be used. If image frame 902 in aligned with image frame 900 using feature matching, processing required to find corresponding features can be limited by applying the zone of uncertainty 903. For example, image frame 900 includes a feature 910. A corresponding feature should appear in image frame 902 within a zone of uncertainty 903A around a location predicted by applying position information output by the inertial sensors that indicates motion of the smartphone between the times that image frame 900 was acquired and image frame 902 was acquired. Accordingly, to find a feature in image 902 corresponding to feature 910, only a limited number of features need to be compared to feature 910.

It should be recognized that feature matching as shown in FIG. 9 is illustrated based on features already projected into a common plane for both image frames being compared. The projection of each image frame into the common plane of reference is based on a mapping derived from an assumed position and orientation of the portable electronic device when image frame was captured. The assumed orientation may impact the spacing between features and other aspects of the image frames as projected into the common plane of reference. Inaccuracies in the assumed orientations may impact how well features in one image frame align with a corresponding set of features in another image frame when both are projected into the common reference claim. Accordingly, searching for a relative position and orientation of image frames that align corresponding features in the image frames may entail determining the appropriate orientation of the portable electronic device used in projecting feature sets of the image frames into the common plane of reference.

If other matching techniques are employed, position information may also be used in a similar way. For example, overlapping regions in different poses of image frame 902 are iteratively compared on a pixel-by-pixel basis, the position information can be used to identify overlapping portions to be compared and to limit the number of poses to be tried to find a suitable match.

Regardless of the matching technique employed, any suitable criteria can be used to determine a suitable match. In some embodiments, a match may be identified by minimizing a metric. Though, it should be appreciated that a suitable match may be determined without finding an absolute minimum. As one example, a pose of image 902 may be selected by finding a pose that minimizes a metric expressed as the sum of the difference in positions of all corresponding features. Such a minimum may be identified using an iterative technique, in which poses are tried. Though, in some embodiments, known linear algebraic techniques may be used to compute the pose yielding the minimum.

In FIG. 9, image frames 900 and 902 contain matching portions comprising equal image content which is shown by way of example only as a strawman. Once the equal image content in image frames 900 and 902 is identified using any suitable technique, the image frames may be aligned using the equal image content. In FIG. 9, image frame 900 aligned with image frame 902 is shown by way of example only as image frame 902A.

In embodiments of the invention, scanning of an object may be performed by moving a smartphone over the object. A stream of image frames may thus be captured which are then stitched together to form a composite image representing the object. As a user is moving the portable electronic device relative to the object and new image frames in the stream are being captured, their respective coarse positions may be determined. Each coarsely positioned image frame may be presented on a display device in a position proportional to its determined position within the composite image. The coarse positioning can be performed fast enough that image frames may be displayed to the user on the display device with a small delay relative to when the image frames are captured. As a result, a composite image representing a progression of the scanning process of the object being scanned appears to be painted on the display device. Furthermore, a fine adjustment may be made to the relative positions of the coarsely positioned image frames.

FIGS. 10A-D illustrate a process of scanning an object by capturing a stream of successive image frames of the object, in accordance with some embodiments of the invention. In these examples, the object being scanned comprises a text document 1000. As the scanning device, which may be a smartphone with a camera as described above, moves over the object, images of the object are captured at intervals, which are illustrated to be periodic in this example, thus resulting in a sequence of image frames. Each succeeding image frame may be initially positioned based on a respective preceding image frame to obtain an estimate of an initial pose of the succeeding image. As described above, position information representing movement and orientation of the scanning device obtained from the inertial sensors may be used to simplify the processing.

The image frames are shown in FIGS. 10A-D as superimposed over text document 1000 to demonstrate exemplary movements of the scanning device relative to the text document. It should be appreciated that each subsequent image frame may be oriented in any suitable way with respect to a preceding image frame as embodiments of the invention are not limited to any particular movement of the scanning device over an object being scanned. In the embodiment illustrated, an image frame is positioned based on comparison to an immediately preceding image frame, which is not a requirement of the invention. A succeeding image may be locally positioned by being aligned with respect to any other preceding frames if there is overlap.

Figures 10A, 10B:
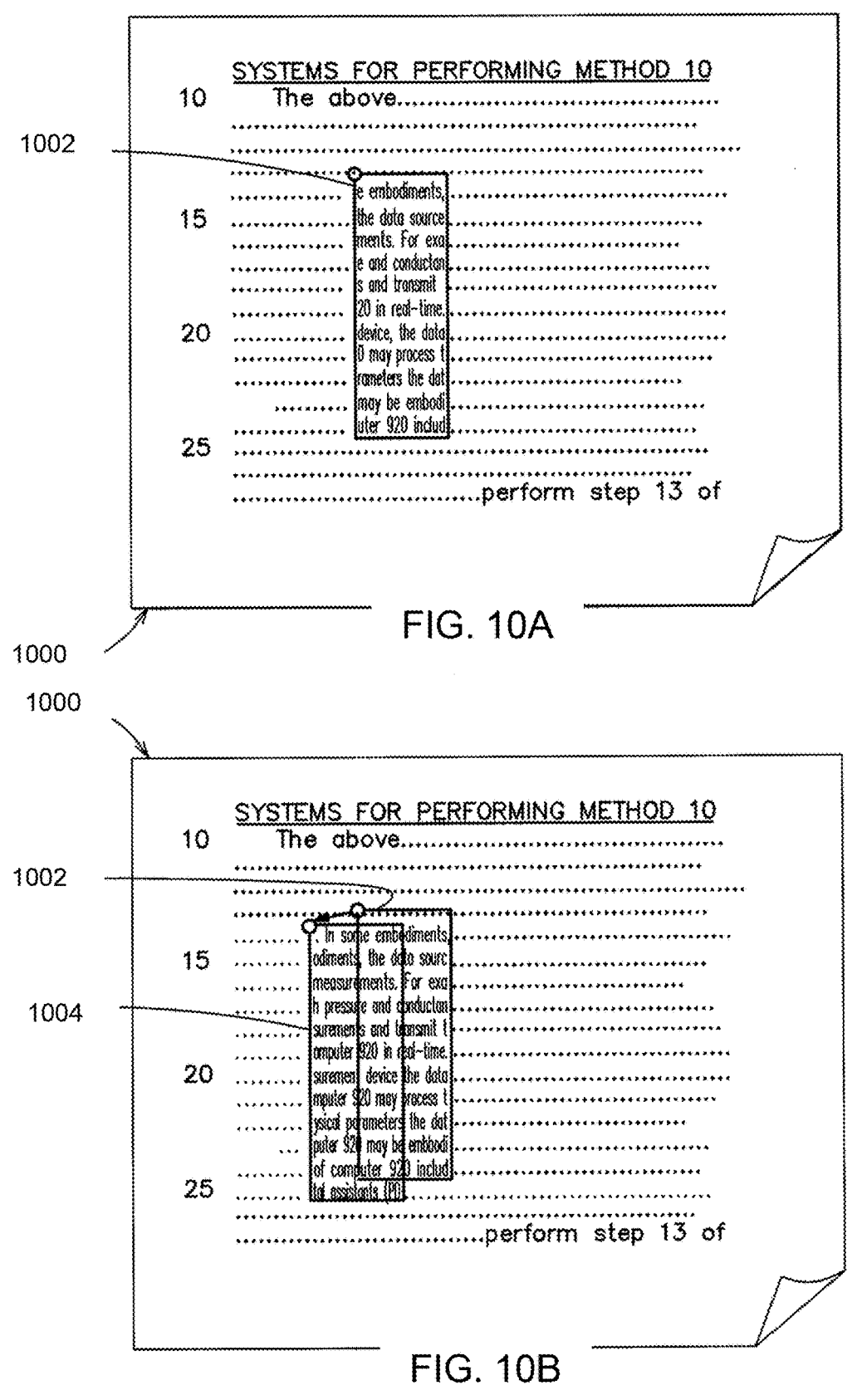

Further details of determining relative positions of image frames representing a scan of an object are provided in FIGS. 10A-15. FIG. 10A shows that a first image frame 1002 in a stream of image frames may be captured as scanning of text document 1000 begins, upon any suitable trigger.

Next, as shown in FIG. 10B, a succeeding image frame 1004 may be captured that partially overlaps image frame 1002. In some embodiments, the scanning device may capture the stream of image frames at a rate that ensures that each new image frame partially overlaps at least one of the preceding image frames.

Figures 10C, 10D:
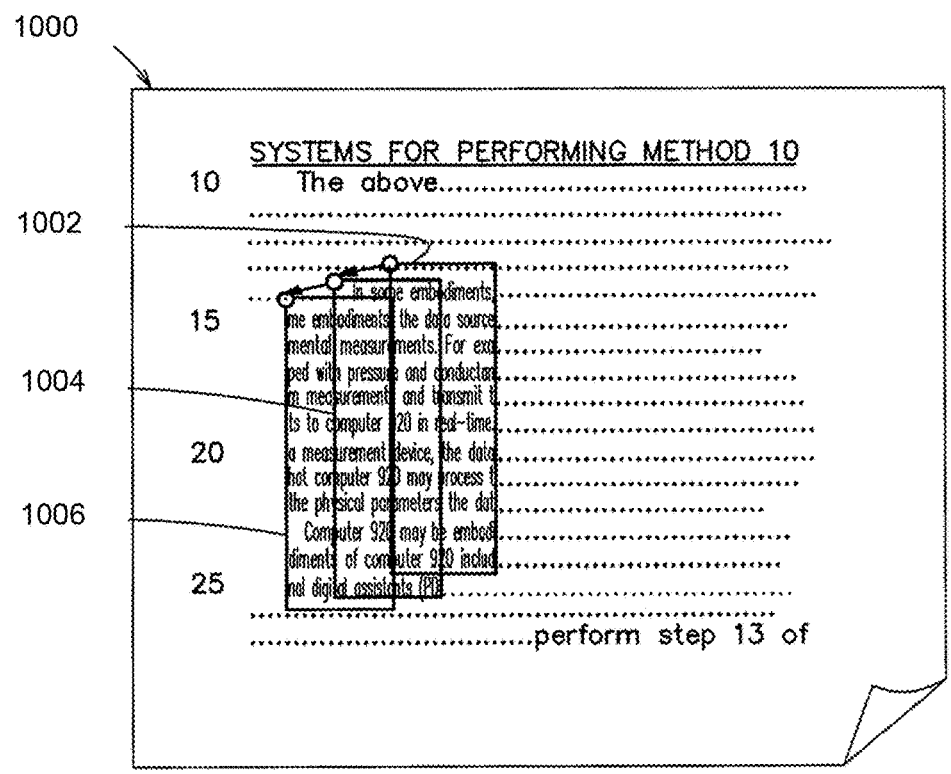

As new image frames are being captured as part of the stream of image frames, a subsequent image frame 1006 that partially overlaps preceding image frame 1004 may be captured, as shown in FIG. 10C. Further, a new image frame 1008 may be captured, as illustrated in FIG. 10D. Image frame 1008 partially overlaps image frame 1006.

Because motion of the smartphone is not constrained, each new image frame may overlap an immediately preceding image frame as well as other neighbor preceding frames. As illustrated in the example of FIG. 10D, respective areas of overlap of image frame 1008 with image frames 1002 and 1004 are larger than an area where image frame 1008 overlaps with the immediately preceding image frame 1006. However, in accordance with some embodiments, each new image frame is, for coarse positioning, positioned relative to an immediately preceding image frame.

Figure 11A:
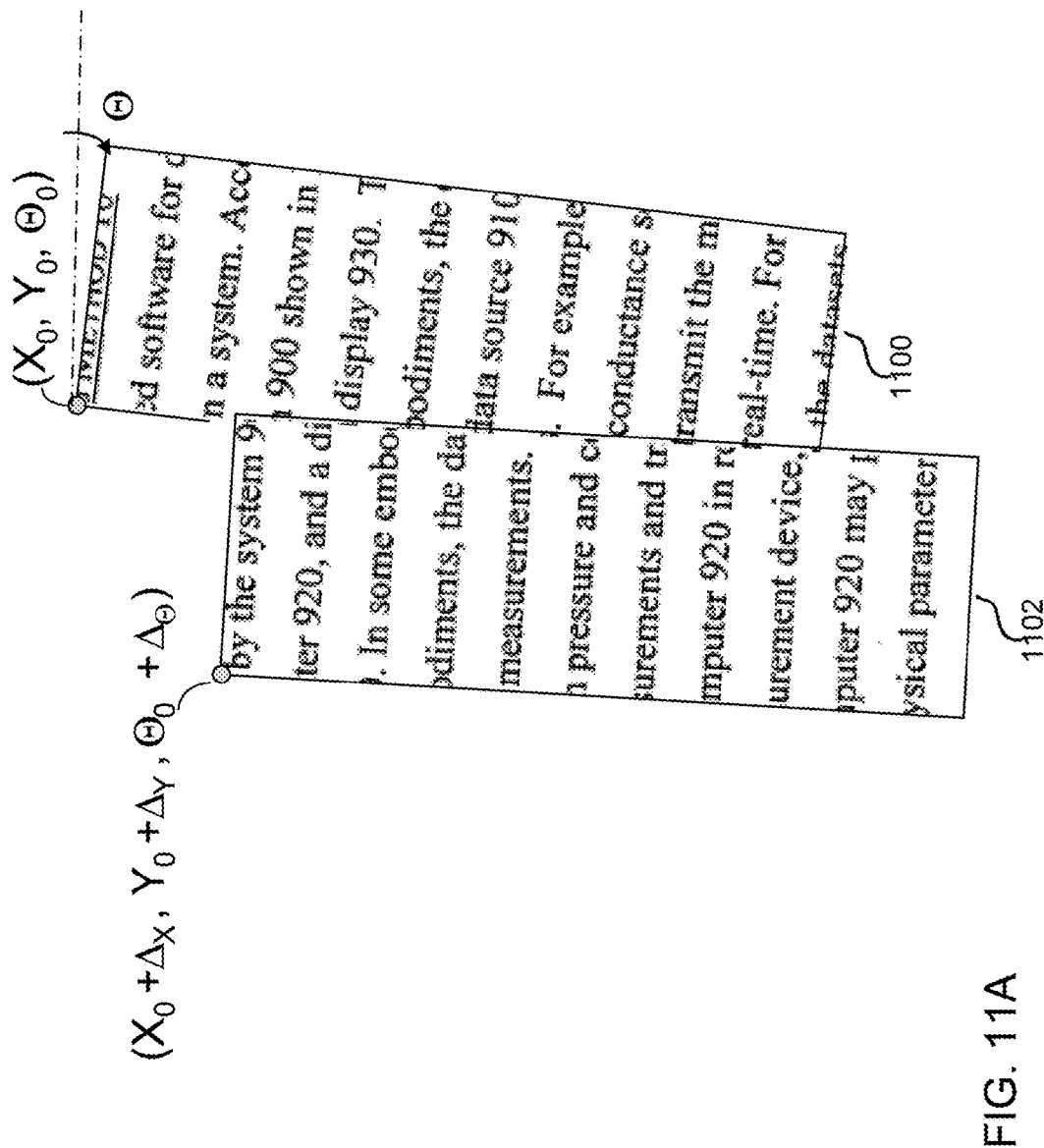
FIGS. 11A and 11B are schematic diagrams of an example of adjusting a relative position of an image frame of an object being scanned by aligning the image frame with a preceding image frame, in accordance with some embodiments of the invention.
Figure 11B:
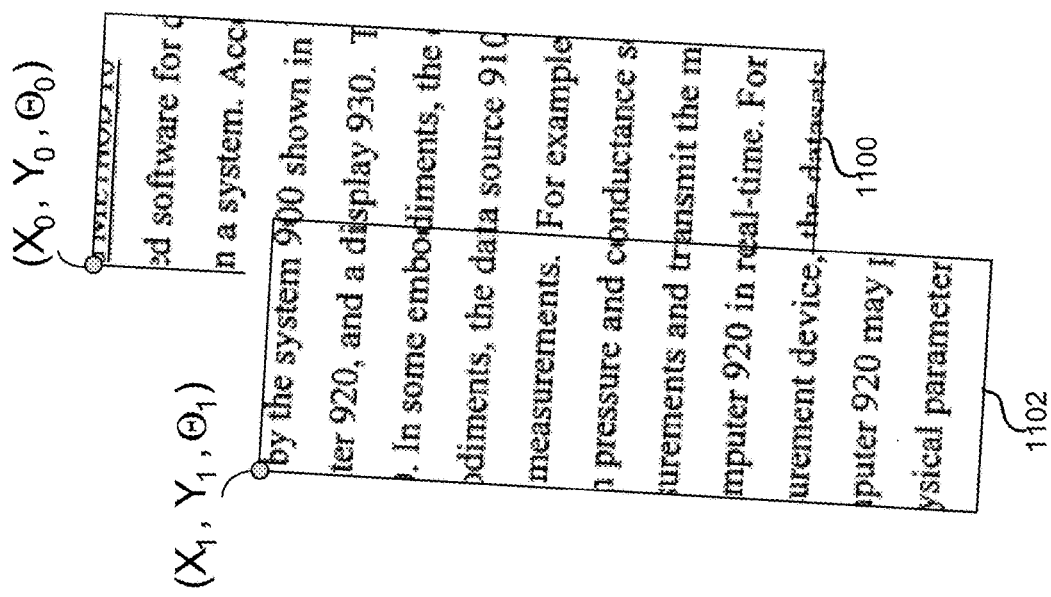

FIGS. 11A and 11B illustrate example of a first step that may occur in a process of determining a position of a subsequent image frame relative to a preceding image frame. The first step may be determining an initial estimate of a pose of an image frame with respect a preceding image frame. In the example shown in FIGS. 11A and 11B, an image frame 1100 and next an image frame 1102 may be captured as a user moves the smartphone over an object to be scanned. In this example, the object comprises a text document.

FIG. 11A illustrates initial estimate of a pose of image frame 1102 based on information obtained by one or more inertial sensors (e.g., inertial sensors 206). Initial estimate of pose of image frame 1102 may be based on a change of output of the inertial sensors between the times at which image frames 1102 and 1104 are captured. In FIG. 11A, a pose of image frame 1100 is schematically shown as ($X_0$, $Y_0$, $\theta_0$). In this example, $X_0$ and $Y_0$ denote a position of image frame 1100 in x and y dimensions, respectively, while $\theta_0$ denotes a rotation of the image frame. Though not expressly illustrated in FIG. 11A, a smartphone or other portable electronic device may be oriented in more than just these dimensions such that more than just these three parameters are used to define a pose. Separation between the smartphone or other portable device acquiring image frames and the object being imaged may also impact the pose such that the parameters defining a pose may include a "Z" dimension represent separation. Tilt of the smartphone in one or more dimensions relative to the object being imaged may also be parameters that characterize a pose of an image frame. Alternatively or additionally, characteristics of the image capture may also be regarded as parameters of a pose. For example, the zoom of the camera lens may be regarded as a separate parameter or may be reflected based on its impact on the value of the parameter for the Z dimension. These and other possible parameters that characterize the pose are not expressly illustrated for simplicity.

If image frame 1100 is the first image frame in the stream, its position may be taken as an origin for a frame of reference in which other image frames will be positioned. If image frame 1100 is not the first image frame in the stream, it may have a position determined relative to a preceding image frame, which in turn may either define the origin or have a position relative to the origin, through one or more intermediate image frames. Regardless of how many image frames are in the series, relative image poses of the image frames may define positions for all image frames.

Regardless of the position in the stream, each succeeding image frame after the first may be captured and processed as image frame 1102. An initial pose of image frame 1102 may be determined with respect to the pose of image frame 1100. During a time between when image frame 1100 is captured and when image frame 1102 is captured, the inertial sensors and/or other sensors indicate a change in the position of the smartphone or other device by a value of $\Delta x$ in the x direction and by a value of $\Delta y$ in the y direction. Also, the sensors used to obtain information on a position of the smartphone at a time when each image frame is captured may indicate a rotation of the device by a value of $\Delta \theta$. The value of value of $\Delta \theta$ may be determined according to processing as described below. Accordingly, the initial estimate of the pose of image frame 1102 with respect to image frame 1100 may be denoted as ($X_0+\Delta x$, $Y_0+\Delta y$, $\theta_0+\Delta \theta$). Though not expressly shown, changes in other parameters that characterize pose may be similarly determined. For example, changes in orientation or separation in the Z dimension may similarly be reflected in the new pose estimate.

FIG. 11A illustrates a degree of misalignment between image frames 1102 and 1100 that would provide a poor quality image. As shown in this example, the respective portions of the text of the scanned object do not match. To align image frame 1102 with the preceding image frame 1100 so that a good quality image can be generated, a matching portion of the image frames may be determined and the image frames may be aligned based on these portions. In some embodiments, those portions that are within a zone of uncertainty are first explored to position image frame 1102 with respect to image frame 1100. Any suitable technique may be used for the matching, which may be iteratively attempting to find a suitable match between the image frames. FIG. 11B shows image frame 1102 aligned with image frame 1100 based on the respective content of the image frames which is, in this example, the text. The adjusted pose of image frame 1102 is shown by way of example only as ($X_1$, $Y_1$, $\theta_1$). These values may represent the pose of image frame 1102 relative to the origin of the frame of reference. Though, because these values are derived based on positioning image frame 1102 relative to image frame 1100, they may be regarded and stored as relative values. It should be appreciated that in embodiments in which more parameters are used to characterize a pose, more than the three parameters illustrated in FIG. 11A would be stored.

Image frames that are locally positioned with respect to preceding image frames may be stored as a network of image frames, which may then be used for global positioning or other processing. The network may comprise nodes, representing image frames, and edges, representing relative position of one node to the next. That network of image frames may be represented as a graph map or in any other suitable way FIGS. 12A-D in conjunction with FIGS. 13A-13D illustrate the above concept of building a network of image frames based on local positioning of image frames. A reference point on each image frame, here illustrated as the upper left hand corner of each successive image may be used to represent the position of the image frame. Relative displacement of the reference point, from image frame to image frame, may be taken as an indication of the relative position of the image frames.

FIG. 13A-D represent respective nodes that may be added to the network as new image frames are acquired and locally matched with one or more previous image frames. Though, in the illustrated embodiment, each new image frame is matched to its immediately preceding image frame. In the network, any frames that have been locally matched will be represented by an edge between the nodes representing the frames that have been matched. Each edge is thus associated with a relative pose of an image frame with respect to a preceding image frame.

Figures 12A, 12B, 12C, 12D:
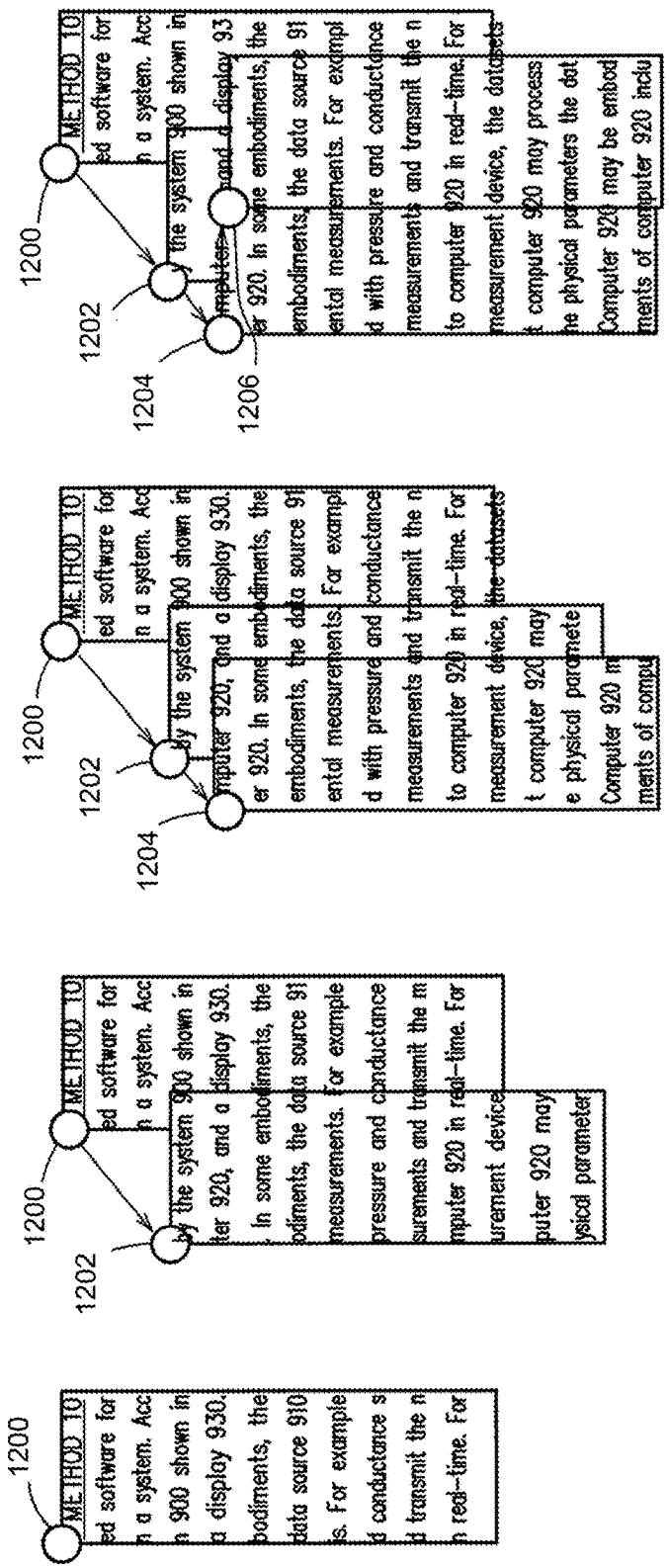
FIGS. 12A, 12B, 12C and 12D are schematic diagrams illustrating an exemplary process of capturing a stream of image frames during scanning of an object, in accordance with one embodiment of the invention.

In FIGS. 12A-12C, image frames 1200, 1202 and 1204 are successively processed. As each new image frame is acquired, its initial pose estimated from navigation information, acquired for example from inertial sensors device, may be adjusted to provide an improved estimate of relative position of the new image frame, by aligning the new image frame with a preceding image frame. Thus, FIG. 12B shows that, as a new image frame 1202 is captured, its pose may be determined by matching image frame 1202 with a preceding image frame, which is, in this example, is image frame 1200. A relative pose of image frame 1202 with respect to image frame 1200 is thus determined. Similarly, when the next image frame 1204 is captured, its relative pose with respect to the preceding image frame 1202 may be determined in the same fashion, as shown in FIG. 12C.

Figures 13A, 13B, 13C, 13D:
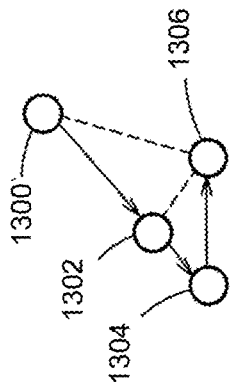
FIGS. 13A, 13B, 13C and 13D are conceptual illustrations of a process of building a network of image frames as the stream of image frame shown in FIGS. 8A, 8B, 8C and 8D is captured, in accordance with some embodiments.

FIGS. 13A-C conceptually illustrate the building of a network to represent the matching of successive image frames in a stream to determine their relative poses. As shown, nodes 1300, 1302 and 1304 representing the image frames 1200, 1202 and 1204, respectively, may be added to the network. In this example, each directed edge schematically indicates to which prior image frame relative pose information is available for a pair of frames. It should be appreciated that FIGS. 13A-13D conceptually represent data that may be stored to represent the network. The network may be stored as digital data in a data structure in computer memory. The data structure may have any suitable format. For example, each node may be stored as digital data acting as a pointer to another location in memory containing bits representing pixel values for an image frame. Other identifying information associated with a node may also be stored, such as a sequence number to allow the order in which image frames were captured to be determined. Likewise, edges may be stored as digital data representing the nodes that they join and the relative pose between those nodes. Moreover, information relating to capture conditions, such as a zoom setting or other settings applied to the hardware that acquired an image frame or status information generated by the controllers for that hardware may be stored in association with the nodes. One of skill in the art will appreciate that any suitable data structure may be used to store the information depicted in FIGS. 13A-13D.

As the stream of image frames is acquired, a user may move the smartphone back and forth across an object to be scanned, possibly tracing over regions of the object that were previously imaged. Accordingly, a new image frame that overlaps multiple preceding image frames may be captured. In the illustrated example, new image frame 1206 that overlaps image frames 1200, 1202 and 1204, as shown in FIG. 12D. A respective new node 1306 may be added to the network to represent image frame 1206, as illustrated in FIG. 13D.

In the figures, the dark arrows indicate the relative positions initially used to add image frames to the network as part of fast processing. The dark arrows also illustrate an order in which image frames are captured, and the image frames may be said to be "layered" on top of each other as they are captured, so that the most recently captured image frame is placed, or layered, on top of prior image frames. Processing that renders a composite image based on the information stored in the network may use this overlapping information any suitable way. In some embodiments, for example, the most recently acquired image may be selected or overlapping image frames may be averaged or otherwise combined to improve the quality or resolution of the overall composite image. In other embodiments, processing may select between overlapping image frames to render the composite image based on the highest quality image frame to render a portion of the composite image. In yet further embodiments, when none of the image frames representing a portion of the composite image has suitable quality, processing may generate data to represent that portion of the composite image or acquire image data in any other suitable way.

In addition, the possibility of a new image frame overlapping multiple preceding image frames provides a possibility for a more accurate positioning of image frames based on global information, meaning information other than a match to an immediately preceding image.

Dashed lines shown in FIG. 13D may be a relative position of an image frame with respect to an overlapping image frame other than an immediately preceding image frame. Thus, node 1306 is shown to be connected, via respective edges, to nodes 1302 and 1304 which represent respective overlapping neighbor image frames. These edges may be added as part of processing in the quality track and may be used to more finely determine positions of image frames, as described in greater detail below.

Though FIGS. 12A-12D could be taken as demonstrating a sequence of image frames as they are captured, they could also be taken as a demonstration of what could be displayed for a user based on the network being built, as illustrated in FIGS. 13A-13D. As each image frame is captured and locally positioned, it may be presented on a display device in a position proportional to its determined position within the composite image represented by the network. For example, as the scanning process of the text document begins, image frame 1200 is first displayed. Next, when the user moves the scanning device and image frame 1202 is captured, respective larger portion of the composite image of the text document may be displayed to the user with a small delay, which may not be perceived by the user as disrupting or slowing down the scanning process. Thus, the composite image on the display may appear to the user as if the object being scanned is being painted on the display as the user moves the scanning device over the object.

Image stitching techniques in accordance with some embodiments of the invention may be used to generate a composite image of a scanned object of any suitable type. As shown in the above examples, the object being scanned may be a text document, an image, a graph, or any combination thereof. Further, content the object may be in represented in grayscale or it may comprise various colors. Image frames representing text, such as is illustrated in FIGS. 12A-12D, may contain multiple edges or other features that may be used in aligning image frames. For example, such features as lines and corners may be used if the scanned object includes text and/or image(s). Though, techniques as described herein are not limited to such embodiments.

FIGS. 14A-14C show that a relative pose of each new image frame may be determined by matching the image frame with a preceding image frame, even if the image does not represent or other content with many features that can be easily identified. To perform the matching, identical content in the matched image frames is determined and may be matched other than based on corresponding features. For examples regions may be matched based on a pixel-to-pixel comparison, comparisons of gradients or other image characteristics.

For example, image frames may be aligned using area-based matching. As shown in image frames illustrated in FIGS. 14A-14C, the content of an object being scanned (e.g., a photo rather than text) may be an image having content of different color gradient across the image. Hence, the area-based matching may be suitable for aligning image frames of such object. Also, FIGS. 14B and 14C illustrate that motion of a scanning device between successive image frames may involve rotation in addition to displacement in an x-y plane. Rotation may be reflected in the angular portion of the relative pose between frames. Though not expressly illustrated in FIGS. 14A-14C, other parameters, such as tilt and Z dimension also may impact the relative pose.

FIG. 15 is another example of a further technique that may be applied in constructing a network of image frames as new image frames are captured and respective nodes representing the frames are added to the network. As in the example of FIGS. 13A-13D, the network is represented graphically, but in a computer, the network may be represented by digital values in a computer memory.

FIG. 15 shows the state of the network after a scanning device has been moved in one swipe, generally in the direction 1514. In this example, the pose of the first image frame in the network, represented by node 1510, may be taken as a reference point. The pose of any other image frame in the network may be determined by combining the relative poses of all edges in a path through the network from node 1510 to the node representing the image frame. For example, the pose of image frame associated with node 1512 may be determined be adding the relative poses of all edges in the path between node 1510 and 1512. A pose of each image frame, determined in this way, may be used for displaying the image frame as part of a composite image.

Determining a pose of an image frame based on adding relative poses along a path through the network also has the effect of accumulating errors in determining relative pose of each image frame area also accumulated. Such errors can arise, for example, because of noise in the image acquisition process that causes features or characteristics in one image frame to appear differently in a subsequent image frame. Alternatively, features in consecutive image frames with similar appearances, that actually correspond to different portions of an object being scanned, may be incorrectly deemed to correspond. Thus, for any number of reasons, there may be errors in the relative poses. For image frames along a single swipe, though, these errors in relative pose may be small enough so as not to be noticeable.

However, as a user swipes a scanning device back and forth across an object, motion of the scanning device in direction 1524 will generate image frames acquired at a later time adjacent image frames acquired at an earlier time. In particular, as the path through the network proceeds beyond node 1512 along segment 1516, eventually, a node 1518 on the path will have a position near node 1520. When this occurs, the accumulated errors in relative positions along the path, including segment 1516, may be substantial enough to create a noticeable effect in a composite image including image frames associated with nodes 1518 and 1520, if both nodes are positioned based on accumulated relative poses in paths from node 1510. Positioning of image frames in the composite image, for example, may create a jagged or blurred appearance in the composite image.

To provide an image of suitable quality, further processing may be performed on the network. This processing may be performed in a separate "track" from the processing that is integrating each new image frame in the sequence into the network. This "quality track" processing may be performed in a separate process or, in a separate processing thread, than processing to incorporate image frames into the network. In some embodiments, this quality track processing may be performed concurrently with processing to incorporate new image frames into the network. However, the specific implementation of the quality track processing is not a limitation of the invention.

This processing may adjust the relative pose information along the edges of the network to avoid the effects of accumulated errors in relative pose. Accordingly, during the scanning process in accordance with some embodiments of the invention, as new image frames are being captured and stitched into the composite image, a fine adjustment may be made to the determined relative positions of image frames already in the network. Fine adjustments may be made in parallel to the coarse positioning of successive image frames such that displayed image quality may improve as the scan progresses. Fine adjustments may be based on global positioning of image frames which may involve determining a position of an image frame within the composite image based on positioning of image frames other than the immediately preceding image frame.

Other processing techniques may be applied to the composite image as it is being formed or in processing after the composite image is formed. These processing techniques may be based on physical characteristics of the image, such as contrast or white balance. Alternatively or additionally, processing techniques may be based on the content of the image acquired. An example of a processing technique based on image content is an item removal process.

A piece of paper or other object imaged with a smartphone is often held down by a user or fixed with the hand for easier capture. As a result, one or more image frames may include distracting features, such as an image of the user's finger or other extraneous items, which may be undesirable to be included in the image of the document.

Accordingly, in some embodiments, processing of image frames to form a composite image may entail improving quality of the composite image by determining a segment of the composite image depicting the user's finger or other item that is unlikely to be desired in the composite image. Further processing may replace that segment with a less objectionable segment, such as a segment of a background color or other content of the detected object.

Figure 16:
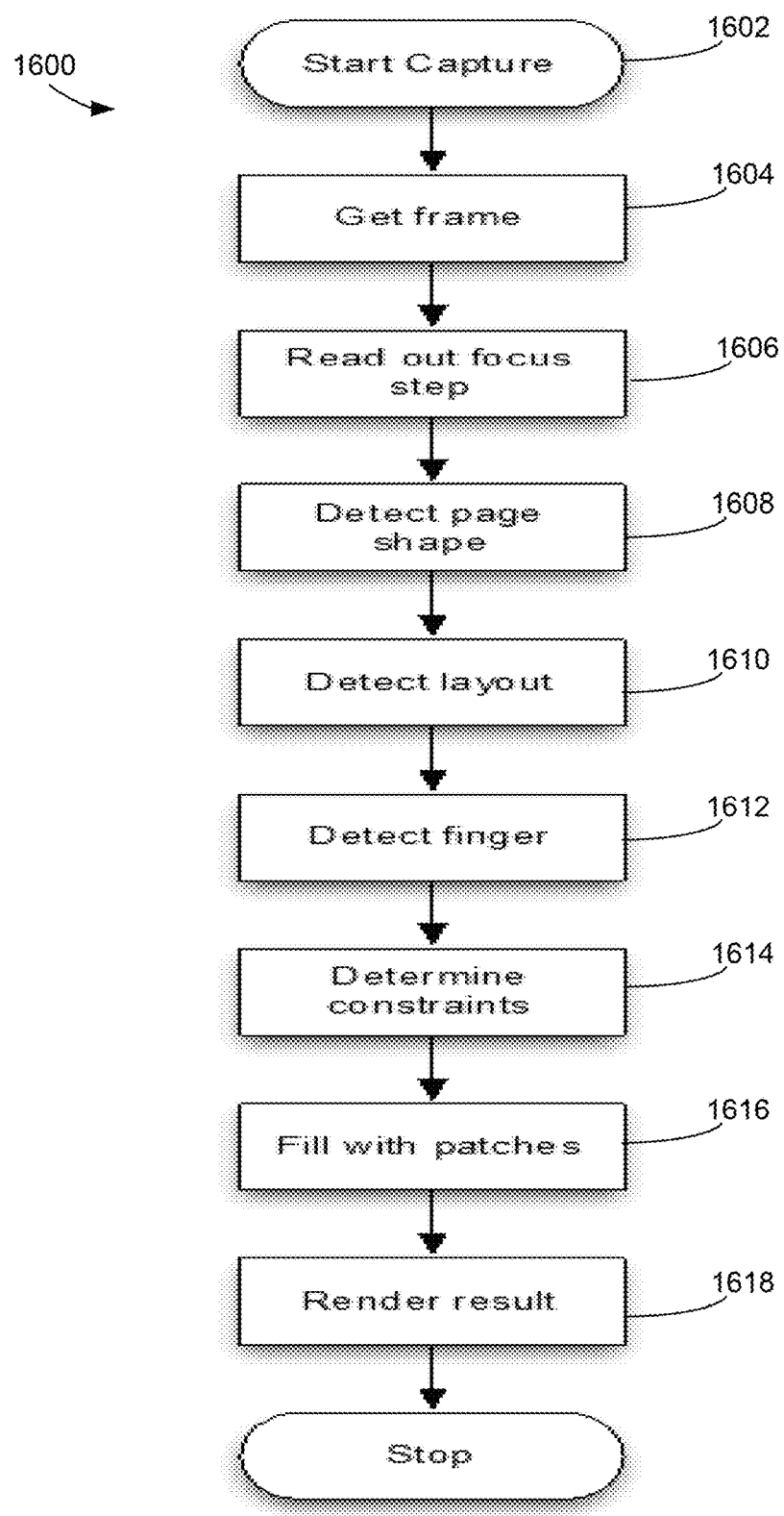
FIG. 16 is a flowchart of a process of improving image quality by digit removal, in accordance with some embodiments of the invention.

FIG. 16 illustrates a process 1600 of improving image quality by digit removal, in accordance with some embodiments. Process 1600 may be performed without requiring any user input, with improves the overall user's experience when using a smartphone to capture images of documents.

Process 1600 may begin when capturing of a stream of image frames of an object by a smartphone is started, at block 1602. This may occur, for example, when the smartphone operates in an image capturing mode. The object may be, for example, a document or any other type of object including content, which may include a text, graphics, and/or images. In this example, the object is a page of a document.

An image frame may be acquired at block 1604 as part of the scanning process. Next, at block 1606, a focus of a camera of the smartphone and a position of the smartphone relative to the object may be determined in any suitable manner. A shape of the page may be determined in a suitable manner, at block 1608. For example, the shape of the page may be determined based on user input signifying the shape. This input may be provided in advance, such as by the user selecting a page size or orientation from a menu or other suitable user interface. Alternatively, the page shape may be identified by user input after image capture, by a user providing input indicating the location of the page edges in a captured image. Alternatively or additionally, the page shape may be determined automatically as a result of processing on the image. Edge detection algorithms may be used. Other information derived from the image, such as the size and shape of identified lines of text in the image, may further be used to determine page shape.

Next, at block 1610, a layout of the content of the document may be determined. In this step, areas of the document that do not contain, or are unlikely to contain, an image of an undesired item may be identified. For example, this step may include determining positions of text, image and table portions of the content of the document.

A representation of a digit (finger) may be detected within the content of the document, at block 1612. Such processing may apply one or more links to identify portions of image containing a digit or other undesired item. Color, shape, location, presence/absence of shadows and/or other characteristics may be used to identify a digit within an image.

For example, an application performing digit removal processing may be programmed with a palette of colors representing flesh tones such that detection of a finger may be performed by identifying regions of contiguous pixels in the composite image of a color or colors within the palette. That palette of colors may be preprogrammed. Alternatively or additionally, the color palette may be customized for a user during a training phase in which a user takes a picture of the user's hand. As another approach, the palette may be determined adaptively, as the user provides feedback on whether items flagged by automated processing as a digit are in fact a digit to be removed from the composite image.

Likewise, information about the shape of a digit may be preprogrammed in an application that performs digit removal processing or may be obtained by user input. Shape may be determined in any suitable way, including by using known shape recognition algorithms to identify shapes representing an item in an image.

Location of an identified shape may also be used as a factor in processing to determine whether the shape represents a digit to be removed from a composite image. A shape near the edge of a sheet of paper may be assigned a higher probability of being a digit to be removed. Conversely, a shape identified within a portion of a document deemed, as a result of processing at block 1610 or otherwise, to represent content in the image may be assigned a lower left of the claim of being a digit to be removed.

Presence or absence of shadows may similarly be used as an indicator of a higher or lower probability of a shape being a digit to be removed. A digit, which is three dimensional, is likely to create a shadow, which will appear adjacent the digit in the image. Therefore, detection of a shape having characteristics of a shadow adjacent the shape having characteristics of a digit will increase the likelihood assigned to that shape being a digit for removal. Conversely, absence of the shadow may decrease the likelihood assigned to that shape.

Regardless of the number and type of characteristics analyzed to assign a likelihood, the likelihood assigned to a shape being a digit for removal may be compared to a threshold. If the likelihood is above a threshold, processing at block 1612 may indicate that a digit has been detected in the composite image.

Similar processing may be performed for removing artifacts representing other undesired items. For example, an application may be programmed to identify the end of the pen or pencil based on the characteristics described above or any other suitable characteristics. Accordingly, while FIG. 16 describes processing to remove a digit, it should be appreciated that processing to remove other items may similarly be performed.

Figure 17A:
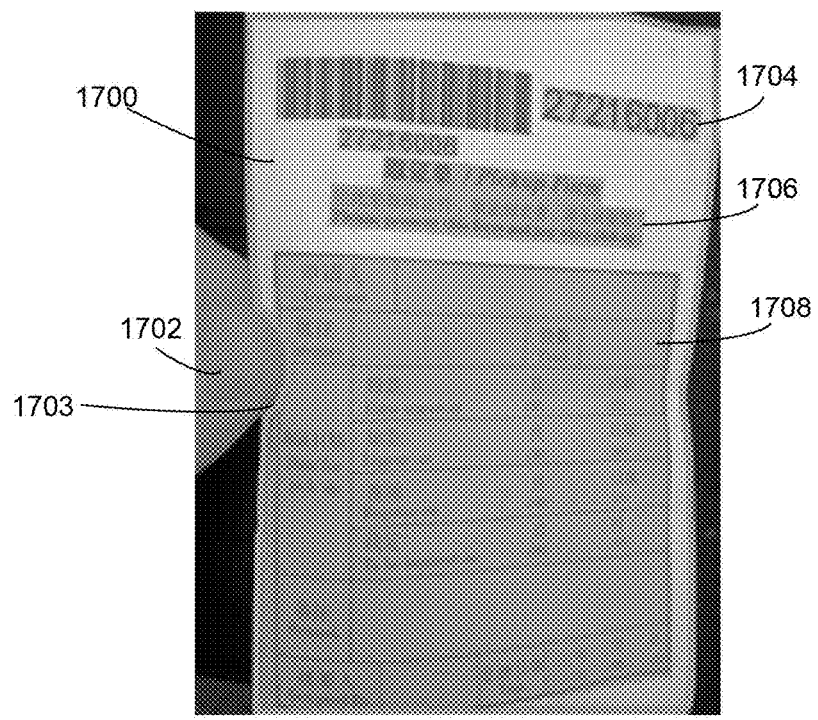
FIGS. 17A, 17B and 17C are schematic diagrams illustrating the process of FIG. 16 of improving image quality by digit removal, in accordance with some embodiments of the invention.
Figure 17B:
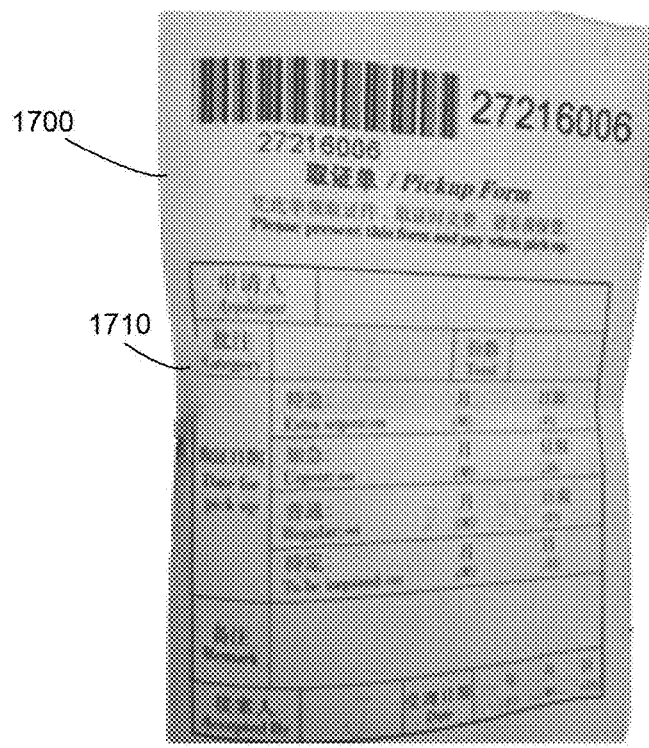
Figure 17C:
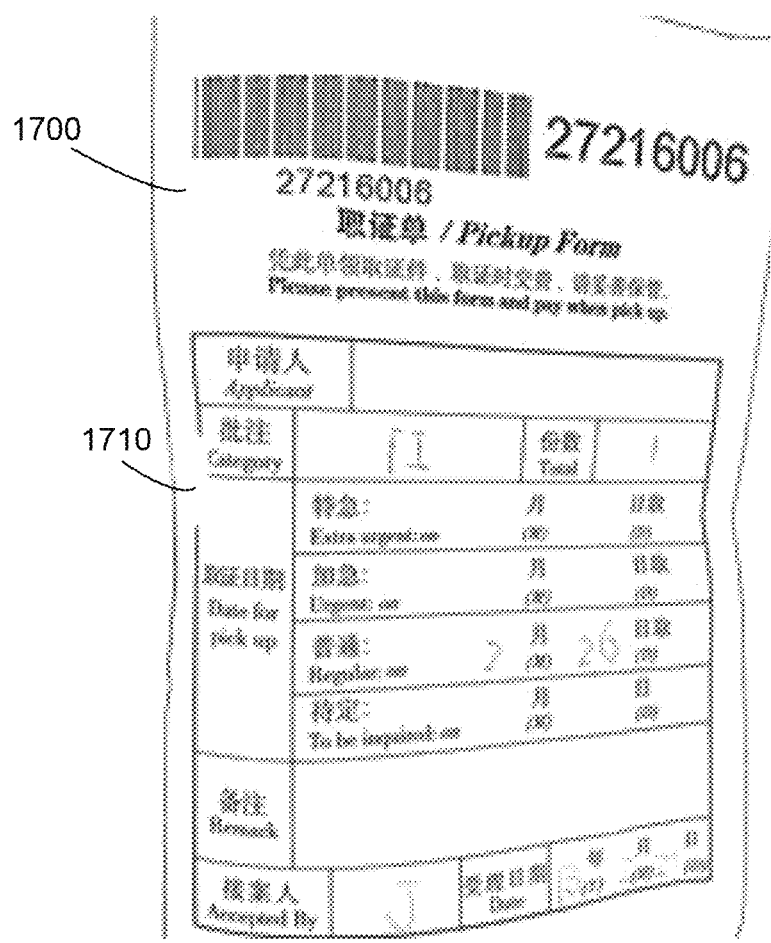

An example of an image of an object including the user's finger that can be analyzed as described in FIG. 16 is shown in connection with FIGS. 17A-17C. In this example, the object comprises a page of a document.

FIG. 17A illustrates an example of an image of a document 1700 processed to remove the depicted user's finger 1702. As shown in FIG. 17A, a border 1703 of document 1700 is detected, which does not include the segment representing the finger. FIG. 17A also shows a result of the detection of the layout of the content of document 1700 (at block 1610 of process 1600)—different portions of the content are identified as separate portions 1704, 1706, 1708 and other areas that are not labeled for the sake of simplicity.

In some embodiments, the finger representation may be detected using a skin modeling-based detecting or any other approach that can be used to detect a representation of a finger. The detection of the finger may include analyzing the distance of the camera to the device to detect partial representations of the digit in the image of the document, based on known characteristics of a finger (e.g., a size, shape, texture, etc.).

The next step may include determining, at block 1614, constraints for filling an area of the image of the document including the finger with other content, without modifying characteristics of the document. The constraints may be derived so that the document is cropped and retouched to remove the representation of the digit without compromising a quality of a resulting image. Constraints, for example, may limit removal to portions of the image that are outside text areas or other portions of the document that may contain useful information that may be degraded through attempts to remove the digit. Other constraints may limit removal to portions where suitable patches may be identified. For example, a digit over a region of a relatively uniform color may be readily patched. However, removing a digit covering a widely varying pattern may result in a patch and creates image artifacts more noticeable than leaving the digit in the image. The constraints may be derived based on characteristics of the document, such as its type, size, shape, content, and any other characteristics.

Next, at block 1616, patches of the image of the document depicting the user's finger may be filled in with other, less distracting, content. For example, the segment representing the finger may be replaced with a segment of a background color or other content of the document, which may be performed using any suitable technique. FIG. 17B illustrates the result of replacing the patch including the finger with the background color, as shown in a segment 1710 of document 1700. In this example, the segment that is replaced is an area inside the page border 1703, and content used to replace the segment depicting the finger is the background area around the portion of the document including the content.

The segment representing the finger in the image of the document may be replaced with other content in any suitable manner. In some embodiments, a patch match-like approach may be utilized. Such an approach may entail, for example, identifying a color or colors that blend in with the colors of surrounding portions to which the patch will be applied. Though, any other techniques may be used.

A patch to remove a portion of an image representing a digit and replace it with other less visually objectionable information may be applied to any suitable representation of an image. In some embodiments, the patching technique for digit removal may be applied to a composite image as the image is rendered. Alternatively or additionally, patching may be performed on the image as stored within a network as described above. Image frames representing the digit, for example, may be removed from the graph map or other network representing a sequence of captured image frames. These image frames may be simply removed or may be replaced by other image frames synthesized to represent patch. Moreover, it should be appreciated that digit removal as described herein is not limited to application the composite images. A single image of a document may be patched in this way to remove from the image a representation of a user's finger other undesired item.

The image which no longer includes the user's finger may be additionally processed by cropping content of the document and applying other processing, such as performing linear adaptive thresholding, dewarping, and other techniques to improve the quality of the final image shown in FIG. 17C. As illustrated in FIG. 17C, segment 1710 previously depicting the user's finger is replaced with the segment of the background color of the document. The image of document 1700 without the distracting representation of the finger may be rendered to the user, at block 1618.

In some embodiments, a portable electronic device (e.g., smartphone 200 in FIG. 2) may, at different times, capture image frames at different resolutions to support, in some instances, faster processing, and in other instances, a higher quality image. In some embodiments, the device may automatically switch between modes in which lower resolution images and higher resolution images are acquired.

Moreover, in some embodiments, the acquisition of higher resolution images may be interleaved with acquisition of lower resolution images such that both types of images may be used to create a composite image. The lower resolution images may be used to create a data structure defining a framework of the image. Higher resolution images may then be integrated into this framework. In rendering the composite image, the higher resolution image frames might be used. Such a framework, for example, could define a point cloud as described above. The higher resolution image frames could then be positioned relative to the point cloud by matching features in the higher resolution image frames to the points in the point cloud acquired from the lower resolution image frames.

In the example of a smartphone with a camera capturing a composite image, the smartphone may have different operating modes in which image frames of different resolutions are acquired and processed. The modes may include a preview mode, a scan mode, and/or modes of other types. In the preview mode, the smartphone may acquire a number of image frames that are used to build a composite image, which may be sometimes serve as a current preview image of a scan. The image frames acquired in the preview mode are referred to herein by way of example as P-frames. P-frames may be acquired continuously in the preview mode and may be used to provide a continuous real-time view of the camera to a user. The camera may operate in the preview mode before the scan mode starts. For example, in the preview mode, the camera may operate to continuously capture image frames at a frame rate of greater than 15 frames per second (fps). Though, it should be appreciated that other frame rates may be substituted.

A stream of image frames captured when the smartphone is used to scan an object and used to build a composite image may include P-frames and frames of another type, referred to herein by way of example as K-frames. The P-frames may be captured (e.g., in a preview mode) at a uniform rate, for example, under control of the camera's video acquisition circuitry. The capture of P-frames may be continuous, except for interruptions to use the camera to capture other types of images. For example, K-frames may be captured upon a specific trigger, which need not be periodic. The capture of a K-frame may interrupt the continuous capture of P-frames. As a specific example, capture of a K-frame may be triggered when an overlap between a K-frame and one or more of the prior K-frames is smaller than 10%. Using such a trigger may ensure that an entire object being scanned is depicted in at least one K-frame. Such an approach enables a high resolution composite image of the object to be formed from the K-frames. It should be appreciated, however, that any other threshold values may be used to determine whether to capture a K-frame.

In some devices, a camera will be able to capture only one image frame at a time such that capturing a K-frame may necessitate pausing the capture of P-frames. The preview mode may therefore be suspended while a K-frame is being captured. Once a K-frame is captured, the preview mode may be restarted. In some embodiments, each time a K-frame is captured, a respective notification may be provided to a user, which may be in a visual or audio format, or a combination thereof.

Figure 18:
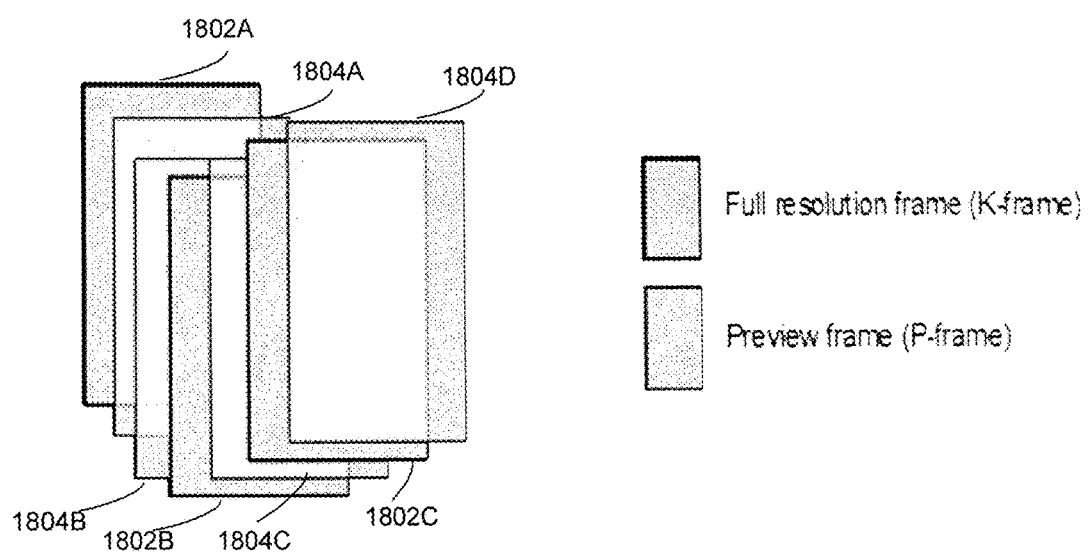
FIG. 18 is a conceptual illustration of K-frames and P-frames in a stream of image frames, in accordance with some embodiments of the invention.

FIG. 18A shows an example of a stream of image frames 1800 captured by a smartphone camera as object in being scanned. In this example, image frames 1800 include K-frames 1802A, 1802B and 1802 C, and P-frames 1804A, 1804B, 1804C and 1804D. As shown in FIG. 18A, K-frames and P-frames alternate in the stream, and more than one P-frame can be captured consecutively—e.g., image frames 1804A and 1804B in this example.

It should be appreciated that any suitable resolution may be used for K-frames and P-frames. K-frames, for example, may be captured at full resolution of the camera, or some percentage that approximates full resolution, such as at least 90% of the available resolution. P-frames may be captured at a fraction of the resolution of the K-frames. P-frames, for example, may have a resolution of 50% or less of the resolution of the K-frame. In other embodiments, this fraction, for example, may be less than 40% or less than 30%.

For example, in some embodiments, P-frames may be captured at a resolution of 960×720 pixels (px) or 1280×720 px. In some embodiments, all P-frames in a stream of image frames in a preview mode may have identical resolution, as may all K-frames.

The benefit of K-frames may depend on factors such as what is being imaged and how the camera is positioned relative to the object being imaged. When a smartphone is being used to scan a document, for example, a higher resolution composite image may be desired to support OCR or other image analysis techniques. Thus, capture of K-frames may be performed in this mode.

On the other hand, when the camera is held sufficiently close to the object being scanned, regardless of the numbers of pixels in the image frame acquired, each pixel may represent a suitably small region of the object to provide adequate resolution for the contemplated use of the image being acquired. Accordingly, in some embodiments, a portable electronic device may be configured to conditionally collect K-frames based on capture conditions, which may be determined in any suitable way. In some embodiments, a distance to an object being imaged may be determined based on camera hardware settings, including a focus distance setting. Thus, a currently set focus distance and/or other camera parameters that may be indicative of whether P-frames have adequate resolution for ongoing processing may be used to determine whether K-frames are to be acquired. In some embodiments, for example, K-frames may be acquired at distances that provide 280 pixels per inch (ppi) or higher. Such resolutions may be computed, for example, from the focal distance from the object, other camera characteristics that indicate the field of view at that distance, and the total number of pixels in an image array in the camera. It should be appreciated, though, that 280 ppt is an example and any other suitable threshold may be used to determine whether K-frames are captured.

Capturing a stream of image frames including frames of different resolution, such as P-frames and K-frames, allows displaying the image frames as a live view. In some embodiments, the P-frames and K-frames may be processed in separate physical processors or within separate processes. Regardless of how processed, the lower resolution of P-frames enables them to be processed more quickly than K-frames. As a result, a composite image constructed with P-frames may be captured more quickly than an image with K-frames.

Figure 19:
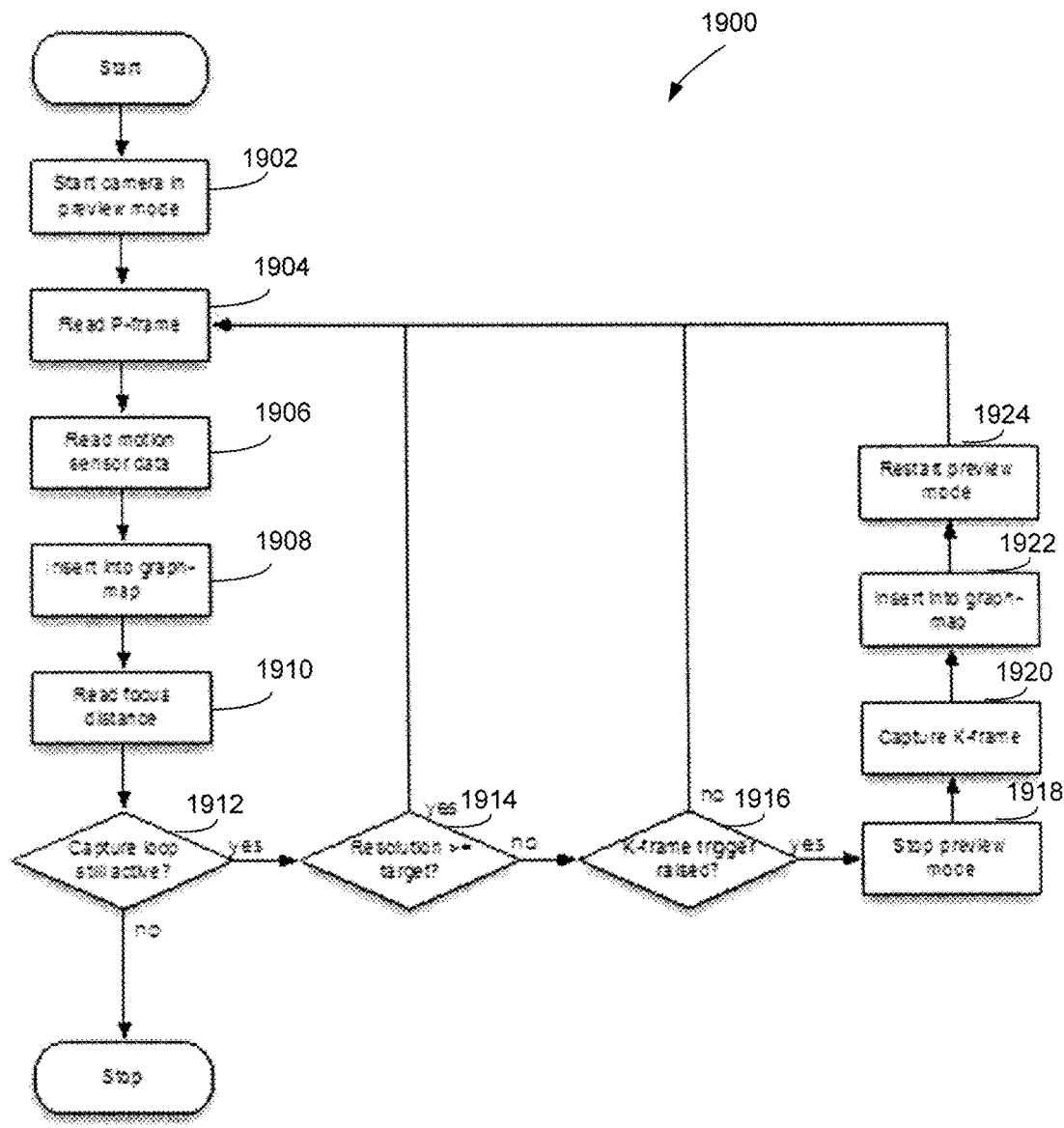
FIG. 19 is a flowchart illustrating a process of image frame acquisition for real-time processing and display, in accordance with some embodiments of the invention.

FIG. 19 illustrates a process 1900 of capturing K-frames and P-frames as part of one or more streams of image frames captured as an object is being scanned by a camera of a portable electronic device, which in this example may be a smartphone.

Process 1900 may start at any suitable time. For example, process 1900 may start when a smartphone is instructed to operate in an image capturing mode, which may be done in any suitable manner (e.g., upon a user input). As shown at block 1902, process 1900 begins with the smartphone in a preview operating mode. In this mode, P-frames may be captured and integrated into a composite image quickly enough to render a display of the object in real-time. In this context, real-time means quickly enough that a user of the smartphone perceives the image appearing as the smartphone is being moved.

In the preview mode, a P-frame may be then captured, at block 1904. Next, at block 1906, motion sensor data may be acquired from output of sensors of the smartphone (e.g., inertial sensors 206 in FIG. 2). It should be appreciated that the motion sensor data may be received prior to, simultaneously with or after the P-frame is captured, and processing at block 1906 is shown to follow processing at block 1904 by way of example only. The motion sensor data may be associated with the P-frame and the information may be stored in memory of the smartphone. Such motion information may be used, initially, to integrate the P-frame into a graph map or other data structure representing a composite image.

Next, at block 1908, the P-frame captured at block 1904 may be inserted into the composite image (graph-map), which may be performed as described above (e.g., in connection with block 504 in FIG. 5). Next, at block 1910, image capture conditions may be determined to ascertain whether the P-frames have adequate resolution to provide a final composite image meeting a resolution criteria, which may be a default setting within the smartphone, may be specified by programming in an application that uses the composite image or determined in any other suitable way.

In this example, the camera capture conditions include a focus distance. A focus distance to the object being scanned may be determined. It may then be determined, at block 1912, whether the scanning of the object continues or, in other words, whether the "capture loop" is active. This may involve, for example, determining whether an indicator to stop the scan has been received. Such an indicator may be based on user input, but may also be generated automatically, such as by tracking a timeout period from the start of preview mode or by automated processing that indicates either that an image has been acquired or that conditions are precluding capture of an image with a desired quality.

If it is determined that the scanning of the object is terminated, process 1900 may stop. Alternatively, if it is determined that the scanning of the object continues, process 1900 may follow to decision block 1914 where it may be determined whether the captured P-frame has a target resolution. In the example given above, the target resolution was 280 ppi. However, any suitable target resolution may be used. If it is determined that the target resolution has not been achieved, process 1900 may return to block 1904 where another P-frame may be captured.

If it is determined that the target resolution has been achieved, process 1900 may branch to decision block 1916 where it may be determined whether a trigger to capture a K-frame has been detected. Any suitable trigger conditions may be used, including passage of time, amount of motion of the portable electronic device or overlap of a current P-frame with a prior K-frame. If no such trigger has been detected, process 1900 may loop back to block 1904 where a next P-frame may be captured. Alternatively, if it is determined that a trigger to capture a K-frame has been detected, process 1900 may follow to block 1918 where the preview mode may be stopped. After that, at block 1920, a K-frame may be captured. It should be appreciated that processing at block 1920 may precede processing at block 1918, as embodiments are not limited in this respect.

The captured K-frame may then at block 1922 be inserted into a graph map or other data structure organizing image frames from which a composite image may be rendered. The graph map may be the same graph map that organizes the P-frames used to generate the preview image. Regardless of how the K-frames and P-frames are organized, the preview image may nonetheless be rendered based on only P-frames, notwithstanding the availability of K-frames. Alternatively, the K-frames may be stored in a separate graph map and may or, in some embodiments, may not be used in rendering the preview image. In some embodiments, composite images are rendered only with image frames of the same resolution—meaning that a preview image may be rendered using only P-frames and a higher resolution composite image may be rendered only with K-frames.

The preview mode may then be restarted, at block 1924, and a next P-frame may be captured in the preview mode, at block 1904 as shown in FIG. 1900.

In the described embodiments, an image frame from a stream of image frames captured when an object is being scanned is processed and inserted into a composite image. The stream of image frames may comprise P-frames interspersed with K-frames. As the composite image is being built, its quality may be determined and improved. To display the composite image to the user in real-time, it may not be practical to process all image frames that are captured or to process all image frames if captured at the full resolution available from the camera. Accordingly, only a portion of the image frames captured, which in some embodiments may correspond to lower resolution P-frames, may be used to construct a composite image. Such representative image frames may form a preview image. A preview image may represent a current result of capturing image frames as the composite image is being built. A reference image may define the coordinate system and orientation of the composite image and may serve as a basis for positioning additional image frames into a higher resolution final composite image. The additional image frames may be higher resolution K-frames. The K-frames may be incorporated into a graph map at block 1922. The K-frames may be inserted into a graph map for the composite image that is separate from the graph map used to represent the preview image. In this scenario, initial positioning in a K-frame graph map may be determined by comparison of features in K-frames to features in P-frames already positioned in the P-frame graph map. Alternatively, that graph map may be the same graph map as is used at block 1908 for P-frames.

Figure 20:
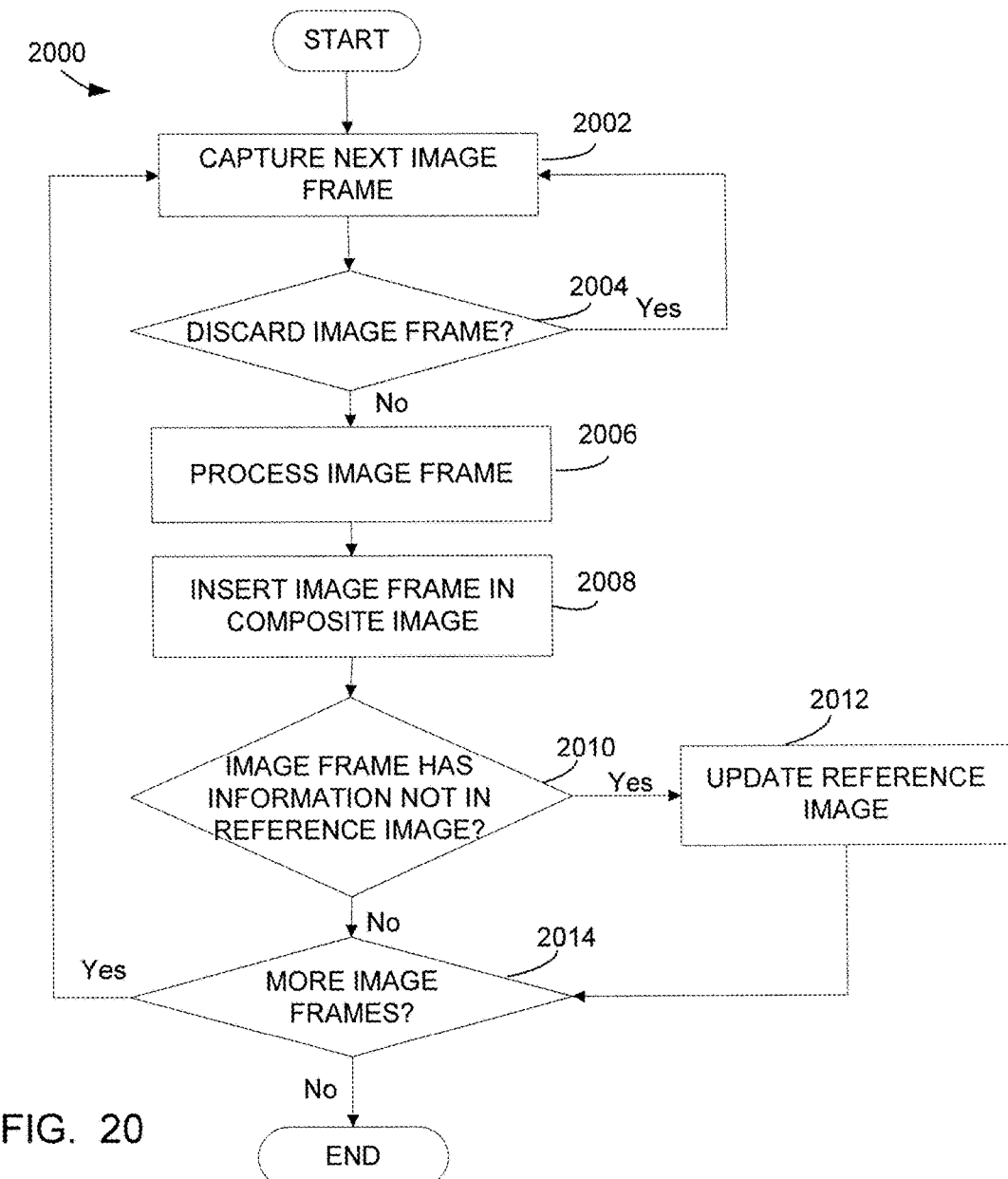
FIG. 20 is a flowchart of updating a reference image, in accordance with some embodiments of the invention.

FIG. 20 illustrates a process 2000 of updating a reference image, in accordance with some embodiments. In the illustrated embodiment, the reference image is formed from P-frames. K-frames may also be incorporated into the reference image. Initial position estimates of a K-frame may be based on comparison of features in the K-frame to features in frames already incorporated into a reference image, in the same way that P-frames are incorporated. The reference image may be processed as described above, with such coarse alignment being adjusted by global alignment of image frames, whether P-frames and/or K-frames.

The reference image may be stored in computer memory in any suitable way. In some embodiments, the reference image, containing K-frames in addition to the P-frames that form the preview image may use the same computer memory storage locations that are used to store that data that is used in rendering the preview image and/or a higher resolution composite image. The preview image, for example, may be rendered by processing just the P-frames. A higher resolution composite image may be rendered by processing just the K-frames. However, the specific storage architecture is not critical to the invention, and any suitable storage architecture may be used.

Process 2000 may start, for example, when a smartphone operated to scan a scene captures an image frame comprising an image of the scene. The processing depicted in FIG. 20 may be initiated by user input or in any other suitable way. At block 2002, an image frame may be captured. Next, at decision bock 2004, it may be determined whether the image frame is to be discarded. The image frame may be discarded when its quality is determined to be unacceptable for the image frame to be included in a composite image. For example, the image frame may be discarded when an amount of movement of the image frame relative to a prior image frame is above a certain threshold value (e.g., in some embodiments, greater than 50% relative to a size of a prior image frame), which indicates an excessive amount of movement. As another example, the image frame may be discarded when it adds insufficient information to warrant processing. For example, an amount of movement of the image frame relative to a prior image frame is below a threshold value (e.g., in some embodiments, less than 2%), which may be taken as an indication that the smartphone was not moved from a time when the prior image frame was captured and a time when the succeeding image frame was captured, may be used to determine whether to discard an image frame. An image frame may also be discarded if a sharpness of an image represented in the image frame is below a certain value, if a shutter speed setting of a camera is slow and excessive motion blur may thus occur, etc. Quality of an image frame may be determined in any suitable way, including using any of the techniques described herein singly or in any suitable combination. It should be appreciated that embodiments are not limited to any specific characteristics of an image frame which may render it unacceptable for further processing.

If it is determined, at decision block 2004, that the image frame is to be discarded, process 2000 may return to block 2002 where another image frame is captured. However, if it is determined that the image frame is not to be discarded, process 2000 may follow to block 2006 where the image frame may be pre-processed, which may be performed similar to processing at block 402 in FIG. 4. Next, the image frame may be incorporated into a representation of the composite image, at block 2008, which may be performed similarly to processing at block 404 in FIG. 4. Like process 400 and other processes described herein (e.g., processes 500 and 600), process 2000 may be performed under control of a processor of the smartphone executing stored computer-executable instructions or using other suitable circuitry within a smartphone, or in any other suitable way. This processing, for example, may entail incorporating the image frame into a graph map or other suitable data structure organizing frames to be rendered as the composite image. In this context, the composite image may be any suitable composite image, such as the preview image, the reference image or a higher resolution composite image.

In some embodiments, if the image frame is a higher resolution K-frame and the composite image has lower resolution, incorporating the K-frame into the composite image may entail down-sampling the K-frame to obtain an image frame of a lower resolution (e.g., the same resolution as a P-frame). Such processing may ensure that a preview image is generated from image frames of the same resolution. However, in other embodiments, the same result may be achieved by forgoing incorporation of higher resolution K-frames into the composite image. In yet other embodiments, frames with mixed resolutions may be incorporated into the composite image.

After the image frame is inserted into the composite image, at decision block 2010, process 2000 may determine whether the image frame captured at block 2002 has information that is not currently in the reference image. An image frame captured as the smartphone is being used to capture images of an object may be determined to have information that is not currently in the reference image based on any suitable criteria, including a check of characteristics of the image frame, as described above.

If it is determined, at block 2010, that the image frame has information that is not currently in the reference image, process 2000 may branch to block 2012 to update a reference image based on the image frame. This update may enlarge the reference image using the image frame. As noted above, the image frame may be stored as part of any suitable data structure, which may be the same or separate from a data structure used to hold the K-frames and/or P-frames used in forming a composite image. If the image frame is a K-frame, the reference image may be updated by downsampling the K-frame to a P-frame. Alternatively, the reference image may be updated by a prior P-frame.

Process 2000 may then follow to block 2014, as shown in FIG. 20. If it is determined, at block 2010, that the image frame does not have information that is not currently in the reference image, in this example, the processing performed at blocks 2006 and 2008 may represent the processing used to incorporate the image frame into the relevant composite image. Accordingly, processing of the image frame may be complete.

If it is determined that the image frame does not have information that is not currently in the reference image, process 2000 may continue to block 2014, where it is determined whether more image frames are to be captured. For example, as the smartphone is used to scan an object, multiple images of different portions of the object may be captured until a user provides input representing a stop command. Accordingly, process 2000 may execute continuously as new image frames are added to the composite image. While the scan continues, a next image frame may be acquired and process 2000 may loop back to block 2002. Each new frame may be used to expand the extent of the object represented in the composite image. If the image acquisition is completed, process 2000 may end.

In some embodiments, after the reference image is updated, this image may be processed, which may involve analyzing quality of content of the image and replacing a poor quality segment of the image with a segment of a better quality, thereby improving the overall quality of the composite image that can be generated from the reference image. Though, such quality analysis may be performed at any suitable time, including, for some techniques, on image frames before they are incorporated into a data structure from which a composite image is rendered.

It should be appreciated that "replacing" one portion of a composite image with another may be performed in any suitable way, and the specific technique used may depend on the way in which the image frames that are used to form the composite image are stored and processed to render the composite image. In some embodiments, replacing one portion of the composite image for another may involve altering a data structure storing the image frames to delete the portions being replaced. Though, in some embodiments, replacing may occur when the image frames are processed to render the composite image. The replaced portions may be marked in some way so that they are passed over during this processing. Alternatively or additionally, the portions replacing other portions may be marked in some way so that they are processed after the portions being overwritten.

Accordingly, the techniques described herein include techniques for identifying segments of an image including artifacts arising from a relative position of a source of illumination and a camera. Examples of such artifacts are reflections and/or shadows. Techniques described herein may be used in identifying other segments that may be suitable replacements. In this way, segments including reflections and/or shadows may be identified and replaced by other image segments, depicting the same portions of the object being imaged with a higher quality.

In some embodiments, reflections and shadows may be detected by analyzing at least a portion of the image frames in the composite image. Reflections in an image frame may be formed under any of a number of circumstances, such as when a surface of an object being scanned is reflective—e.g., when the object is a glossy reflective sheet of paper, when the object is located behind semi-transparent or translucent material (e.g., glass), and based on any other factors. Reflections that may be detected and corrected may be characterized as, for example, self-reflections caused by a flash of the smartphone, external reflections caused by one or more light sources, and/or external reflections caused by ambient light (e.g., lighting in an environment where an object is being scanned).

In some embodiments, one or more reflections in the image frame may comprise one or more specular highlights. A specular highlight may be defined as a bright spot on an object caused by illumination from a light source. A position of the specular highlight may change with a change in a view direction and as the direction of the light changes.

In some embodiments, a motion of a smartphone from a position when a prior image frame was captured to a position with a currently captured image frame was captured may be used to determine whether a detected specular highlight is a true reflection caused by a light source or part of intrinsic content of the object being scanned. If a true reflection is detected, a corrective action may be taken. The corrective action may relate to replacing one portion of the image with another. Alternatively or additionally, the corrective action may entail changing image capture conditions for subsequent image frames, which may entail turning on or off a flash for the camera. Alternatively or additionally, the corrective action may entail providing feedback to a user, which may result in the artifact not appearing in subsequent image frames.

For example the artifact may be removed by guiding a user of the smartphone to move the smartphone in a way that allows capturing subsequent image frames in which the reflection is located in different positions. One or more overlapping portions of the image frames acquired in this way may allow improving the quality of the composite image to eliminate the refection.

Figure 21:
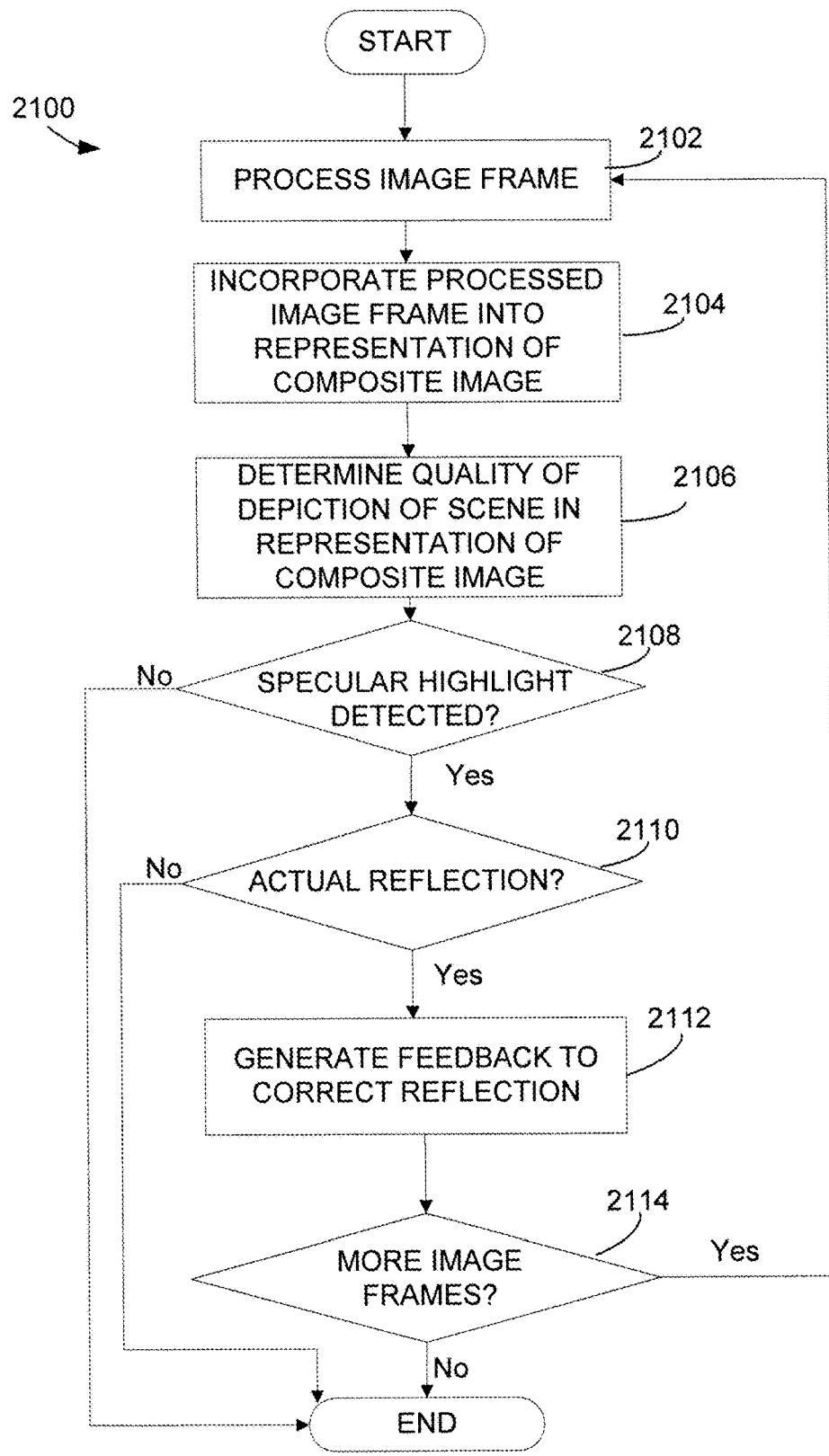
FIG. 21 is a flowchart of a process of improving image quality by removing a reflection, in accordance with some embodiments of the invention.

FIG. 21 illustrates generally a process 2100 of improving image quality by removing a reflection. In some embodiments, an image frame from which the reflection is removed may be a P-frame. Though, image processing to detect and correct reflection may be performed on K-frames in some scenarios. In some embodiments, the processing may be performed on frames of the type that are being used to form the composite. Moreover, it is not a requirement that the processing be performed on frames, per se. The processing may be performed on different portions of an composite image, acquired with the camera that acquired them in different positions.

Process 2100 may start, for example, when an image frame is captured and processed, at block 2102. In some embodiments, process 2100 may start when a reference image is updated—e.g., as shown in block 2012 in FIG. 20. To generate a display of a stream of image frames captured as an object is being scanned with a smartphone in real-time, process 2100 may be performed on a P-frame, which may be a P-frame captured immediately prior to capturing the image frame used to update the reference image.

Regardless of whether the image frame is a P-frame or a K-frame, the image frame may be first processed as described, for example, at block 502 in FIG. 5. Further, the image frame may be inserted into a representation of the composite image, at block 2104, which may be performed in the same manner as processing at block 504 in FIG. 5.

Next, at block 2106, quality of a depiction of a scene in the representation of the composite image may be determined. This analysis may involve analyzing the content in one or more portions of the composite image for features representative of a reflection. This may be performed using any suitable technique, including techniques that identify regions of approximately the same color and/or brightness in an image. Regions that have a brightness exceeding the brightness of adjacent regions by a threshold amount may be further processed as a region likely representing a reflection. Analogous processing, directed at identifying a region having color and brightness characteristics of a shadow may be identified when an analogous process for removing shadows is performed.

Accordingly, in the example of FIG. 21, at decision block 2108, it may be determined whether one or more specular highlights are detected in the composite image, which may be performed using any suitable technique. For example, in some embodiments, a specular highlight modeling approach may be utilized, as is known in the art.

If it is determined the specular highlight is detected, process 2100 may follow to block 2110 where it may be determined whether the detected specular highlight is an actual reflection or an intrinsic feature of the object being scanned. For example, a current image frame may be compared to one or more prior image frame, where each frame is associated with motion information, to determine whether the specular highlight "moves" with movements of the smartphone. A further indication that a specular highlight is an artifact rather than a representation of an actual portion of an object being imaged, may be that one or more characteristics of the specular highlight (e.g., a size and/or shape) changes from image frame to image frame.

As shown in FIG. 21, when no specular highlight is detected, process 2100 may branch to block 2114 where it may be determined whether further image frames are to be captured. Similarly, if the specular highlight is detected but it is determined to be part of an object being scanned, process 2100 may similarly branch to block 2114.

FIG. 21 shows that, if it is determined that the detected specular highlight is a reflection in the composite image that should be corrected, process 2100 may continue to block 2112 where feedback may be generated that can help correct the reflection. The feedback may trigger any suitable corrective action, which may entail adjusting the composite image, changing capture conditions or instructing a user how to position or move the portable electronic device containing the camera.

As shown in FIG. 21, when no specular highlight is detected, process 2100 may branch to block 2114 where it may be determined whether further image frames are to be captured. Similarly, if the specular highlight is detected but it is determined to be part of an object being scanned, process 2100 may similarly branch to block 2114.

If it is determined that the detected specular highlight is an actual reflection in the composite image that should be corrected, process 2100 may continue to block 2112 where feedback may be generated for correcting the reflection. In this example, generating feedback at block 2112 may involve computing a position parameter of the smartphone and generating feedback to adjust positioning of the smartphone based on the computed position parameter, as described in connection with blocks 508 and 510, respectively, in FIG. 5. The smartphone may be moved in an unrestricted manner in three dimensions and can be used to capture images of an object at different distances and different angles relative to a plane of the object. Thus, the computed position parameter may comprise at least one position parameter that does not define a location within a plane parallel to a plane of the scene, at least one position parameter that defines a spacing between the scene and the smartphone, at least one position parameter that defines an angle of the smartphone with respect to a normal to the scene, and/or other type of parameter, such as a parameter indicating where to position the smartphone to acquire subsequent image frames.

The feedback may be provided in any suitable form and may include any suitable information. For example, a visual indicator may be provided on a display of the smartphone indicating to the user a direction in which to move the smartphone so that the reflection is removed as subsequent image frames are captured. Additionally or alternatively, feedback may be output to the user to alter an orientation of the smartphone to avoid reflections or other image artifacts (e.g., shadows).

Next, process 2100 may continue to block 2114 where it may be determined whether there are more image frames to be captured, which may be the case when the scan of the scene is not yet completed and the user continues to operate the smartphone to capture images. While the scan continues, a next image frame may be acquired and process 2100 may loop back to block 2102. If the image acquisition is completed (e.g., if user input was detected instructing the smartphone to stop the scan), process 2100 may end.

When a reflection is detected in the image frame and the user of the smartphone is guided to change the orientation of the smartphone to acquire subsequent image frames in a manner that can remove the reflection from the composite image, segments in one or more of the subsequent image frames may be identified that may replace the portion of the image frame where the reflection was detected. The feedback to the user with respect to acquisition of a subsequent image frame that would eliminate a reflection may be, for example, a suggestion of a next K-frame.

Though, it should be appreciated, that, in some scenarios, no feedback may be provided and the user may visually appreciate that, as he or she moves the smartphone in different orientations with respect to the object being scanned, the reflection is removed from portions of the image displayed on the smartphone. Thus, the user may manipulate the smartphone to capture image frames free of the image artifact. Automated processing may remove the reflection from the composite image, such as by replacing image frames containing the artifact with subsequently captured image frames that do not include it or altering the image capture conditions for subsequent image frames.

Thus the artifact may be removed without any specific cues besides a changing location of the reflection in response to a change in the orientation of the smartphone. To aid the user in this regard, when an artifact is detected in a composite image, processing of the composite image may include marking the composite image as displayed to the user to call attention to the artifact. As a specific example, the artifact may be marked with a yellow or red color, which might prompt the user to re-image the portion of the object so highlighted. The additional image frames captured in this way may be captured from a different orientation and may not include the artifact. Processing to form the composite image may replace the image frames with the artifact with subsequently captured image frames, using techniques as described herein.

FIGS. 22A-22D illustrate schematically an example 2200 where a smartphone 102 operated by user 104 may be moved without restriction in three dimensions to scan an object 2202 in a manner that allows for detecting and/or removing reflections. In this example, object 2202 is placed on a support surface 2204. It should be appreciated, however, that embodiments described herein are not limited to an object placed onto a surface, and any type of object positioned in any suitable manner may be scanned. For example, object 2202 may be held by the user or may be a scene.

In this example, the object is a document, such as a page from a book or a magazine, a business card, a check for deposit in a bank, a purchase receipt, or any other type of document. The document may be made of or covered by a material that reflects light, such as glossy paper or any other type of material.

Figure 22A:
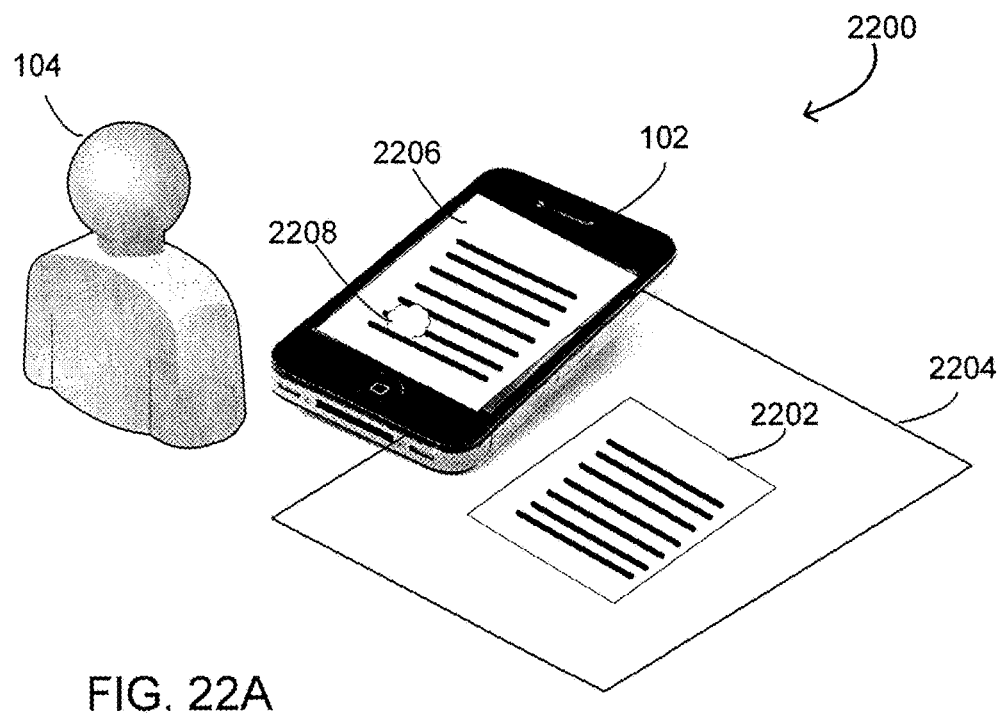
FIGS. 22A-22D are schematic illustrations of an example of improving image quality by removing a reflection by using motions of a smartphone, in accordance with some embodiments of the invention.

In this example, as shown in FIG. 22A, a surface of object 2202 may be reflective so that a composite image 2206 of object 2202 built as the object is being scanned by smartphone 102 may include a reflection 2208. The reflection 2208 may, based on the relative position of the smartphone 102 and a light source illuminating object 2202, appear in the lower left portion of the composite image, which is displayed to the user as shown in FIG. 22A.

Figure 22B:
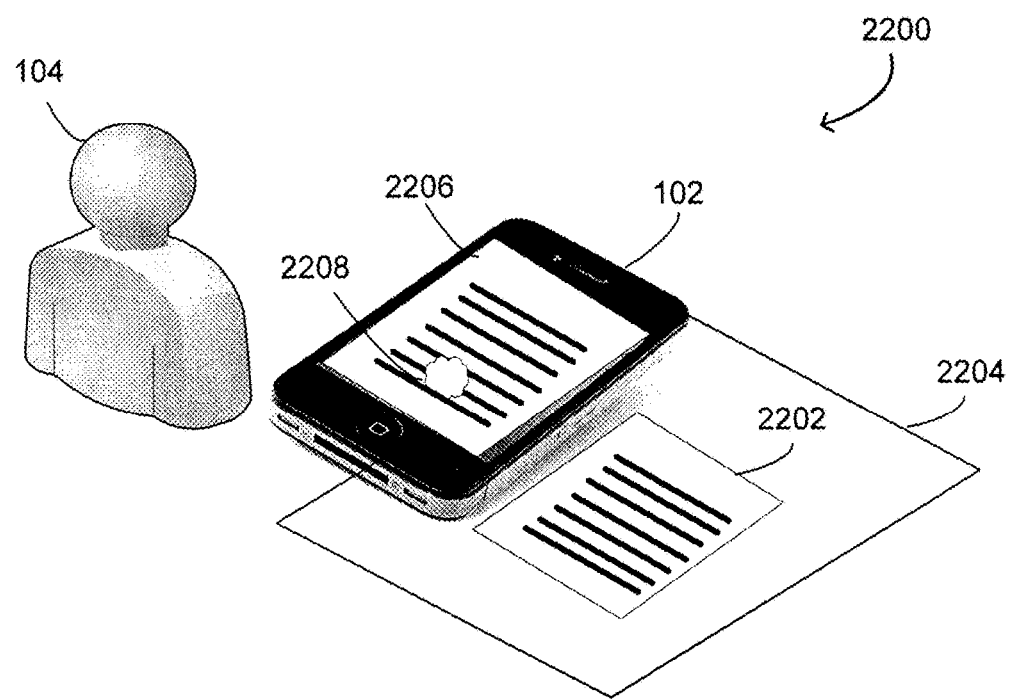
Figure 22C:
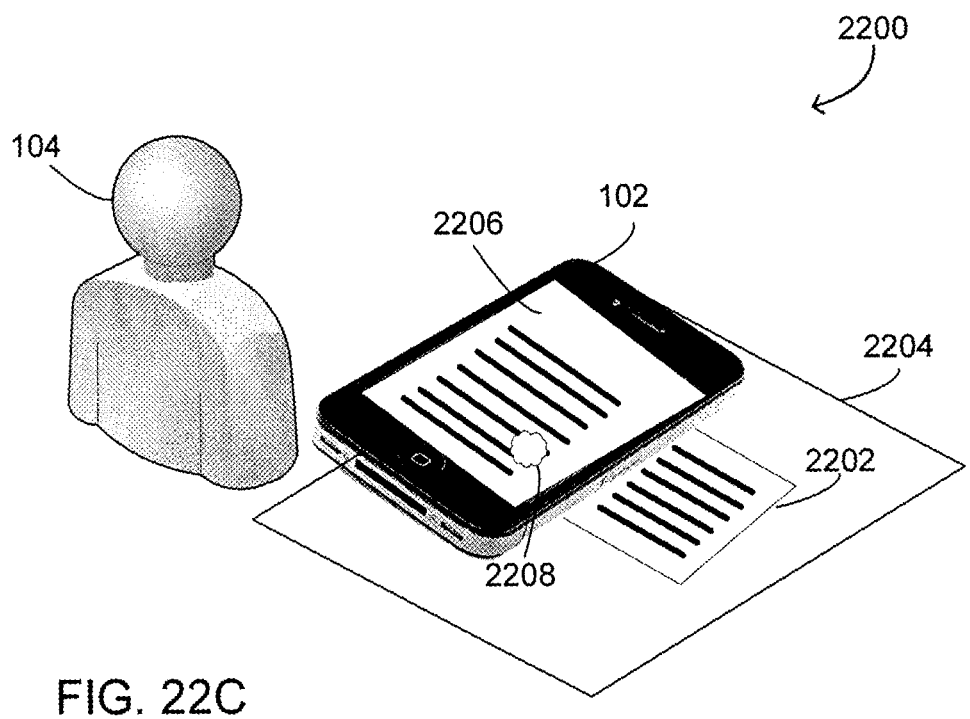
Figure 22D:
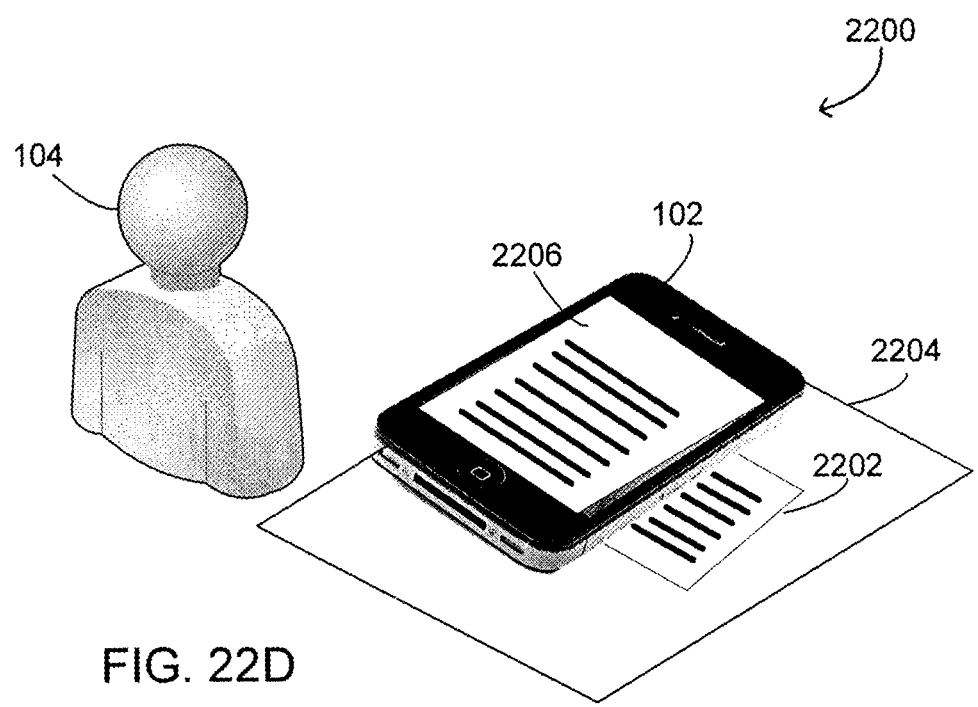

As the user moves smartphone 102, the relative position of smartphone 102 and the light source may change. As a result, the position of any reflection with respect to the composite image may change. Such a change is shown in FIG. 22B, with the reflection 2208 appearing to move to the right in the composite image. Further movement may further move the relative position of reflection 2208, to a position as shown in FIG. 22C. Such a movement may be detected by processing image frames after they have been positioned in the frame of reference of a composite image, allowing comparison of the location of a reflection in a common frame of reference from frame to frame.

The fact that the reflection appears to "move" may also be used to improve the quality of the composite image by removing the reflection. The image frames acquired with smartphone 102 in positions as illustrated in FIGS. 22A-22C, may each contain reflection 2208. However, those image frames may each contain a portion of the object that is obscured by reflection 2208 in the other image frames. As a result, smartphone 102 may capture enough image frames that a composite image may be constructed without using portions of image frames containing the detected reflection.

Moreover, the fact that the reflection depends on relative position of the smartphone and the light source means that movement of the smartphone may remove the reflection. A user may be directed to move the smartphone to allow capture of image frames without the reflection. When this reflection is detected, for example, using the processing at block 2110 in FIG. 21, user 104 may be guided to orient smartphone 102 so that reflection 2208 is "moved away" from image 2206. This may occur gradually, as user 104 moves smartphone in a particular manner, such as by tilting or rotating the smartphone, and portions of subsequent overlapping image frames may be used to replace segments having the reflection with segments that do not include the reflection.

It should be appreciated that although FIGS. 21 and 22A-22D show how a quality of a composite image may be improved by removing reflections, similar processing may be performed to remove shadows. Thus, if a segment of an image frame is determined to include a shadow, this segment may be replaced with a segment of a better quality that does not include the shadow.

In some embodiments, to display a composite image in real-time, a quality of a composite image is determined by processing selected image frames, such as one or more image frames in a reference image. In embodiments in which only a single type of image frame is captured, the composite image may be the same as the preview image. However, in embodiments in which image frames of one type are used to form the preview image and image frames of additional types are used to form a higher resolution composite image, the composite image may be different than the preview image. Moreover, it is not a requirement that the composite image actually be rendered and/or displayed. As used herein, a "reference image" may include a data structure holding image frames that could be rendered into an image format, which may be further processed and/or displayed. The reference image may represent a current result of progress of the scan of an object. To display the image information captured in the reference image, that information may be processed into a composite image—i.e., a representation of the reference image that is to be rendered and presented to a user on the smartphone display. The composite image may be rendered with any suitable resolution. In some embodiments or in some scenarios, only a portion of the captured image information in the reference image may be used in rendering a composite image. In such a scenario, the composite image may be referred to as a preview image. A lower resolution preview image may be displayed during a scan process, to enable fast feedback to a user. A higher resolution, final composite image may be rendered upon completion of image acquisition.

In any event, the quality of the composite image formed at the end of a scan may be improved by improving quality of the reference image. Accordingly, once a current reference image is updated, the updated reference image and/or the composite image may be processed. The processing may comprise analyzing content of the image to identify areas of different quality and performing further processing of the content, such as, for example, optical character recognition (OCR). In some embodiments, the analysis may be performed on the reference image. However, it should be appreciated that the analysis could be performed on any suitable image information, including on a preview image or a composite image already rendered.

OCR techniques may be applied to segments of the composite image to assess the quality of those segments. If the quality of one or more segments is determined to be below a certain threshold, those segments may be replaced with one or more segments of a better quality. OCR processing may generate a quality metric on segments of an image.

The OCR processing and verification may be performed on segments of the image of any suitable resolution that are deemed to contain text. In some embodiments, this processing may be performed on image frames of a high resolution, such as K-frames as described herein. Though, OCR and/or other types of processing may be done on P-frames that depict the same content. Because a P-frame may have a lower resolution that a K-frame, results of P-frames processing may be displayed to a user faster, thus improving overall user experience.

The composite image may be segmented by processing performed in response to any suitable trigger. In some embodiments, the segmenting is triggered when the composite image is updated. Segmentation may identify areas of the composite image that likely contain text. OCR processing, using techniques as are known in the art or any other suitable technique, may be performed on each segment.

Some OCR processes, in addition to associating a particular text character with an item in an image, may output an indication of closeness, or confidence, of a match between the item and a text character in an alphabet recognized by the OCR process. Such a closeness may be determined using a correlation operation or any other suitable processing.

The closeness indicators may serve as a quality metric for a segment. Using averaging or other suitable process, the closeness indicators for all of the characters identified in a segment may be combined into a quality metric for the segment. As a result, when OCR processing is able to identify characters in a segment with a high average closeness, the segment may be assigned a high ("good") value of the quality metric. In contrast, segments with low closeness may be assigned a low ("bad") value of the quality metric.

Specifically, the image may be divided into areas. These areas may have any suitable shape, but, reflecting the convention that text is presented in parallel lines, these areas may be boxes. The segmentation processing may rely on conventional layout characteristics of documents to identify segments. As one example, segmentation may identify image areas of comprising one or more content portions and image areas comprising a peripheral portion. The content portions may be recognized based on one or more lines of characters, whereas the peripheral portions may be identified as areas of background color that do not include content, for example.

It should be appreciated that embodiments are not limited to any specific ways of segmenting the composite image. Because segmentation may be performed successfully on low resolution images, the segmentation of the composite image may be performed, for example, on P-frames or a composite image being formed with the P-frames.

Figure 23:
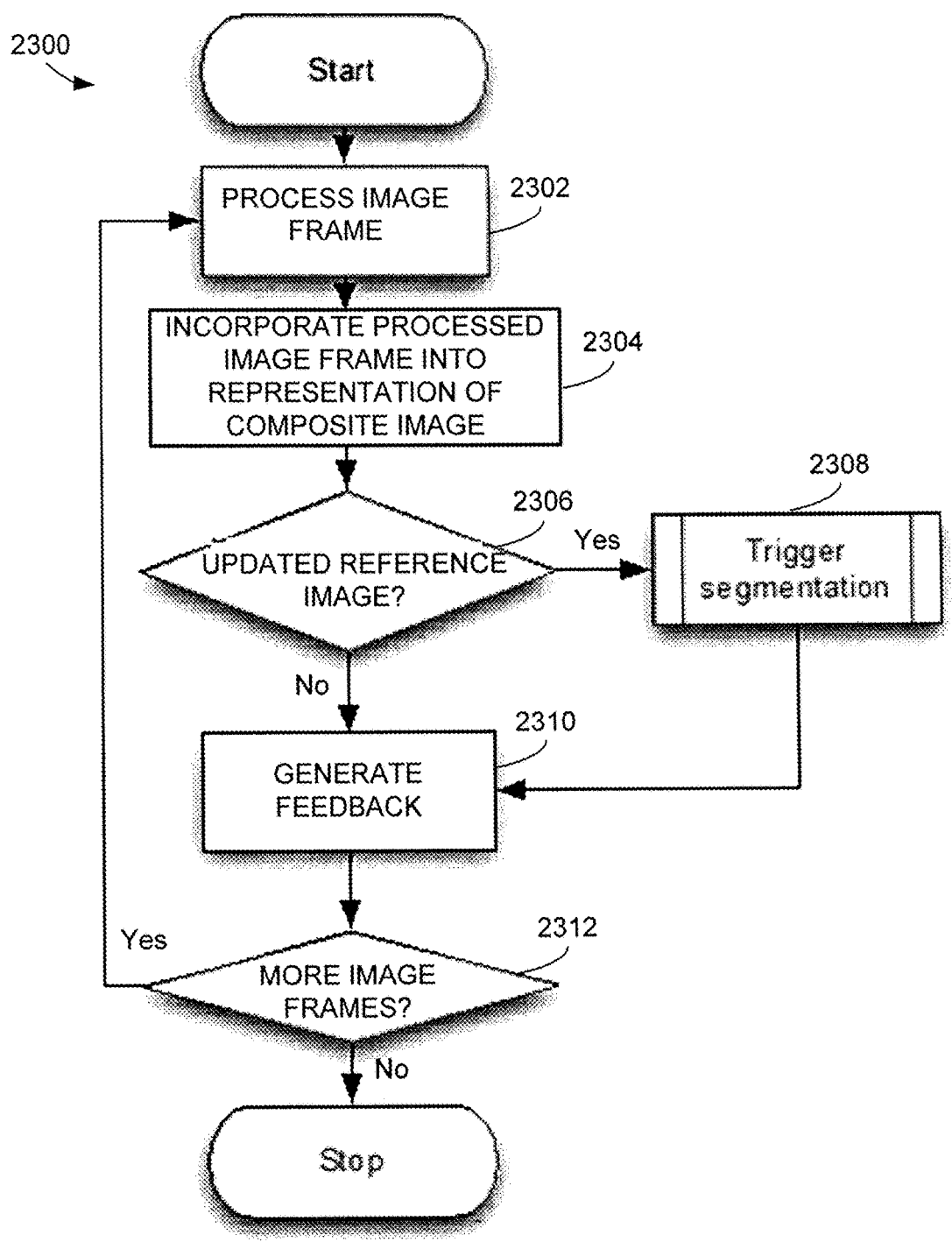
FIG. 23 is a flowchart of a process of segmenting an image, in accordance with some embodiments of the invention.

FIG. 23 illustrates a process 2300 of segmenting a composite image when it is determined that it has been updated. Process 2300 may start when an image frame is captured and pre-processed at block 2302, which may be performed, for example, similarly to processing at block 502 in FIG. 5. As the next step, the image frame may be incorporated into a representation of a composite image, which may be performed as described herein—e.g., similarly to processing at block 504 in FIG. 5.

Next, it may be determined at decision block 2306 whether a reference image has been updated. If this is the case, process 2300 may follow to block 2308 where content of the composite image may be segmented. The segmentation may include identifying areas of similar content, which may be shaped as "boxes," which may be processed separately, to improve quality of the composite image.

In some embodiments, results of segmenting the image may be presented on the display of the composite image in a form of feedback, at block 2310. For example, frames or other visual features, which may have different colors, may overlay the image on the display to emphasize detected segments. Additionally or alternatively, visual features that indicate quality of the segments may be displayed. As a specific example, lines may be overlaid on a rendered composite image that is being displayed to indicate the boundaries of the segments. These lines may have colors, such as green, yellow and red, to indicate the quality metric assigned to the corresponding segment. Though, other indicators may be used. For example, areas of low quality may be shown "greyed out" or in some other suitable way to alert the user to the area of low quality.

If it is determined at decision block 2306 that the reference image has not been updated, which may occur for example if the captured image frame is redundant of prior image frames or of too low a quality, respective feedback may be generated at block 2310. This feedback may be based on a previously prepared segmentation or may be updated to correct a reason that the image frame was not used. For example, if the image frame was not used because the camera was not moved, the displayed feedback may prompt the user to move the smartphone. Regardless of the feedback, process 2300 may then follow to block 2312, where it may determine whether there are more image frames to capture. For example, if the scan of the object is still in progress, process 2300 may loop back to block 2302 where another image frame may be captured and processed. If it is determined at decision block 2312 that no further image frames are to be captured (e.g., when an indication to stop the scan is received or the scan is stopped in other way(s)), process 2300 may stop.

Figure 24:
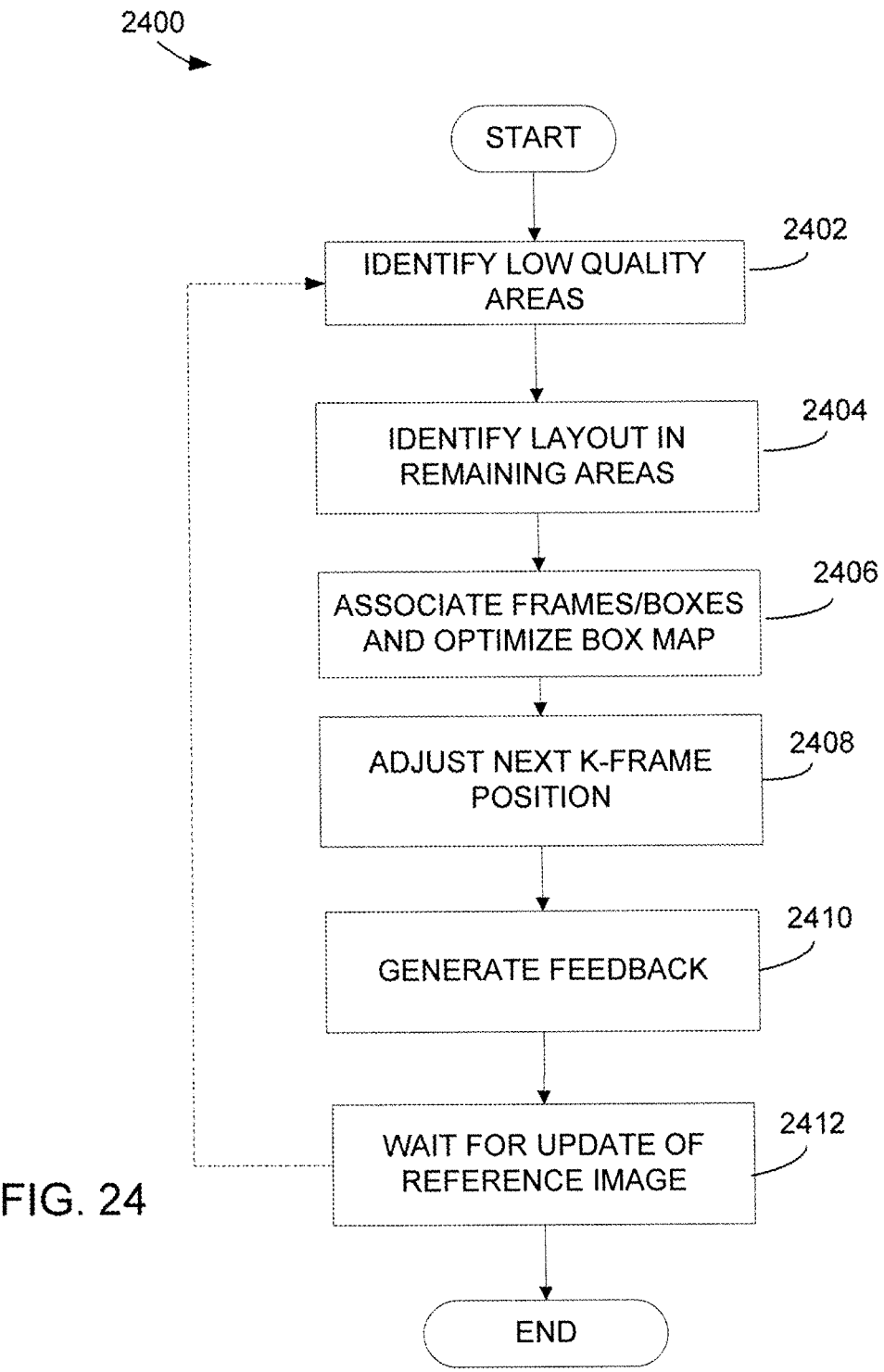
FIG. 24 is another flowchart of a process of segmenting an image, in accordance with some embodiments of the invention.

FIG. 24 illustrates in more detail a process 2400 of segmenting content of an image representing the composite image, in accordance with some embodiments. The image may represent an entire composite image or a portion of the composite image. This processing may be performed on the composite image, of any suitable resolution, and/or a reference image. FIGS. 26A-26D show an example of segmentation of such an image 2602 (FIG. 26A) which is, in this example, an image of a document including text and/or other characters. The segmentation may be followed by further analysis of the image content, such as by optical character recognition and any other processing.

Process 2400 may first identify areas of low quality, at block 2402. This may include identifying areas including shadows, reflections or any other artifacts that contribute to the decrease in the image quality. Additionally or alternatively, areas that include no content (e.g., areas that include only background color) may be identified as low quality area. Exact boundaries of the identified low quality areas may be delineated. This delineation may be achieved by storing data in computer memory that identifies other data representing a particular segment of the image. Alternatively or additionally, the delineations may be presented on the display along with the image.

Figures 26A, 26B, 26C, 26D:
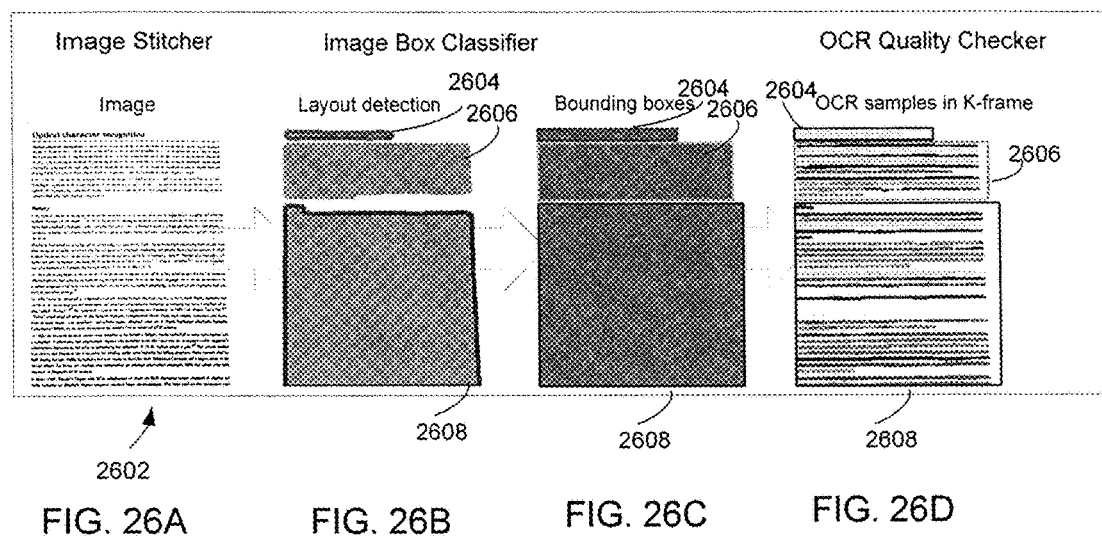
FIGS. 26A-26D are conceptual illustrations of a process of segmentation of an image and application of optical character recognition techniques to the image, in accordance with some embodiments of the invention.

After the areas of low quality are identified in the composite image, next, at block 2404, a layout of the content in the remaining areas may be identified. The remaining areas may be analyzed to identify segments containing text. Such processing may be performed by identifying lines of characters, aligned with an edge of a document, or in any other suitable way. In the example illustrated, these areas may be represented by boxes. FIG. 26B illustrates layout boxes 2604, 2606 and 2608 that are identified within image 2602 and that bound respective areas of content of the image. In this example, box 2604 includes a title of the document, and boxes 2606 and 2608 each include a respective paragraph in the text of the document.

It should be appreciated that the layout boxes are shown by way of illustration only and that, in embodiments where content of the composite image is complex, areas of shapes other than boxes may be identified and processed.

Next, at block 2406, the identified box may be associated with frames forming the composite image. The segments found in 2404 may be added to the box map of the previous iteration of the process 2400. For example, as a result of process 1900, the reference image may be updated and the effectively captured area may increase. Thus, new areas (the "remaining areas" in 2402) are found. The box map of the previous iteration may be optimized by either enlarging existing boxes or adding new boxes.

A further act of process 2400 may include determining a position of a next high resolution image frame to be captured. The position of such image frame may be identified so that the frame overlaps a current image frame and covers a portion of a segment to be further analyzed. In this example, determining a position of a next image frame may comprise adjusting the conditions under which a next K-frame is captured.

As shown in FIG. 24, next, feedback may be generated at block 2410. The feedback may indicate to a user a manner in which to move the smartphone to result in a capture of a K-frame in the determined position. Such feedback may be presented by displaying the composite image to present the layout boxes that were detected and adjusted at blocks 2404 and 2406, respectively. An example of such feedback is shown in FIG. 26B, illustrating layout boxes 2604, 2606 and 2608. The layout boxes may be colored, shaded, or presented with any suitable visually distinctive features to identify segments for which further image frames are desired. Alternatively or additionally, the feedback may be presented using visual or audible signals to the user to indicate a direction in which to move the smartphone to acquire a desired K-frame.

The bounding boxes may be positioned so that different portions of the entire textual content of the image are included in respective boxes. Each of the bounding boxes 2604, 2606 and 2608 may have a different color. In some scenarios, a color may be used to designate a characteristic of the bounding box, such as its size, type of content, etc. It should be appreciated that three bounding boxes 2604, 2606 and 2608 are shown by way of example only, and any suitable number of boxes or bounding areas of other shapes may be identified.

Next, at block 2412, process 2400 may wait for a next update of the reference image. When such next update occurs, process 2400 may return to block 2402, as schematically shown in FIG. 24. Alternatively, process 2400 may then end.

In some embodiments, determining quality of a segment in a composite image comprises determining a relative image quality based on quality of optical character recognition. For example, when the object being imaged is a document with characters, the likelihoods or other closeness metrics associated with identifying characters may indicate image quality.

Figure 25:
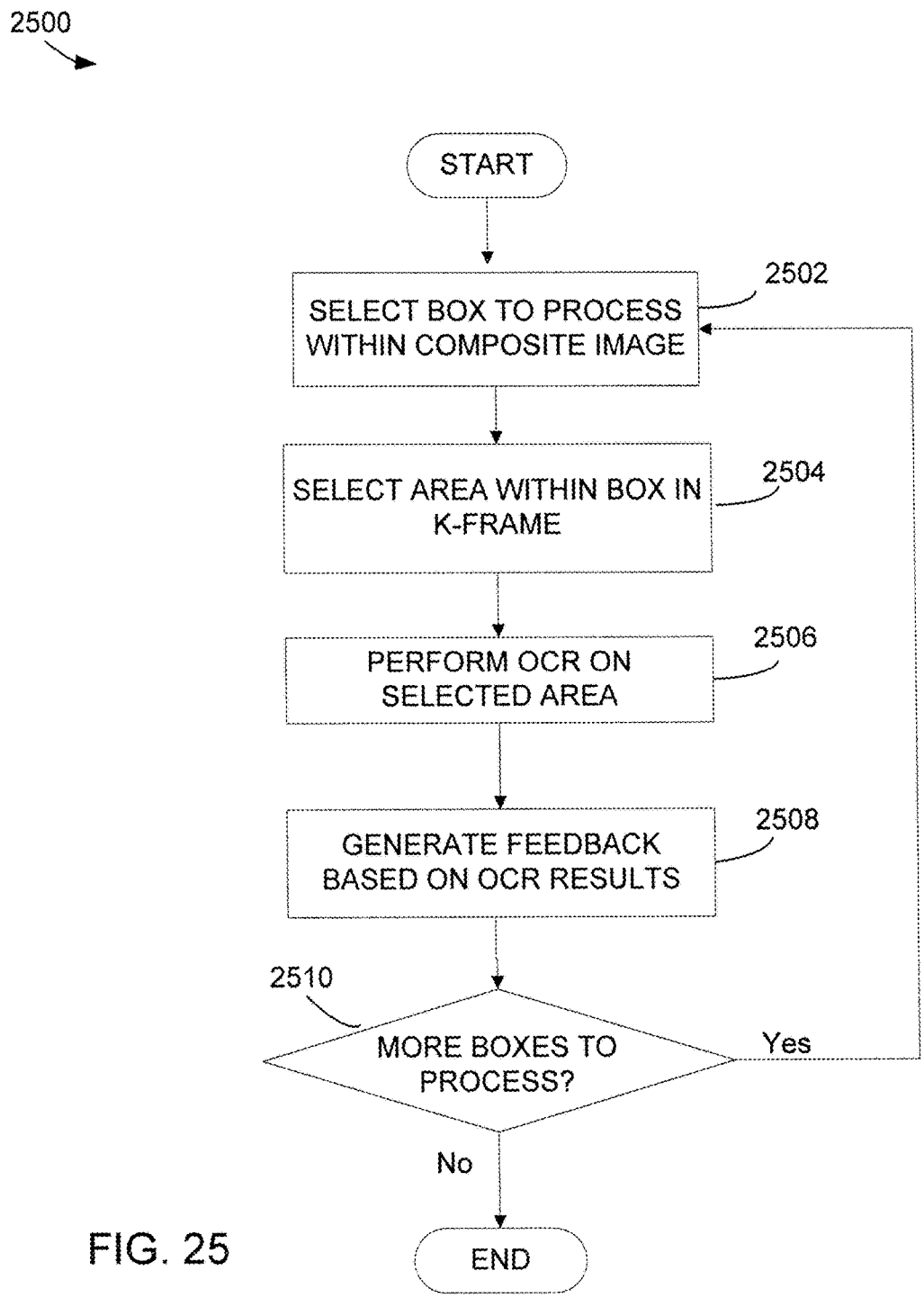
FIG. 25 is a flowchart of a process of applying optical character recognition techniques to an image and assessing quality of the application of optical character recognition techniques, in accordance with some embodiments of the invention.

Accordingly, after the image representing an object being scanned has been segmented, content of at least a portion of the image may be analyzed by applying optical character recognition techniques to content of the image. FIG. 25 illustrates process 2500 of applying optical character recognition (OCR) techniques to content of the composite image and assessing quality of the OCR. The OCR quality assessment may be performed in real-time, as each new box is identified and updated in the segmented image.

OCR may be performed using any suitable module comprising computer-executable instructions that, when executed, performs an OCR technique. In some embodiments, an OCR engine may recognize characters in multiple languages and may comprise dictionaries for one or more languages. The OCR engine may be stored in memory of the smartphone (e.g., as part of applications 222 in memory 220) and may thus be used without requiring the smartphone to be connected to the Internet. The OCR engine may be received from a third party or may be implemented in any suitable way.

OCR processing may require a certain amount of time, which may take up to a few seconds. Thus, to provide results of the OCR processing without a delay, the processing may utilize both low resolution frames (e.g., P-frames) and high resolution frames (K-frames). In particular, the OCR processing may be performed so that a result of segmentation of one or more P-frames may be used in association with performing OCR on a K-frame representing at least a portion of an identified segment, as described in more detail below.

Process 2500 may start when a box is selected within the composite image. The box may be selected, for example, from boxes identified at block 2406 in FIG. 24. The box may be selected at block 2502 in any suitable manner. For example, when an object being scanned is a document with characters, a box in the upper left corner of the document may be selected first. Continuing with the example in FIGS. 26A-26D, box 2604 may be selected at block 2502. Though, it should be appreciated that the box may be selected in other manner. Furthermore, it should be appreciated that processing to achieve image segmentation as shown in FIG. 24 and OCR processing on previously identified segments may be performed simultaneously (e.g., processes 2400 and 2500 may run in respective different threads).

Next, at block 2504, an area within the box may be selected in a high resolution frame. For example, when the scanned object is a document depicting text, the area may comprise a rectangle encompassing a line or a group of words. Only an area having content that has not yet been recognized may be selected. Because OCR of a good quality may require a high resolution image, the OCR may be performed on a K-frame. Thus, after the area within the box identified within a P-frame is selected, a respective K-frame may be identified such that the K-frame includes the same content as content bounded by the box identified within the P-frame. Thus, at block 2504, the area is selected from a frame having a high resolution, which is, in this example, a K-frame.

The OCR is then performed on the selected area, at block 2506, which may be performed using any technique as known in the art. Quality of the OCR processing may be verified in any suitable manner and the selected area may be associated with an indicator of the OCR quality, such as a score (e.g., a confidence score) that indicates a likelihood of a correct recognition of characters. Feedback may be generated based on results of the OCR quality verification, at block 2508. For example, different values or average values of the scores may be assigned to different quality levels. These quality levels, for example, may represent an acceptable, unacceptable and marginal quality. As shown in FIG. 26D, text within one or more areas of box 2604 may be highlighted to indicate that the text has been recognized. Different portions of the text may be highlighted with different colors or may otherwise be emphasized to indicate areas that have been recognized and respective quality of recognition. For example, one color (e.g., green) may be used to indicate confidence scores meeting the acceptable threshold, whereas another color (e.g., yellow) may be used to indicate confidence scores associate with the marginal level of quality. Any other visual indicators or cues of quality of OCR application may be utilized, as embodiments are not limited in this respect.

In some embodiments, feedback indicating whether one or more areas of the composite image may need to be rescanned may be generated. This may be required and/or recommended to improve the quality of the OCR of content of the composite image. Such an indication may be based on the quality metrics for the segments, such that segments with quality metrics below some threshold are indicated for rescanning.

It may then be determined, at decision block 2510, whether the composite image includes more boxes to analyze. If it is determined that more boxes are to be processed, process 2500 may loop back to block 2502 where that box may be processed. The next box may be selected in any suitable way and the results of the OCR processing may be presented to the user in a manner so that the user perceives a simultaneous analysis of the quality of the application of OCR to the entire document or a portion of the document represented in the composite image.

Finally, if it is determined that there are no more boxes to be processed (e.g., when the scanning of the object is completed), process 2500 may end.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a non-transitory computer readable medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that performs particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of operating a portable electronic device, comprising a camera, to form an image of an object from a plurality of image frames captured with the camera, the method comprising:
    with the camera, capturing a first image frame and a second image frame at different times;
    with a processor, determining a value of a quality metric associated with the image of the object before a corrective action;
    with the processor, processing at least the first image frame of the plurality of image frames, to identify a feature in the first image frame representing an artifact associated with a relative position of the camera and a source of light; and
    when the artifact is detected in the first image frame, taking the corrective action, the corrective action comprising forming the image of the object with at least a portion of the second image frame, the portion of the second image frame representing a portion of the object depicted in a portion of the first image frame containing the artifact, wherein a value of the quality metric associated with the image of the object after taking the corrective action is greater than the value of the quality metric associated with the image of the object before the corrective action.

2. The method of claim 1, wherein the artifact is a reflection.

3. The method of claim 2, wherein identifying the feature comprises detecting a specular highlight.

4. The method of claim 1, wherein the artifact is a shadow.

5. The method of claim 1, wherein the corrective action comprises presenting on a user interface directions to a user to position the portable electronic device to reduce the artifact.

6. The method of claim 1, wherein:
    the method further comprises sequentially processing image frames of the plurality of image frames by, for a processed image frame, incorporating the processed image frame in a representation of a composite image; and
    the corrective action comprises replacing the first image frame with the second image frame in the representation of the composite image.

7. The method of claim 1, wherein:
    the method further comprises sequentially processing image frames of the plurality of image frames by, for a processed image frame, incorporating the processed image frame in a representation of a composite image; and
    the corrective action comprises adjusting a camera acquisition condition for a subsequent image frame incorporated in the composite image.

8. The method of claim 7 wherein adjusting the camera capture condition comprises adjusting a camera flash setting.

9. A method of operating a portable electronic device, comprising a camera, to form an image of an object from a plurality of image frames captured with the camera, the method comprising:
    with the camera, capturing a first image frame and a second image frame at different times;
    with a processor, processing at least the first image frame of the plurality of image frames, to identify a feature in the first image frame representing an artifact associated with a relative position of the camera and a source of light; and
    when the artifact is detected in the first image frame, taking a corrective action, the corrective action comprising forming the image of the object with at least a portion of the second image frame, the portion of the second image frame representing a portion of the object depicted in a portion of the first image frame containing the artifact, wherein a value of a quality metric associated with the image of the object after taking the corrective action is greater than a value of the quality metric associated with the image of the object before the corrective action, wherein:
    processing at least the first image frame comprises processing image frames of the plurality of image frames in a sequence representing a scan of the object by:
    correlating the image frames in the sequence to detect a portion of the image frames representing the same item in the image frames in the sequence; and
    identifying the item as the artifact based on changes of shape and/or position of the item with respect to a common frame of reference from frame to frame of the image frames in the sequence.

10. A portable electronic device, comprising:
    a camera configured to capture a plurality of image frames comprising a first image frame captured with the portable electronic device at a first location relative to an object and a second image frame captured with the portable electronic device at a second location relative to the object different from the first location; and
    a processor configured to:
        form an image of the object from the plurality of image frames captured with the camera;
        process at least the first image frame of a plurality of image frames, to identify a feature in the first image frame representing an artifact associated with a relative position of the camera and a source of light, wherein the artifact comprises a specular highlight; and
        when the artifact is detected in the first image frame, take a corrective action, the corrective action comprising forming the image of the object with at least a portion of the second image frame not containing a feature representing the artifact, the portion of the second image frame representing a portion of the object depicted in a portion of the first image frame containing the artifact, the corrective action further comprising presenting on a user interface directions to a user to position the portable electronic device to reduce the artifact.

11. The portable electronic device of claim 10, wherein the artifact comprises a shadow.

12. The portable electronic device of claim 10, wherein:
    the processor is further configured to sequentially process image frames of the plurality of image frames by, for a processed image frame, incorporating the processed image frame in a representation of a composite image; and
    the corrective action comprises replacing the first image frame with the second image frame in the representation of the composite image.

13. The portable electronic device of claim 10, wherein:
the processor is further configured to sequentially process image frames of the plurality of image frames by, for a processed image frame, incorporating the processed image frame in a representation of a composite image; and
the corrective action comprises adjusting a camera acquisition condition for a subsequent image frame incorporated in the composite image.

14. The portable electronic device of claim 13, wherein adjusting the camera capture condition comprises adjusting a camera flash setting.

15. A portable electronic device, comprising:
a camera configured to capture a plurality of image frames; and
a processor configured to:
form an image of an object from the plurality of image frames captured with the camera;
process at least a first image frame of a plurality of image frames, to identify a feature in the first image frame representing an artifact associated with a relative position of the camera and a source of light, wherein the artifact comprises a specular highlight; and
when the artifact is detected in the first image frame, take a corrective action, the corrective action comprising forming the image of the object with at least a portion of a second image frame not containing a feature representing the artifact, the portion of the second image frame representing a portion of the object depicted in a portion of the first image frame containing the artifact, the corrective action further comprising presenting on a user interface directions to a user to position the portable electronic device to reduce the artifact, wherein:
processing at least the first image frame comprises processing image frames of the plurality of image frames in a sequence representing a scan of the object by:
correlating the image frames in the sequence to detect a portion of the image frames representing the same item in the image frames in the sequence; and
identifying the item as the artifact based on changes of shape and/or position of the item with respect to a common frame of reference from frame to frame of the image frames in the sequence.

16. At least one non-transitory, tangible computer readable storage medium having computer-executable instructions, that when executed by a processor, perform a method of forming an image of an object from a plurality of image frames captured with a camera of a portable electronic device, the method comprising:
processing at least a first image frame of the plurality of image frames, to identify a feature in the first image frame representing an artifact associated with a relative position of the camera and a source of light; and
when the artifact is detected in the first image frame, taking a corrective action, the corrective action comprising forming the image of the object with at least a portion of a second image frame, the portion of the second image frame representing a portion of the object depicted in a portion of the first image frame containing the artifact,
wherein processing at least the first image frame comprises processing image frames of the plurality of image frames in a sequence representing a scan of the object by:
correlating the image frames in the sequence to detect a portion of the image frames representing the same item in the image frames in the sequence; and
identifying the item as the artifact based on changes of shape and/or position of the item with respect to a common frame of reference from frame to frame of the image frames in the sequence.

17. The at least one non-transitory, tangible computer readable storage medium of claim 16, wherein the artifact is a reflection.

18. The at least one non-transitory, tangible computer readable storage medium of claim 17, wherein identifying the feature comprises detecting a specular highlight.

19. The at least one non-transitory, tangible computer readable storage medium of claim 16, wherein the artifact is a shadow.

20. The at least one non-transitory, tangible computer readable storage medium of claim 16, wherein the corrective action comprises presenting on a user interface directions to a user to position the portable electronic device to reduce the image artifact.

21. The at least one non-transitory, tangible computer readable storage medium of claim 16, wherein:
the method further comprises sequentially processing image frames of the plurality of image frames by, for a processed image frame, incorporating the processed image frame in a representation of a composite image; and
the corrective action comprises replacing the first image frame with the second image frame in the representation of the composite image.

22. The at least one non-transitory, tangible computer readable storage medium of claim 16, wherein:
the method further comprises sequentially processing image frames of the plurality of image frames by, for a processed image frame, incorporating the processed image frame in a representation of a composite image; and
the corrective action comprises adjusting a camera acquisition condition for a subsequent image frame incorporated in the composite image.

23. The at least one non-transitory, tangible computer readable storage medium of claim 22, wherein adjusting the camera capture condition comprises adjusting a camera flash setting.

* * * * *